United States Patent [19]
Adachi et al.

[11] Patent Number: 5,789,128
[45] Date of Patent: Aug. 4, 1998

[54] ELECTROPHOTOGRAPHIC PHOTOCONDUCTOR AND AROMATIC POLYCARBONATE RESIN FOR USE THEREIN

[75] Inventors: Chihaya Adachi, Ueda; Masaomi Sasaki, Susono; Kazukiyo Nagai, Numazu; Tomoyuki Shimada; Chiaki Tanaka, both of Shizuoka-ken; Nozomu Tamoto, Numazu; Akira Katayama, Shizuoka-ken; Mitsutoshi Anzai, Kawasaki; Akihiro Imai, Kawasaki; Katsuhiro Morooka, Kawasaki, all of Japan

[73] Assignees: Ricoh Company, Ltd., Tokyo; Hodogaya Chemical Co., Ltd., Kawasaki, both of Japan

[21] Appl. No.: 767,425

[22] Filed: Dec. 16, 1996

[30] Foreign Application Priority Data

| Dec. 15, 1995 | [JP] | Japan | 7-327364 |
| Jan. 24, 1996 | [JP] | Japan | 8-010228 |
| Jan. 25, 1996 | [JP] | Japan | 8-010894 |
| Jun. 19, 1996 | [JP] | Japan | 8-177206 |

[51] Int. Cl.$^6$ .................................................. G03G 5/09
[52] U.S. Cl. .................... 430/83; 430/59; 430/73; 430/75
[58] Field of Search ........................................ 430/59, 83

[56] References Cited

U.S. PATENT DOCUMENTS

| 5,420,226 | 5/1995 | Hamer et al. | 430/59 |
| 5,486,439 | 1/1996 | Sakakibara et al. | 430/83 |
| 5,604,064 | 2/1997 | Nukada et al. | 430/59 |
| 5,639,581 | 6/1997 | Iwasaki et al. | 430/59 |

*Primary Examiner*—Roland Martin
*Attorney, Agent, or Firm*—Oblon, Spivak, McClelland, Maier & Neustadt, P.C.

[57] ABSTRACT

An electrophotographic photoconductor includes an electroconductive support, and a photoconductive layer formed thereon containing as an effective component an aromatic polycarbonate resin having a repeat unit of formula (I), or two repeat units of formulae (II) and (III):

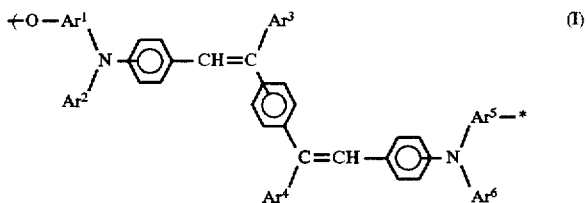
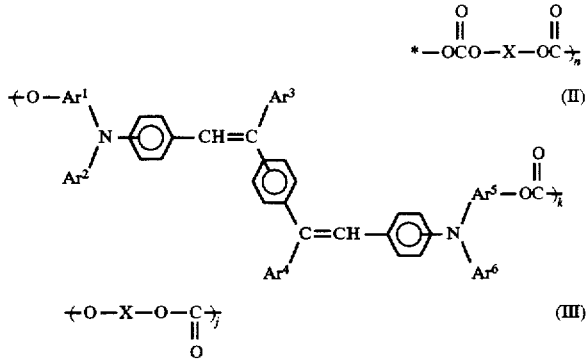

wherein $Ar^1$ to $Ar^6$, X, n, k and j are as specified in the specification.

28 Claims, 25 Drawing Sheets

F I G. 1
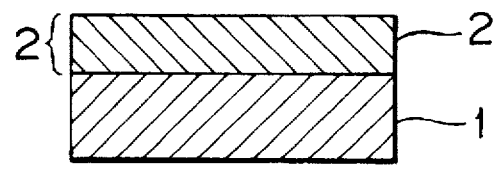
F I G. 2
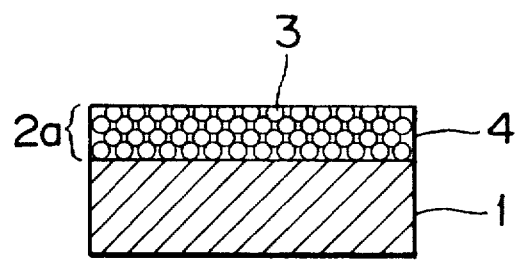
F I G. 3
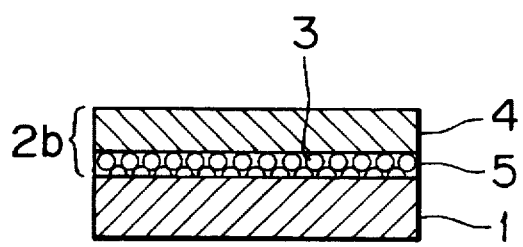
F I G. 4
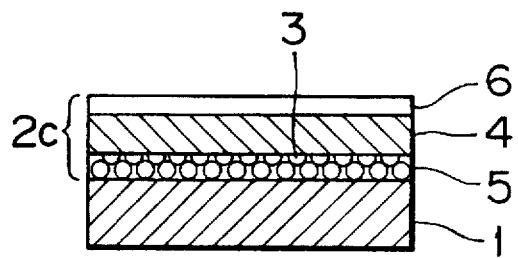

F I G. 5
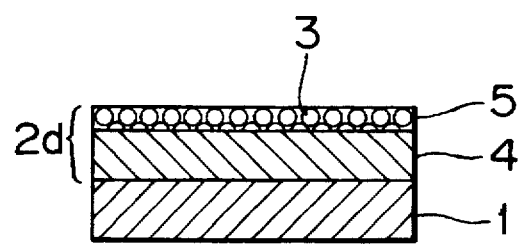
F I G. 6
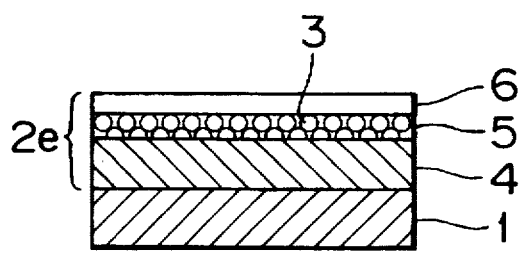

FIG. II

ELECTROPHOTOGRAPHIC PHOTOCONDUCTOR AND AROMATIC POLYCARBONATE RESIN FOR USE THEREIN

BACKGROUND OF THE INVENTION

1. Field of the Invention

The present invention relates to an electrophotographic photoconductor comprising an electroconductive support, and a photoconductive layer formed thereon, comprising an aromatic polycarbonate resin as an effective component. In addition, the present invention also relates to the above-mentioned aromatic polycarbonate resin with charge transporting properties.

2. Discussion of Background

Recently organic photoconductors are used in many copying machines and printers. These organic photoconductors have a layered structure comprising a charge generation layer (CGL) and a charge transport layer (CTL) which are successively overlaid on an electroconductive support. The charge transport layer (CTL) is a film-shaped layer comprising a binder resin and a low-molecular-weight charge transport material (CTM) dissolved therein. The addition of such a low-molecular-weight charge transport material (CTM) to the binder resin lowers the intrinsic mechanical strength of the binder resin, so that the CTL film is fragile and has a low tensile strength. Such lowering of the mechanical strength of the CTL causes the wearing of the photoconductor or forms scratches and cracks in the surface of the photoconductor.

Although some vinyl polymers such as polyvinyl anthracene, polyvinyl pyrene and poly-N-vinylcarbazole have been studied as high-molecular-weight photoconductive materials for forming a charge transporting complex for use in the conventional organic photoconductor, such polymers are not satisfactory from the viewpoint of photosensitivity.

In addition, high-molecular-weight materials having charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 4,801, 517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-18371, 4-31404, and 4-133065. However, any materials have not yet been put to practical use.

According to the report of "Physical Review B46 6705 (1992)" by M. A. Abkowitz et al., it is confirmed that the drift mobility of a high-molecular weight charge transporting material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is suggested that the photoconductor employing the high-molecular weight charge transporting material produces poor results in terms of the photosensitivity and the residual potential although the mechanical strength of the photoconductor is improved.

Conventionally known representative aromatic polycarbonates are obtained by allowing 2,2-bis(4-hydroxyphenyl) propane (hereinafter referred to as bisphenol A) to react with a carbonate precursor material such as phosgene or diphenylcarbonate. Such polycarbonates made from bisphenol A are used in many fields because of their excellent characteristics, such as high transparency, high heat resistance, high dimensional accuracy, and high mechanical strength.

For example, this kind of polycarbonate resin is intensively studied as a binder resin for use in an organic photoconductor in the field of electrophotography. A variety of aromatic polycarbonate resins have been proposed as the binder resins for use in the charge transport layer of the layered photoconductor.

As previously mentioned, however, the mechanical strength of the aforementioned aromatic polycarbonate resin is decreased by the addition of the low-molecular-weight charge transporting material in the charge transport layer of the layered electrophotographic photoconductor.

SUMMARY OF THE INVENTION

It is therefore a first object of the present invention to provide an electrophotographic photoconductor free from the conventional shortcomings, which can show high photosensitivity and high durability.

A second object of the present invention is to provide an aromatic polycarbonate resin that is remarkably useful as a high-molecular-weight charge transporting material for use in an organic electrophotographic photoconductor.

The above-mentioned first object of the present invention can be achieved by an electrophotographic photoconductor comprising an electroconductive support, and a photoconductive layer formed thereon comprising as an effective component an aromatic polycarbonate resin having a repeat unit of formula (I):

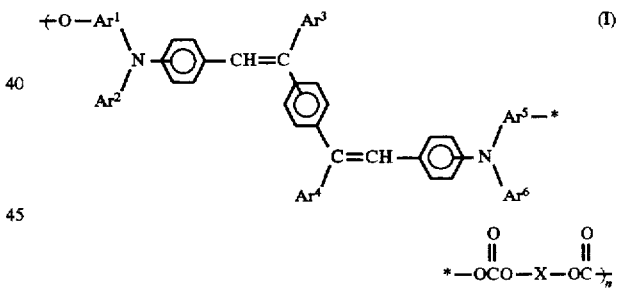

wherein n is an integer of 5 to 5000; $Ar^1$ and $Ar^5$ may be the same or different, and represent a bivalent aromatic hydrocarbon group which may have a substituent or a bivalent heterocyclic group which may have a substituent; $Ar^2$, $Ar^3$, $Ar^4$ and $Ar^6$ each may be the same or different, and represent an aromatic hydrocarbon group which may have a substituent, or a heterocyclic group which may have a substituent; and X is a bivalent aliphatic group, a bivalent cyclic aliphatic group, or

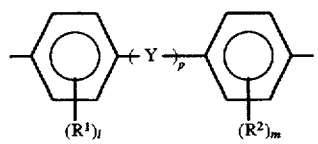

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, $$-O-, \quad -S-, \quad -SO-, \quad -SO_2-,$$

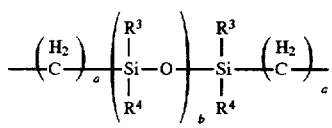

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

In the above-mentioned electrophotographic photoconductor, both of $Ar^1$ and $Ar^5$ may be phenylene group in the repeat unit of formula (I) for use in the aromatic polycarbonate resin.

Further, in the above-mentioned photoconductor, the repeat unit of formula (I) may be represented by the following formula (VI):

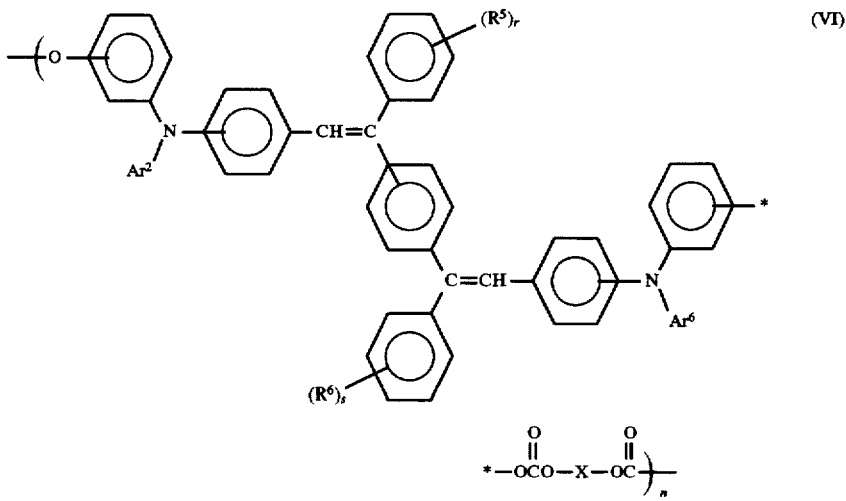

wherein n, $Ar^2$, $Ar^6$ and X are the same as those previously defined in formula (I); $R^5$ and $R^6$ are each independently an alkyl group which may have a substituent, an aromatic hydrocarbon group which may have a substituent, or a halogen atom; and r and s are each independently an integer of 0 to 4.

The first object of the present invention can also be achieved by an electrophotographic photoconductor comprising an electroconductive support, and a photoconductive layer formed thereon comprising as an effective component an aromatic polycarbonate resin having a repeat unit of formula (II) and a repeat unit of formula (III), with the composition ratio of the repeat unit of formula (II) to the repeat unit of formula (III) being in the relationship of $0<k/(k+j)\leq 1$:

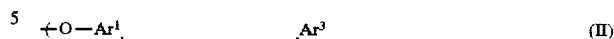

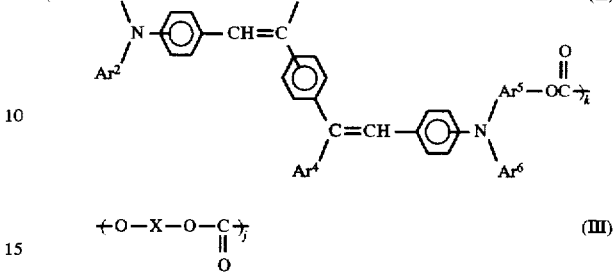

wherein k is an integer of 5 to 5000; j is an integer of 0 to 5000; $Ar^1$ and $Ar^5$ may be the same or different, and represent a bivalent aromatic hydrocarbon group which may have a substituent or a bivalent heterocyclic group which may have a substituent; $Ar^2$, $Ar^3$, $Ar^4$ and $Ar^6$ each may be the same or different, and represent an aromatic hydrocarbon group which may have a substituent, or a heterocyclic group which may have a substituent; and X is a bivalent aliphatic group, a bivalent cyclic aliphatic group, or

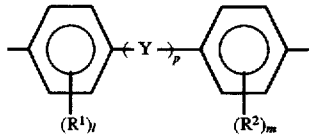

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms,

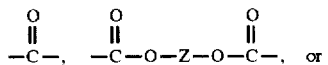

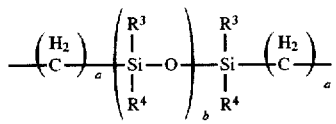

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

In the above-mentioned electrophotographic photoconductor, both of $Ar^1$ and $Ar^5$ may be phenylene group in the repeat unit of formula (II).

Further, in the above-mentioned photoconductor, the repeat unit of formula (II) may be represented by the following formula (VII):

heterocyclic group which may have a substituent; $Ar^2$, $Ar^3$, $Ar^4$ and $Ar^6$ each may be the same or different, and represent an aromatic hydrocarbon group which may have a substituent, or a heterocyclic group which may have a substituent; and X is a bivalent aliphatic group, a bivalent cyclic aliphatic group, or

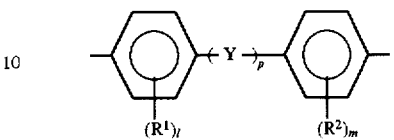

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms,

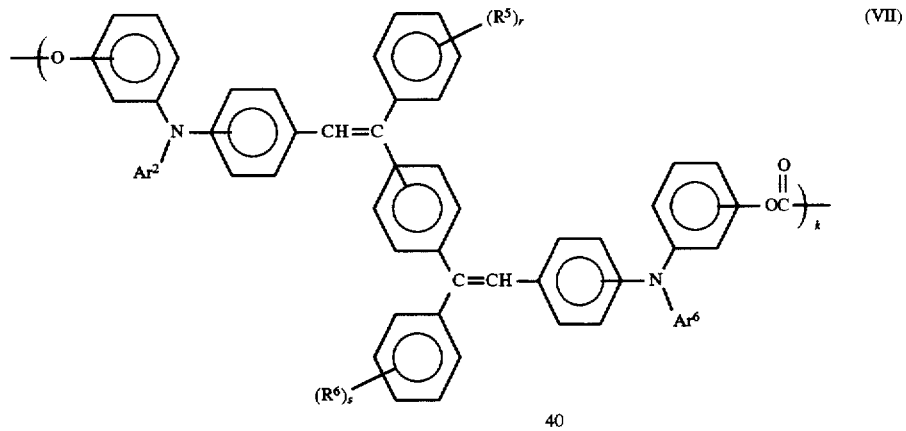

(VII)

wherein k, $Ar^2$ and $Ar^6$ are the same as those previously defined in formula (II); $R^5$ and $R^6$ are each independently an alkyl group which may have a substituent, an aromatic hydrocarbon group which may have a substituent, or a halogen atom; and r and s are each independently an integer of 0 to 4.

The second object of the present invention can be achieved by an aromatic polycarbonate resin having a repeat unit of formula (I):

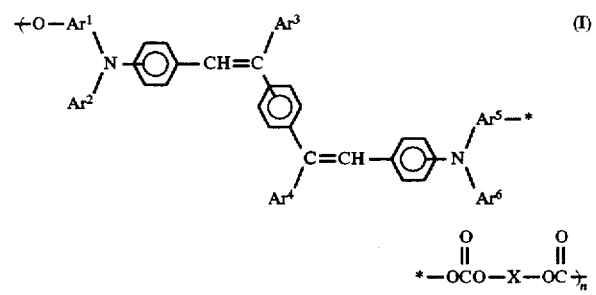

wherein n is an integer of 5 to 5000; $Ar^1$ and $Ar^5$ may be the same or different, and represent a bivalent aromatic hydrocarbon group which may have a substituent or a bivalent

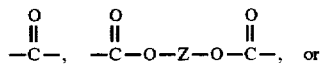

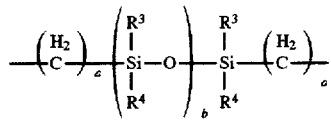

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

In the above-mentioned aromatic polycarbonate resin, both of $Ar^1$ and $Ar^5$ may be phenylene group in the repeat unit of formula (I).

Further, in the above-mentioned aromatic polycarbonate resin, the repeat unit of formula (I) may be represented by the following formula (VI):

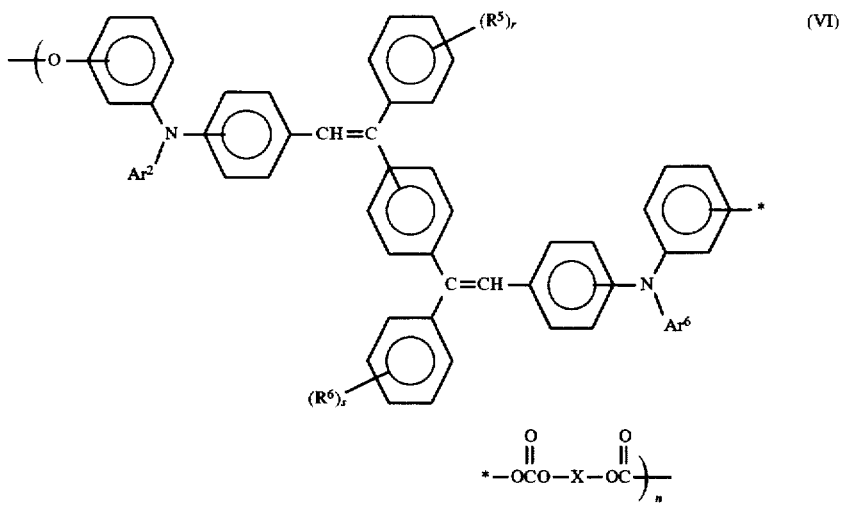

wherein n, $Ar^2$, $Ar^6$ and X are the same as those previously defined in formula (I); $R^5$ and $R^6$ are each independently an alkyl group which may have a substituent, an aromatic hydrocarbon group which may have a substituent, or a halogen atom; and r and s are each independently an integer of 0 to 4.

The second object of the present invention can also be achieved by an aromatic polycarbonate resin having a repeat unit of formula (II) and a repeat unit of formula (III), with the composition ratio of the repeat unit of formula (II) to the repeat unit of formula (III) being in the relationship of $0<k/(k+j)\leq 1$:

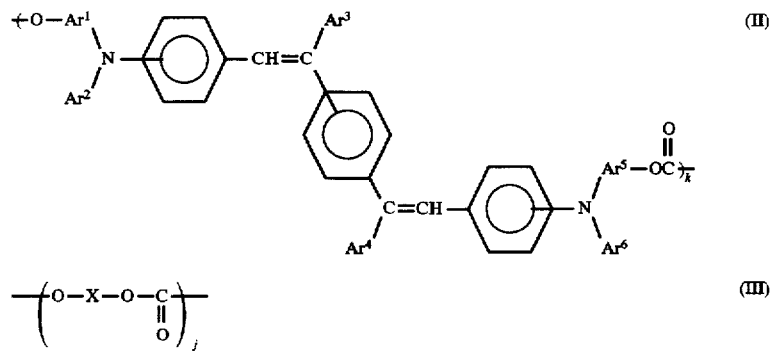

wherein k is an integer of 5 to 5000; j is an integer of 0 to 5000; $Ar^1$ and $Ar^5$ may be the same or different, and represent a bivalent aromatic hydrocarbon group which may have a substituent or a bivalent heterocyclic group which may have a substituent; $Ar^2$, $Ar^3$, $Ar^4$ and $Ar^6$ each may be the same or different, and represent an aromatic hydrocarbon group which may have a substituent, or a heterocyclic group which may have a substituent; and X is a bivalent aliphatic group, a bivalent cyclic aliphatic group, or

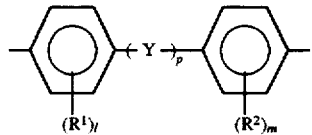

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 to 1, and when p=1, Y is a straight-chain, branched or cyclic alkylene group having 1 to 12 carbon atoms, $$-O-, \quad -S-, \quad -SO-, \quad -SO_2-,$$

$$-\overset{O}{\underset{\|}{C}}-, \quad -\overset{O}{\underset{\|}{C}}-O-Z-O-\overset{O}{\underset{\|}{C}}-, \quad \text{or}$$

$$-\left(\overset{H_2}{\underset{}{C}}\right)_a\left(\overset{R^3}{\underset{R^4}{\underset{|}{\overset{|}{Si}}}}-O\right)_b\overset{R^3}{\underset{R^4}{\underset{|}{\overset{|}{Si}}}}\left(\overset{H_2}{\underset{}{C}}\right)_a$$

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent.

In the above-mentioned aromatic polycarbonate resin, both of Ar¹ and Ar⁵ may be phenylene group in the repeat unit of formula (II).

Further, in the above-mentioned aromatic polycarbonate resin, the repeat unit of formula (II) may be represented by the following formula (VII):

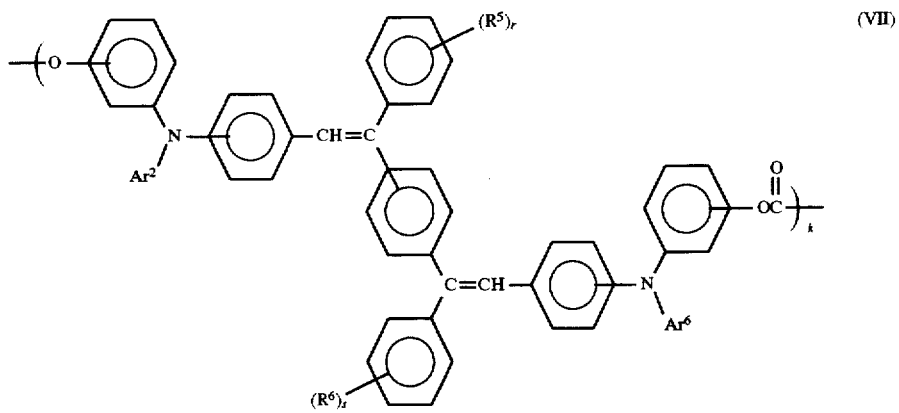

(VII)

wherein k, Ar² and Ar⁶ are the same as those previously defined in formula (II); R⁵ and R⁶ are each independently an alkyl group which may have a substituent, an aromatic hydrocarbon group which may have a substituent, or a halogen atom; and r and s are each independently an integer of 0 to 4.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic cross-sectional view of a first example of an electrophotographic photoconductor according to the present invention.

FIG. 2 is a schematic cross-sectional view of a second example of an electrophotographic photoconductor according to the present invention.

FIG. 3 is a schematic cross-sectional view of a third example of an electrophotographic photoconductor according to the present invention.

FIG. 4 is a schematic cross-sectional view of a fourth example of an electrophotographic photoconductor according to the present invention.

FIG. 5 is a schematic cross-sectional view of a fifth example of an electrophotographic photoconductor according to the present invention.

FIG. 6 is a schematic cross-sectional view of a sixth example of an electrophotographic photoconductor according to the present invention.

DESCRIPTION OF THE PREFERRED EMBODIMENTS

Figure 7:
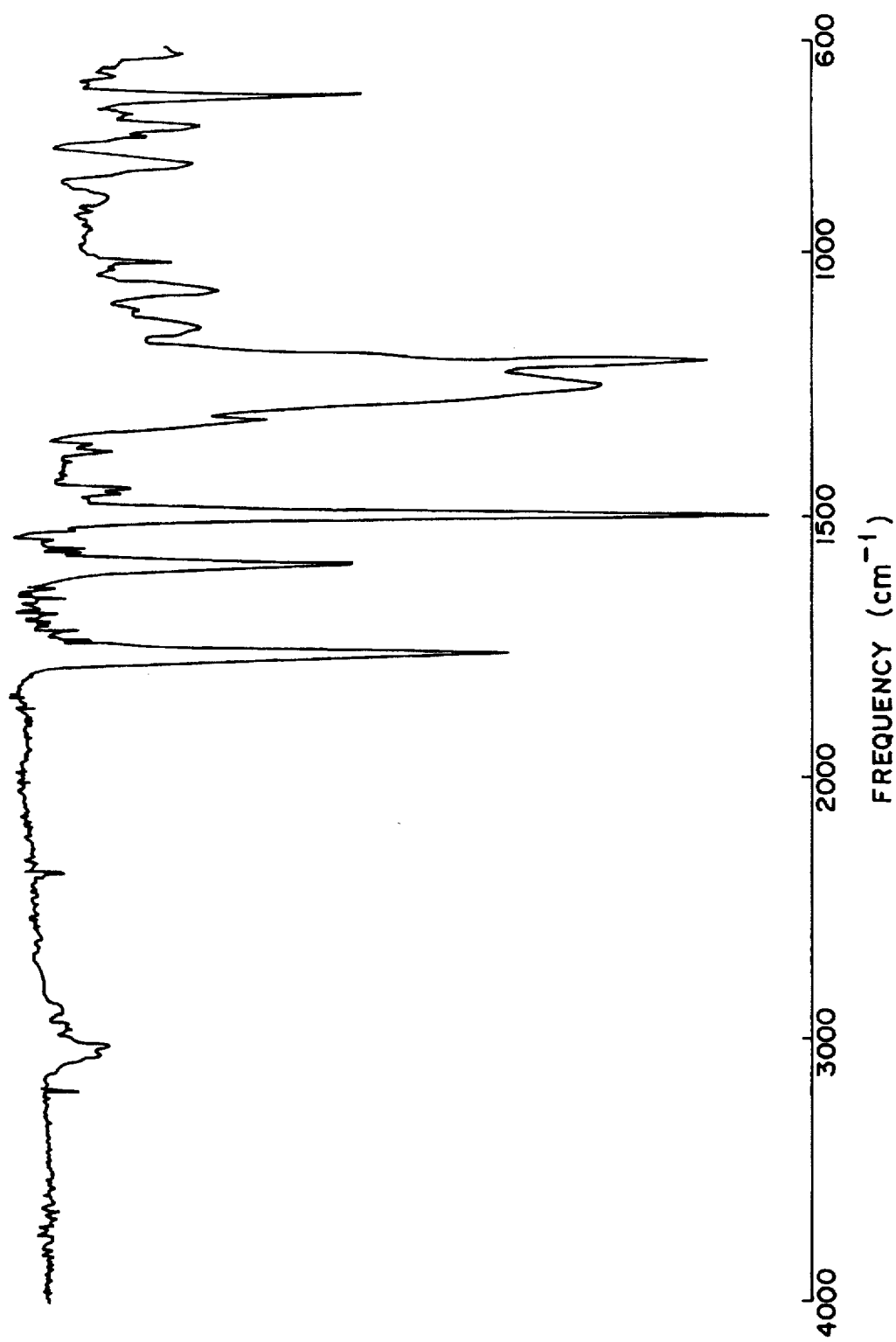
FIGS. 7 through 23 are IR spectra of aromatic polycarbonate resins respectively synthesized in Examples 1—1 to 1-17 according to the present invention, taken by use of an NaCl film.

The electrophotographic photoconductor according to the present invention comprises a photoconductive layer comprising (i) an aromatic polycarbonate resin having a repeat unit with a tertiary amino group, represented by formula (I), or (ii) an aromatic polycarbonate resin having a repeat unit with a tertiary amino group, represented by formula (II) and a repeat unit of formula (III). Those aromatic polycarbonate resins, which are novel compounds, have charge transporting properties and high mechanical strength, so that the photoconductor of the present invention can exhibit high photosensitivity and excellent durability.

Further, it is preferable that both of Ar¹ and Ar⁵ be phenylene group in the repeat unit of formula (I), which is represented by the following formula (IV):

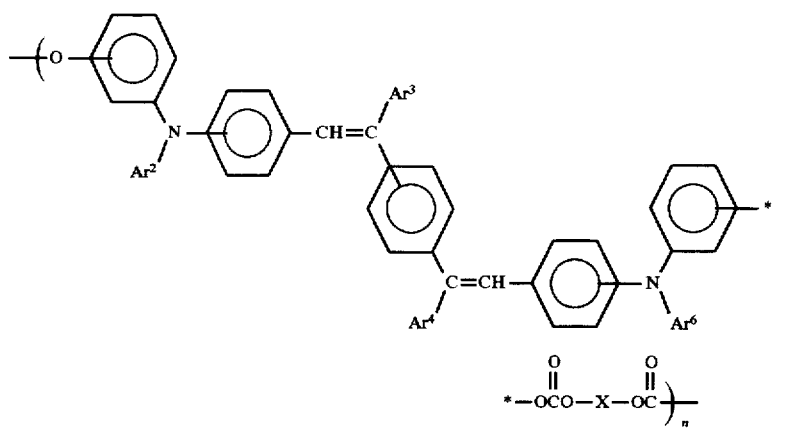

(IV)

wherein n, $Ar^2$ to $Ar^4$ and $Ar^6$, and X are the same as those previously defined in formula (I).

It is also preferable that the repeat unit of formula (I) be represented by the following formula (VI):

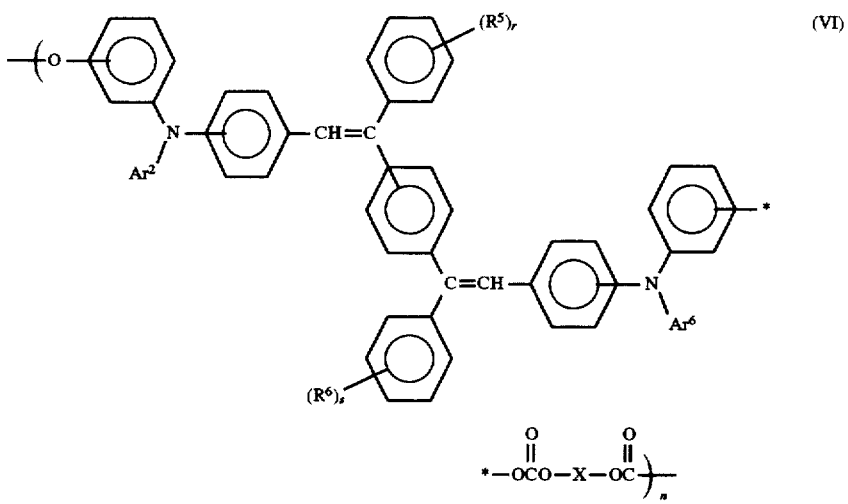

(VI)

wherein n, $Ar^2$ to $Ar^4$ and $Ar^6$, and X are the same as those previously defined in formula (I); $R^5$ and $R^6$ are each independently and alkyl group which may have a substituent, an aromatic hydrocarbon group which may have a substituent, or a halogen atom; and r and s are each independently an interger of 0 to 4.

In addition, it is preferable that both of $Ar^1$ and $Ar^5$ be phenylene group in the repeat unit of formula (II), which is represented by the following formula (V):

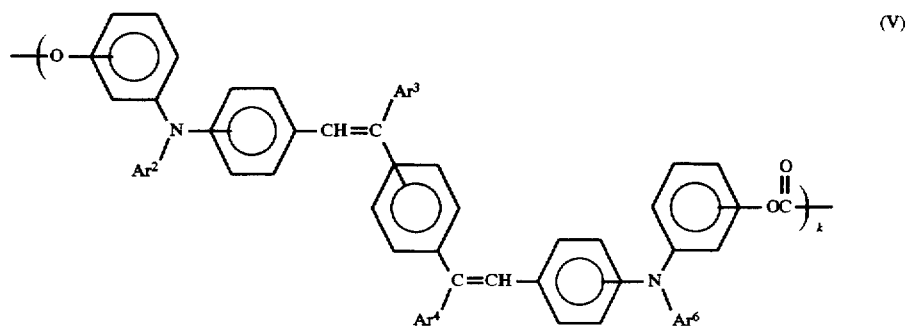

(V)

wherein k, $Ar^2$ to $Ar^4$ and $Ar^6$ are the same as those previously defined in formula (II).

It is also preferable that the repeat unit of formula (II) be represented by the following formula (VII):

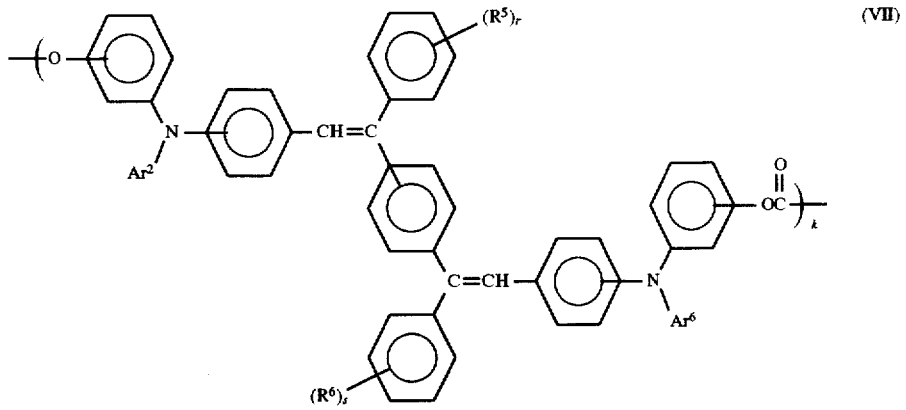

(VII)

wherein k, $Ar^2$ and $Ar^6$ are the same as those previously defined in formula (II); $R^5$ and $R^6$ are each independently an alkyl group which may have a substituent, an aromatic hydrocarbon group which may have a substituent, or a halogen atom; and r and s are each independently an integer of 0 to 4.

Those aromatic polycarbonate resins according to the present invention can be obtained by the method of synthesizing a conventional polycarbonate resin, that is, polymerization of a bisphenol and a carbonic acid derivative.

To be more specific, the aromatic polycarbonate resin comprising the repeat unit of formula (II), (V) or (VII) of the present invention can be produced by the ester interchange between a diol compound having a tertiary amino group represented by the following formula (VIII), (IX) or (X) and a bisarylcarbonate compound, or by the polymerization of the diol compound of formula (VIII), (IX) or (X) with phosgene in accordance with solution polymerization or interfacial polymerization:

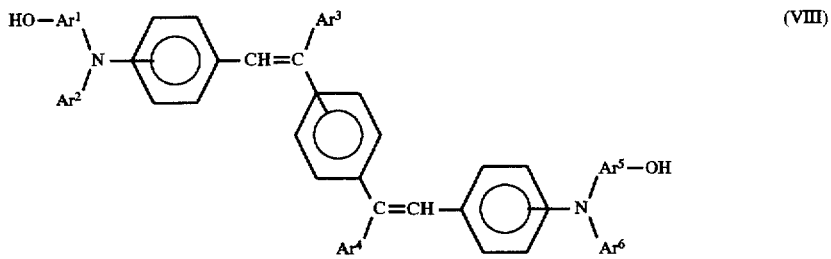

(VIII)

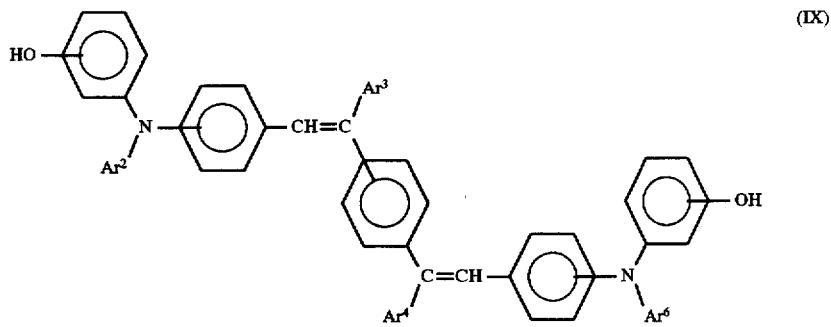

(IX)

-continued

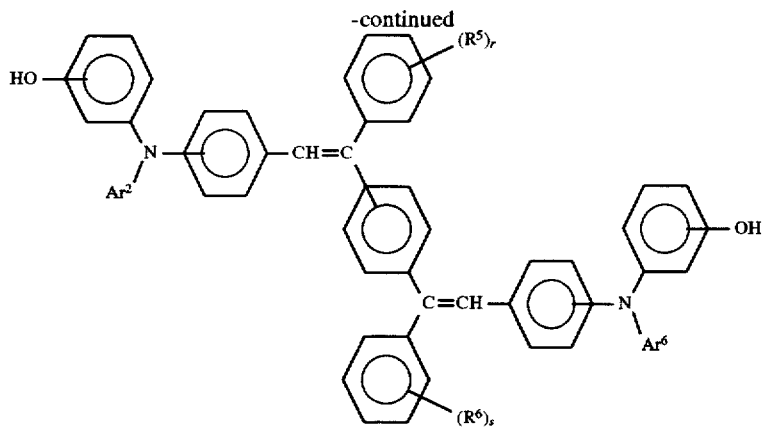

(X)

wherein $Ar^1$ to $Ar^6$, $R^5$, $R^6$, r, s and X are the same as those previously defined in formulae (I) and (VI).

When a diol compound of the following formula (XI) is employed in combination with the diol compound of formula (VIII), (IX) or (X) in the course of the polymerization with the phosgene, there can be obtained the aromatic polycarbonate resin of the present invention comprising the repeat unit of formula (II) having a tertiary amino group and the repeat unit of formula (III), or the aromatic polycarbonate resin of the present invention comprising the repeat unit of formula (V) having a tertiary amino group and the repeat unit of formula (III), or the aromatic polycarbonate resin of the present invention comprising the repeat unit of formula (VII) having a tertiary amino group and the repeat unit of formula (III):

OH—X—OH    (XI)

wherein X is the same as that previously defined in formula (III).

By such a synthesis method, the aromatic polycarbonate resin provided with the desired characteristics can be obtained. Further, the composition ratio of the repeat unit of formula (II) to the repeat unit of formula (III), or that of the repeat unit of formula (V) or (VII) to the repeat unit of formula (III) can be selected within a wide range in light of the desired characteristics of the obtained aromatic polycarbonate resin.

The aromatic polycarbonate resin of the present invention comprising the repeat unit of formula (I), (IV) or (VI) having a tertiary amino group can be obtained by polymerizing the diol compound of formula (VIII), (IX) or (X) having a tertiary amino group with a bischloroformate compound derived from the diol compound of formula (XI) in accordance with solution polymerization or interfacial polymerization. Alternatively, the above-mentioned aromatic polycarbonate resin can also be obtained by polymerizing a bischloroformate derived from the diol compound of formula (VIII), (IX) or (X) having a tertiary amino group with the diol compound of formula (XI).

According to the ester interchange method, a diol compound and a bisarylcarbonate compound are mixed in the presence of an inert gas, and the polymerization reaction is generally carried out at temperature in the range of 120° to 350° C. under reduced pressure. The pressure in the reaction system is stepwise reduced to 1 mmHg or less in order to distill away the phenols generated during the reaction from the reaction system. The reaction is commonly terminated in about one to 4 hours. When necessary, a molecular weight modifier and an antioxidant may be added to the reaction system. As the bisarylcarbonate compound, diphenyl carbonate, di-p-tolyl carbonate, phenyl-p-tolyl carbonate, di-p-chlorophenyl carbonate and dinaphthyl carbonate can be employed.

The polymerization of a diol compound with the phosgene is commonly carried out in the presence of an agent for deacidifying and a solvent. In this case, hydroxides of alkali metals such as sodium hydroxide and potassium hydroxide, and pyridine can be used as the deacidifying agents in the above reaction. As the solvent, halogenated hydrocarbon solvents such as dichloromethane and chlorobenzene can be employed. In addition, a catalyst such as tertiary amine or a quaternary ammonium salt may be used to accelerate the reaction speed. Furthermore, it is also desirable to use phenol or p-tert-butylphenol as a molecular weight modifier. The polymerization reaction is generally carried out at temperature in the range of 0° to 40° C. In this case, the polymerization is terminated in several minutes to 5 hours. It is desirable to maintain the reaction system to pH 10 or more.

In the case of the polymerization of a diol compound with a bischloroformate compound, the diol is dissolved in a proper solvent to prepare a solution of the diol compound, and a deacidifying agent and the bischloroformate compound are added to the above prepared diol solution. In this case, tertiary amine compounds such as trimethylamine, triethylamine and tripropylamine, and pyridine can be used as the deacidifying agents. Examples of the solvent for use in the above-mentioned polymerization reaction are halogenated hydrocarbon solvents such as dichloromethane, dichloroethane, trichloroethane, tetrachloroethane, trichloroethylene, and chloroform; and cyclic ethers such as tetrahydrofuran and dioxane. In addition, it is desirable to use phenol or p-tert-butylphenol as a molecular weight modifier. The reaction temperature is generally in the range of 0° to 40° C. In this case, the polymerization is generally terminated in several minutes to 5 hours.

To the aromatic polycarbonate resin produced by the previously mentioned methods, various additives such as an antioxidant, a light stabilizer, a thermal stabilizer, a lubricant and a plasticizer can be added when necessary.

As previously mentioned, the aromatic polycarbonate resin according to the present invention is a homopolymer comprising a repeat unit of (II), (V) or (VII), an alternating copolymer comprising the repeat unit of formula (I), (IV) or (VI), or a random copolymer or block copolymer comprising the repeat unit of (II), (V) or (VII) and the repeat unit of (III).

It is preferable that the aromatic polycarbonate resin according to the present invention thus obtained have a number-average molecular weight of 1,000 to 1,000,000, more preferably in the range of 5,000 to 500,000 when expressed by the styrene-reduced value.

The above-mentioned diol compound having a tertiary amine group represented by the formula (VIII), (IX) or (X), which is an intermediate for preparation of the aromatic polycarbonate resin according to the present invention, will now be explained in detail.

In the present invention, there can be employed a dihydroxyl-group-containing diamine compound represented by the following formula (XII), which is a novel compound, as the diol compound having a tertiary amine group:

Specific examples of the above alkyl group include methyl group, ethyl group, n-propyl group, i-propyl group, tert-butyl group, sec-butyl group, n-butyl group, i-butyl group, trifluoromethyl group, 2-cyanoethyl group, benzyl group, 4-chlorobenzyl group, and 4-methylbenzyl group.

Examples of the aromatic hydrocarbon group represented by $R^1$ to $R^6$ are phenyl group, styryl group, β-phenylstyryl group, biphenylyl group, terphenylyl group, naphthyl group, anthryl group, pyrenyl group, fluorenyl group, 9,9-dimethyl-2-fluorenyl group, azulenyl group, triphenylenyl group, and chrysenyl group. Those aromatic hydrocarbon groups may have a substituent such as a lower alkyl group, a lower alkoxyl group, or a halogen atom.

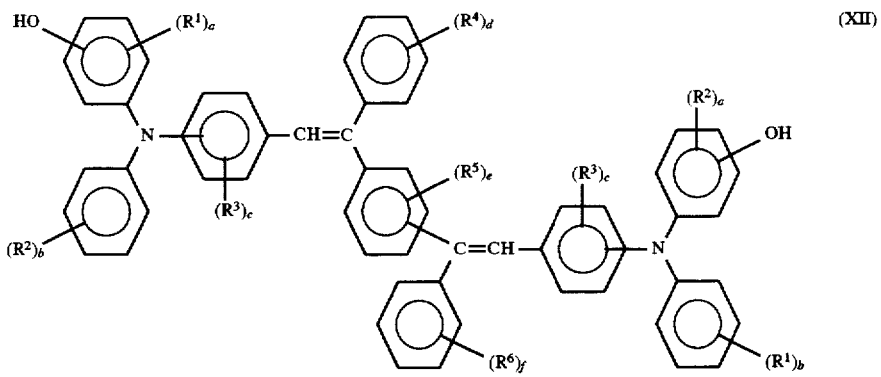

(XII)

wherein $R^1$ to $R^6$, which may be the same or different, are each independently an alkyl group which may have a substituent, a halogen atom, an aromatic hydrocarbon group which may have a substituent, or a heterocyclic group which may have a substituent; a, c and e are each independently an integer of 0 to 4; and b, d and f are each independently an integer of 0 to 5.

Namely, such a dihydroxyl-group-containing diamine compound can be used as an intermediate for preparation of the aromatic polycarbonate resin according to the present invention.

In the formula (XII), the alkyl group represented by $R^1$ to $R^6$ is a straight-chain or branched alkyl group having 1 to 5 carbon atoms. The above alkyl group may have a substituent such as a fluorine atom, cyano group, or a phenyl group which may have a substituent selected from the group consisting of a halogen atom and an alkyl group having 1 to 5 carbon atoms.

When any of $R^1$ to $R^6$ represents a halogen atom, fluorine, chlorine, bromine and iodine can be employed.

The dihydroxyl-group-containing diamine compound of formula (XII) can be synthesized by the conventional method in accordance with the reaction schemes shown below.

A corresponding aldehyde compound having an alkoxyl group, represented by formula (XIII), is allowed to react with a corresponding bis(phosphonate) compound of formula (XIV) by the modified Wittig reaction, so that a distyrylbenzene compound of formula (XV) can be obtained.

Furthermore, cleavage of an ether linkage of the alkoxyl group is carried out in the distyrylbenzene compound of formula (xv), so that a dihydroxyl-group-containing diamine compound of formula (XII) can be obtained.

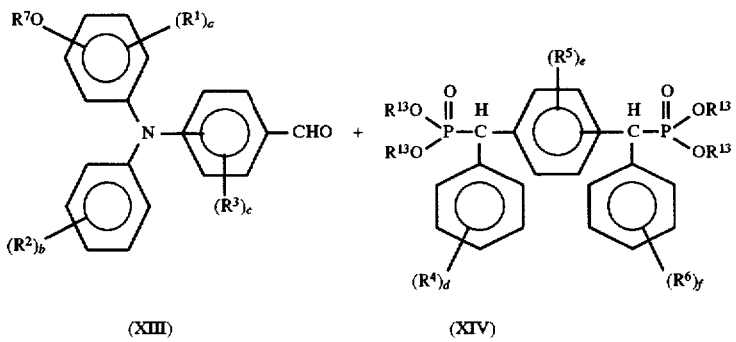

(XIII)  (XIV)

Modified Wittig Reaction

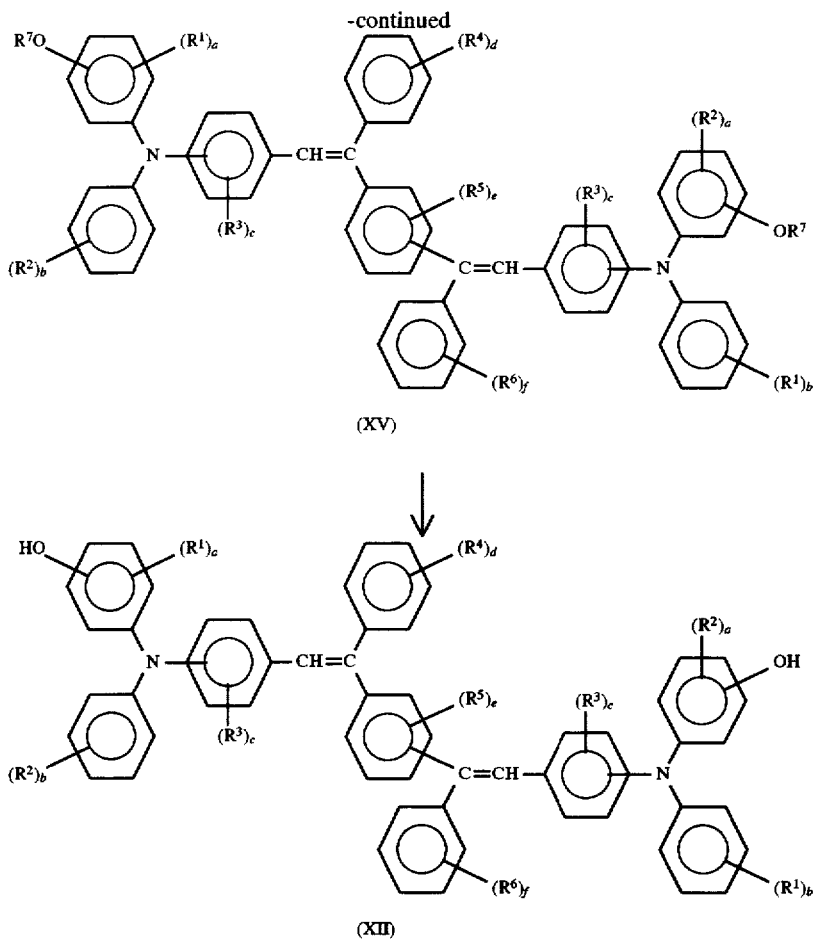

wherein $R^1$ to $R^6$, and a to f are the same as those previously defined in formula (XII); and $R^7$ and $R^8$ are each independently a lower alkyl group.

In this case, potassium-t-butoxide, sodium hydroxide, potassium hydroxide, sodium amide, sodium methylate, and potassium methylate can be used as the basic catalysts.

Examples of the reaction solvent used in the above-mentioned reaction are methanol, ethanol, isopropanol, butanol, 2-methoxyethanol, 1,2-dimethoxyethane, bis(2-methoxyethyl)ether, dioxane, tetrahydrofuran, toluene, xylene, dimethyl sulfoxide, N,N-dimethylformamide, N-methylpyrrolidone and 1,3-dimethyl-2-imidazolidinone. Of these solvents, a polar solvent such as N,N-dimethylformamide or dimethyl sulfoxide is preferably employed.

The reaction temperature may be determined within a wide range depending on (1) the stability of the employed solvent with respect to the employed basic catalyst, (2) the reactivity of the condensed components, and (3) the reactivity of the employed basic catalyst as a condensation agent in the solvent. For instance, when a polar solvent is employed, the reaction temperature is in the range of room temperature to 100° C., preferably in the range of room temperature to 80° C. The reaction temperature may be further increased when it is desired to curtail the reaction time, or the activity of a condensation agent to be employed is low.

The cleavage of the ether linkage of the alkoxyl group in the distyrylbenzene compound of formula (XV) can be carried out by using sodium thioethoxide or trimethylsilyl iodide.

When the above-mentioned sodium thioethoxide is employed for the cleavage of the ether linkage, a solvent such as N,N-dimethylformamide or triamide of hexamethyl phosphoric acid is preferably employed. The reaction temperature is in the range of room temperature to 180° C., preferably in the range of 10° to 150° C. The reaction time varies with the reactivity of the alkoxyl group, so that the reaction may be terminated in about 20 minutes or it may take 10 hours or more. The cleavage of the ether linkage can be carried out similarly by using sodium thiomethoxide instead of sodium thioethoxide.

When trimethylsilyl iodide is employed for the cleavage of the ether linkage, a solvent such as dichloromethane, chloroform, carbon tetrachloride, sulfolane or acetonitrile is preferably employed. The reaction temperature is in the range of room temperature to 100° C. In stead of trimethylsilyl iodide, trimethylsilyl chloride and sodium iodide may be employed.

Furthermore, the cleavage of the ether linkage can also be carried out using a reagent such as hydriodic acid.

The bis(phosphonate) compound of formula (XIV) can be readily produced by allowing a corresponding halogen compound to react with trialkyl phosphite under the application of heat thereto without any solvent, or in an organic solvent such as toluene, xylene or N,N-dimethylformamide.

A variety of materials such as a polycarbonate resin, polyester resin, polyurethane resin and epoxy resin can be obtained by deriving from the hydroxyl group of the above-mentioned dihydroxyl-group-containing diamine compound, so that the dihydroxyl-group-containing diamine compound is considered to be useful as an intermediate for the preparation of those materials. In particular, an organic polymer such as a polycarbonate resin prepared from the above-mentioned dihydroxyl-group-containing diamine compound is useful as the organic photoconductive material.

The polycarbonate resin according to the present invention will now be explained in detail.

In formulae (I) and (II), $Ar^1$ and $Ar^5$ are each independently a bivalent group of an aromatic hydrocarbon group or a heterocyclic group, as previously mentioned.

When $Ar^1$ and $Ar^5$ each represent a bivalent aromatic hydrocarbon group, there can be employed bivalent groups derived from the following aromatic hydrocarbon groups: benzene, naphthalene, biphenyl terphenyl, pyrene, fluorene, and 9,9-dimethylfluorene.

When $Ar^1$ and $Ar^5$ each represent a bivalent heterocyclic group, there can be employed bivalent groups derived from the following heterocyclic groups:

thiophene, benzothiophene, furan, benzofuran and carbazole. Further, there can be employed diphenyl ether group and diphenyl thioether group in which two aryl groups are bonded via oxygen and sulfur.

The above-mentioned bivalent aromatic hydrocarbon group and heterocyclic group may have a substituent such as a halogen atom, an alkyl group, or an alkoxyl group as shown below:

(1) A halogen atom; fluorine atom, chlorine atom and bromine atom.

(2) An alkyl group, preferably a straight chain or branched alkyl group having 1 to 12 carbon atoms, more preferably having 1 to 8 carbon atoms, further preferably having 1 to 4 carbon atoms. The alkyl group may have a substituent such as a fluorine atom, hydroxyl group, cyano group, an alkoxyl group having 1 to 4 carbon atoms, or a phenyl group which may have a substituent selected from the group consisting of a halogen atom, an alkyl group having 1 to 4 carbon atoms, and an alkoxyl group having 1 to 4 carbon atoms.

Specific examples of such an alkyl group are methyl group, ethyl group, n-propyl group, i-propyl group, t-butyl group, s-butyl group, n-butyl group, i-butyl group, trifluoromethyl group, 2-hydroxyethyl group, 2-cyanoethyl group, 2-ethoxyethyl group, 2-methoxyethyl group, benzyl group, 4-chlorobenzyl group, 4-methylbenzyl group, and 4-methoxybenzyl group.

(3) An alkoxyl group (—$OR^7$) in which $R^7$ is the same alkyl group as previously defined in (2).

Specific examples of such an alkoxyl group are methoxy group, ethoxy group, n-propoxy group, i-propoxy group, t-butoxy group, n-butoxy group, s-butoxy group, i-butoxy group, 2-hydroxyethoxy group, 2-cyanoethoxy group, benzyloxy group, 4-methylbenzyloxy group, and trifluoromethoxy group.

In formulae (I), (II), (IV), (V), (VI) and (VII), $Ar^2$, $Ar^3$, $Ar^4$ and $Ar^6$ are each an aromatic hydrocarbon group or a heterocyclic group, as previously mentioned.

Examples of the aromatic hydrocarbon group represented by $Ar^2$, $Ar^3$, $Ar^4$ and $Ar^6$ are phenyl group, naphthyl group, biphenylyl group, terphenylyl group, pyrenyl group, fluorenyl group, 9,9-dimethyl-2-fluorenyl group, and 5H-dibenzo [a,d]cycloheptenyl group.

Examples of the heterocyclic group represented by $Ar^2$, $Ar^3$, $Ar^4$ and $Ar^6$ are thienyl group, benzothienyl group, furyl group, benzofuranyl group and carbazolyl group.

The above-mentioned aromatic hydrocarbon group and heterocyclic group may have a substituent such as a halogen atom, an alkyl group, or an alkoxyl group. In this case, the same halogen atoms, alkyl groups, and alkoxyl groups as mentioned above can be employed.

$R^1$ and $R^2$ in each formula, and $R^5$ and $R^6$ in formulae (VI) and (VII) are each independently an alkyl group which may have a substituent, an aromatic hydrocarbon group which may have a substituent, or a halogen atom. $R^3$ and $R^4$ each represent an alkyl group which may have a substituent, or an aromatic hydrocarbon group which may have a substituent. When each of $R^1$ to $R^5$ represents an aromatic hydrocarbon group, a substituted or unsubstituted phenyl group or a substituted or unsubstituted biphenylyl group can be employed. With respect to the alkyl group and the halogen atom, the same examples as mentioned above can be employed.

Examples of the diol compound represented by formula (XI) include aliphatic diols such as 1,3-propanediol, 1,4-butanediol, 1,5-pentanediol, 1,6-hexanediol, 1,8-octanediol, 1,10-decanediol, 2-methyl-1,3-propanediol, 2,2-dimethyl-1, 3-propanediol, 2-ethyl-1,3-propanediol, diethylene glycol, triethylene glycol, polyethylene glycol and polytetramethylene ether glycol; and cyclic aliphatic diols such as 1,4-cyclohexanediol, 1,3-cyclohexanediol and cyclohexane-1,4-dimethanol.

Examples of the diol compound having an aromatic ring are as follows: 4,4'-dihydroxydiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane, 2,2-bis(3-methyl-4-hydroxyphenyl)propane, 1,1-bis(4-hydroxyphenyl) cyclohexane, 1,1-bis(4-hydroxy-phenyl)cyclopentane, 2,2-bis(3-phenyl-4-hydroxyphenyl)propane, 2,2-bis(3-isopropyl-4-hydroxyphenyl)propane, 2,2-bis(4-hydroxyphenyl)butane, 2,2-bis(3,5-dimethyl-4-hydroxyphenyl)propane, 2,2-bis(3,5-dibromo-4-hydroxyphenyl)propane, 4,4'-dihydroxydiphenylsulfone, 4,4'-dihydroxydiphenyl-sulfoxide, 4,4'-dihydroxydiphenylsulfide, 3,3'-dimethyl-4,4'-dihydroxydiphenylsulfide, 4,4'-dihydroxy-diphenyloxide, 2,2-bis(4-hydroxyphenyl)hexafluoropropane, 9,9-bis(4-hydroxyphenyl)fluorene, 9,9-bis(4-hydroxyphenyl) xanthene, ethylene glycol-bis(4-hydroxybenzoate), diethylene glycol-bis(4-hydroxybenzoate), triethylene glycol-bis (4-hydroxybenzoate), 1,3-bis(4-hydroxyphenyl)-tetramethyl disiloxane, and phenol-modified silicone oil.

In the photoconductors according to the present invention, at least one of the previously mentioned aromatic polycarbonate resins is contained in the photoconductive layers 2, 2a, 2b, 2c, 2d, and 2e. The aromatic polycarbonate resin can be employed in different ways, for example, as shown in FIGS. 1 through 6.

In the photoconductor as shown in FIG. 1, a photoconductive layer 2 is formed on an electroconductive support 1, which photoconductive layer 2 comprises an aromatic polycarbonate resin of the present invention and a sensitizing dye, with the addition thereto of a binder agent (binder resin) when necessary. In this photoconductor, the aromatic polycarbonate resin works as a photoconductive material, through which charge carriers which are necessary for the light decay of the photoconductor are generated and transported. However, the aromatic polycarbonate resin itself scarcely absorbs light in the visible light range and, therefore, it is necessary to add a sensitizing dye which absorbs light in the visible light range in order to form latent electrostatic images by use of visible light.

Referring to FIG. 2, there is shown an enlarged cross-sectional view of another embodiment of an electrophotographic photoconductor according to the present invention. In this photoconductor, there is formed a photoconductive layer 2a on an electroconductive support 1. The photoconductive layer 2a comprises a charge transport medium 4 comprising (i) an aromatic polycarbonate resin of the present invention, optionally in combination with a binder agent, and (ii) a charge generation material 3 dispersed in the charge transport medium 4. In this embodiment, the aromatic polycarbonate resin (or a mixture of the aromatic polycarbonate resin and the binder agent) constitutes the charge transport medium 4. The charge generation material 3, which is, for example, an inorganic material or an organic pigment, generates charge carriers. The charge transport medium 4 accepts the charge carriers generated by the charge generation material 3 and transports those charge carriers.

In this electrophotographic photoconductor, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4 and reach the surface of the charge generation material 3. Since the aromatic polycarbonate resin comprising the repeat unit of formula (I) do not substantially absorb light in the visible range, it can work effectively as a charge transport material when used with the charge generation material 3 which absorbs the light in the visible region and generates charge carriers. The charge transport medium 4 may further comprise a low-molecular weight charge transport material in combination.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2b comprising a charge generation layer 5 containing the charge generation material 3, and a charge transport layer 4 comprising an aromatic polycarbonate resin of the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin, optionally in combination with a binder agent. Furthermore, in order to increase the efficiency of generating the charge carriers, the charge generation layer 5 may further comprise the aromatic polycarbonate resin of the present invention, and the photoconductive layer 2b including the charge generation layer 5 and the charge transport layer 4 may further comprise a low-molecular weight charge transport material. This can be applied to the embodiments of FIGS. 4 to 6 to be described later.

In the electrophotographic photoconductor of FIG. 3, a protective layer 6 may be provided on the charge transport layer 4 as shown in FIG. 4. The protective layer 6 may comprise the aromatic polycarbonate resin of the present invention, optionally in combination with a binder agent. In such a case, it is effective that the protective layer 6 be provided on a charge transport layer in which a low-molecular weight charge transport material is dispersed. The protective layer 6 may be provided on the photoconductive layer 2a of the photoconductor as shown in FIG. 2.

Referring to FIG. 5, there is shown still another embodiment of an electrophotographic photoconductor according to the present invention. In this figure, the overlaying order of the charge generation layer 5 and the charge transport layer 4 comprising the aromatic polycarbonate resin is reversed in view of the electrophotographic photoconductor as shown in FIG. 3. The mechanism of the generation and transportation of charge carriers is substantially the same as that of the photoconductor shown in FIG. 3.

In the above photoconductor of FIG. 5, a protective layer 6 may be formed on the charge generation layer 5 as shown in FIG. 6 in light of the mechanical strength of the photoconductor.

When the electrophotographic photoconductor according to the present invention as shown in FIG. 1 is prepared, at least one aromatic polycarbonate resin of the present invention is dissolved in a solvent, with the addition thereto of a binder agent when necessary. To the thus prepared solution, a sensitizing dye is added, so that a photoconductive layer coating liquid is prepared. The thus prepared photoconductive layer coating liquid is coated on an electroconductive support 1 and dried, so that a photoconductive layer 2 is formed on the electroconductive support 1.

It is preferable that the thickness of the photoconductive layer 2 be in the range of 3 to 50 µm, more preferably in the range of 5 to 20 µm. It is preferable that the amount of the aromatic polycarbonate resin of the present invention be in the range of 30 to 100 wt. % of the total weight of the photoconductive layer 2.

It is preferable that the amount of the sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B, Rhodamine 6G, Rhodamine G Extra, Eosin S, Erythrosin, Rose Bengale and Fluoresceine; thiazine dyes such as Methylene Blue; and cyanine dyes such as cyanin.

The electrophotographic photoconductor shown in FIG. 2 can be obtained by the following method:

The finely-divided particles of the charge generation material 3 are dispersed in a solution in which at least one aromatic polycarbonate resin of the present invention, or a mixture of the aromatic polycarbonate resin and the binder agent is dissolved, so that a coating liquid for the photoconductive layer 2a is prepared. The coating liquid thus prepared is coated on the electroconductive support 1 and then dried, whereby the photoconductive layer 2a is provided on the electroconductive support 1.

It is preferable that the thickness of the photoconductive layer 2a be in the range of 3 to 50 µm, more preferably in the range of 5 to 20 µm. It is preferable that the amount of the aromatic polycarbonate resin for use in the photoconductive layer 2a be in the range of 40 to 100 wt. % of the total weight of the photoconductive layer 2a.

It is preferable that the amount of the charge generation material 3 for use in the photoconductive layer 2a be in the range of 0.1 to 50 wt. %, more preferably in the range of 1 to 20 wt. % of the total weight of the photoconductive layer 2a.

Specific examples of the charge generation material 3 for use in the present invention are as follows: inorganic materials such as selenium, selenium-tellurium, cadmium sulfide, cadmium sulfide-selenium and α-silicone; and organic pigments such as an azo pigment, for example, C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); a phthalocyanine pigment such as C.I. Pigment Blue 16 (C.I. 74100); an indigo pigment such as C.I. Vat Brown 5 (C.I. 73410) and C.I. Vat Dye (C.I. 73030); and a perylene pigment such as Algol Scarlet B and Indanthrene Scarlet R (made by Bayer Co., Ltd.). These charge generation materials may be used alone or in combination.

The electrophotographic photoconductor shown in FIG. 3 can be obtained by the following method:

To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for the charge generation layer 5 is prepared. The thus prepared coating liquid is coated on the electroconductive support 1 and dried, whereby the charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic polycarbonate resin of the present invention, optionally in combination with a binder agent is dissolved is coated and dried, so that the charge transport layer 4 is formed on the charge generation layer 5. In the charge generation layer 5, the same charge generation materials as employed in the above-mentioned photoconductive layer 2a can be used.

The thickness of the charge generation layer 5 is 5 μm or less, preferably 2 μm or less. It is preferable that the thickness of the charge transport layer 4 be in the range of 3 to 50 μm, more preferably in the range of 5 to 20 μm.

When the charge generation layer 5 is provided on the electroconductive support 1 by coating the dispersion in which finely-divided particles of the charge generation material 3 are dispersed in an appropriate solvent, it is preferable that the amount of finely divided particles of the charge generation material 3 for use in the charge generation layer 5 be in the range of 10 to 100 wt. %, more preferably in the range of about 50 to 100 wt. % of the total weight of the charge generation layer 5. It is preferable that the amount of the aromatic polycarbonate resin of the present invention for use in the charge transport layer 4 be in the range of 40 to 100 wt. % of the total weight of the charge transport layer 4.

The photoconductive layer 2b of the photoconductor shown in FIG. 3 may comprise a low-molecular-weight charge transporting material as previously mentioned.

Examples of the low-molecular-weight charge transporting material for use in the present invention are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

To prepare the photoconductor shown in FIG. 4, a coating liquid for the protective layer 6 is prepared by dissolving the aromatic polycarbonate resin of the present invention, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 μm. It is preferable that the amount of the aromatic polycarbonate resin of the present invention for use in the protective layer 6 be in the range of 40 to 100 wt. % of the total weight of the protective layer 6.

The electrophotographic photoconductor shown in FIG. 5 can be obtained by the following method:

The aromatic polycarbonate resin of the present invention, optionally in combination with the binder agent, is dissolved in a solvent to prepare a coating liquid for the charge transport layer 4. The thus prepared coating liquid is coated on the electroconductive support 1 and dried, whereby the charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated by spray coating and dried, so that the charge generation layer 5 is provided on the charge transport layer 4. The amount ratios of the components contained in the charge generation layer 5 and charge transport layer 4 are the same as those previously described in FIG. 3.

The electrophotographic photoconductor shown in FIG. 6 can be fabricated by forming a protective layer 6 on the charge generation layer 5 of the photoconductor shown in FIG. 5.

To obtain any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins having insulating properties and adhesion properties can be employed.

Some plasticizers may be added to the above-mentioned binder agents, when necessary. Examples of the plasticizer for use in the present invention are halogenated paraffin, dimethylnaphthalene and dibutyl phthalate. Further, a variety of additives such as an antioxidant, a light stabilizer, a thermal stabilizer and a lubricant may also be contained in the binder agents when necessary.

Furthermore, in the electrophotographic photoconductor according to the present invention, an intermediate layer such as an adhesive layer or a barrier layer may be interposed between the electroconductive support and the photoconductive layer when necessary. Examples of the material for use in the intermediate layer are polyamide, nitrocellulose and aluminum oxide. It is preferable that the thickness of the intermediate layer be 1 μm or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

PREPARATION EXAMPLE 1

[Preparation of dihydroxyl-group-containing diamine compound No. 1, i.e. N',N"-diphenyl-N',N"-bis(4-hydroxyphenyl)-1,4-bis(α-phenylstyryl)benzene-4',4"-diamine]

55.77 g (0.11 mol) of 4-formyl-4'-methoxytriphenylamine represented by the following formula (1) and 80.08 g (0.264 mol) of a bis(phosphonate) compound represented by the following formula (2) were dissolved in 1000 ml of DMF, and the mixture was cooled to 15° C.

To the above prepared solution, 36.96 g (0.33 mol) of potassium tert-butoxide (t-BuOK) was added over a period of 80 minutes, with the reaction mixture being maintained at a temperature in the range of 15° to 25° C.

After stirring for 3.0 hours, the reaction mixture was poured into 3000 ml of water. The separating crystals were removed from the mixture by filtration, washed with water, and dried under reduced pressure, so that a product was obtained. The thus obtained product was chromatographed on a silica gel column using a developing solvent consisting of toluene and n-hexane at a mixing ratio of 1:1, whereby 83.35 g of a distyrylbenzene compound represented by formula (3) was obtained in a yield of 91.40%. The above-mentioned distyrylbenzene compound was amorphous.

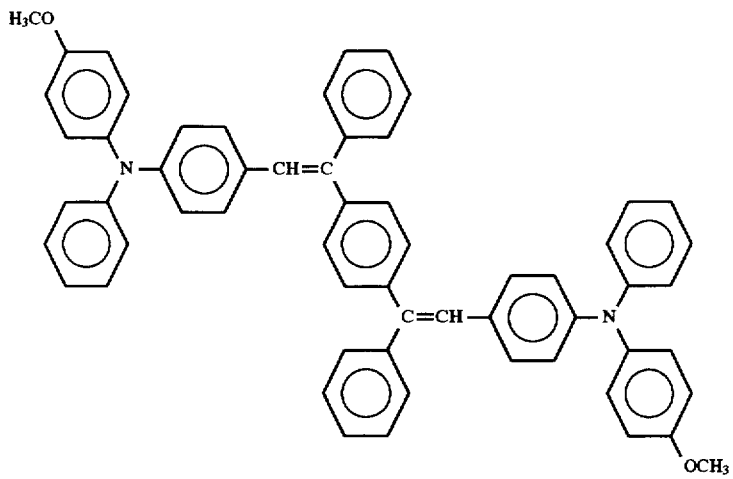

(3)

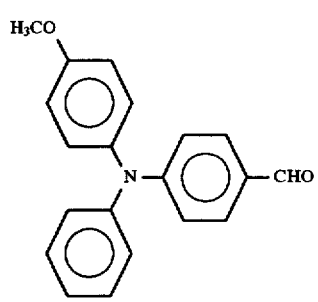

(1)

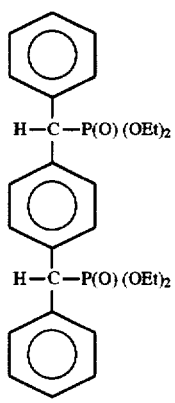

(2)

The results of the elemental analysis of this product are as follows:

| | Elemental analysis: | | |
|---|---|---|---|
| | % C | % H | % N |
| Found | 86.91 | 5.73 | 3.21 |
| Calcd. | 86.93 | 5.84 | 3.38 |

Figure 24:
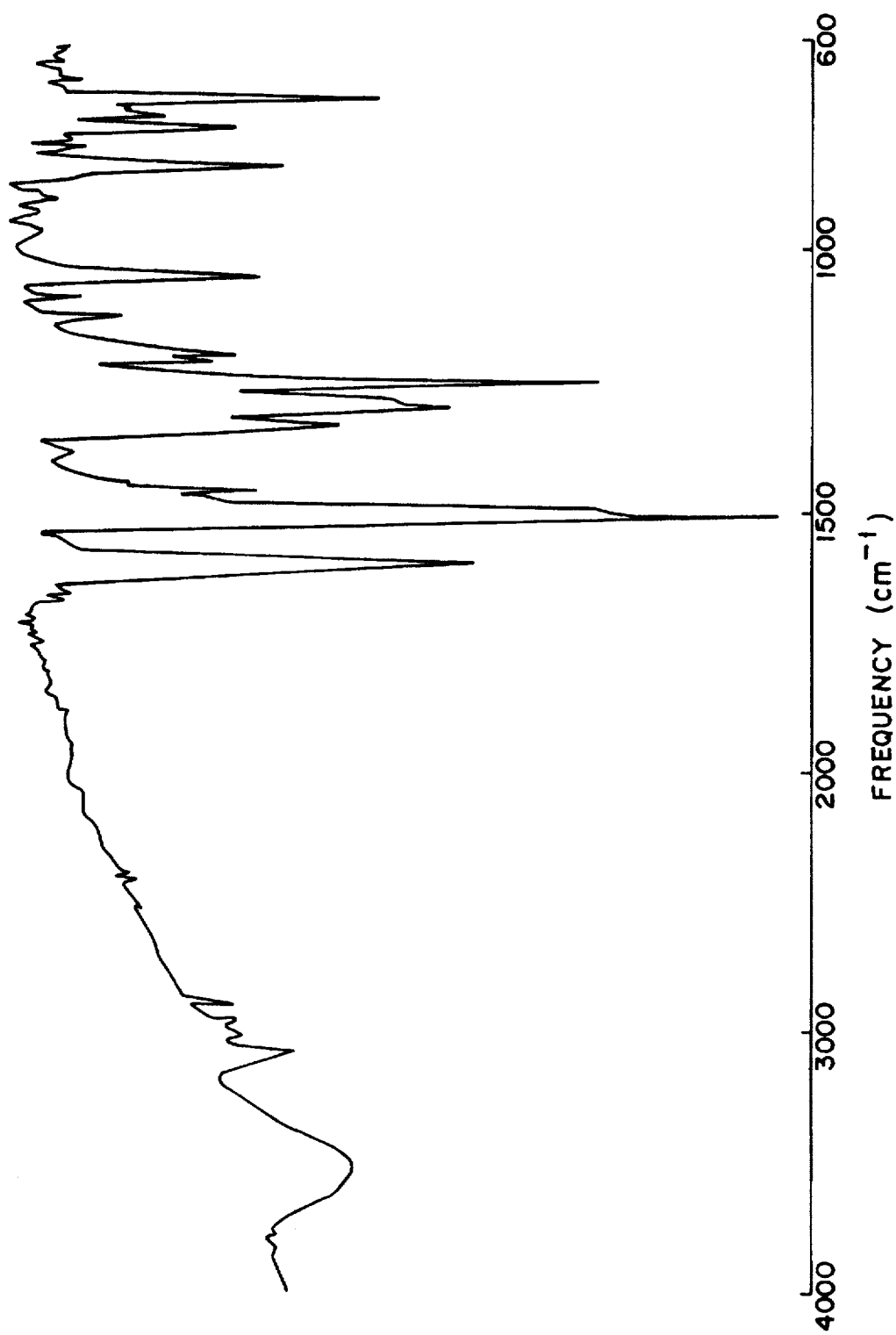
FIG. 24 is an IR spectrum of a distyrylbenzene compound for the preparation of a dihydroxyl-group-containing diamine compound No. 1 obtained in Preparation Example 1, taken by use of a KBr tablet.

An infrared spectrum of the distyrylbenzene compound of formula (3), taken by use of a KBr tablet, is shown in FIG. 24.

49.74 g (0.06 mol) of the thus obtained distyrylbenzene compound and 30 g (0.36 mol) of sodium thioethoxide were added to 500 ml of dry DMF, and the above prepared mixture was stirred with the application of heat thereto. The reaction mixture was refluxed for an additional 4.5 hours. Thus, the reaction was terminated. After the reaction mixture was cooled, 30 ml of concentrated hydrochloric acid was added to the reaction mixture. The thus obtained reaction mixture was washed with water and dried over magnesium sulfate, and then, the solvent was distilled away from the reaction mixture. The obtained crude product was chromatographed on a silica gel column using a developing solvent consisting of toluene and ethyl acetate at a mixing ratio of 20:3, whereby 45.62 g of a dihydroxyl-group-containing diamine compound No. 1 represented by formula (4) was obtained in a yield of 94.92%. The above-mentioned dihydroxyl-group-containing diamine compound was amorphous.

[Dihydroxyl-group-containing diamine compound No. 1]

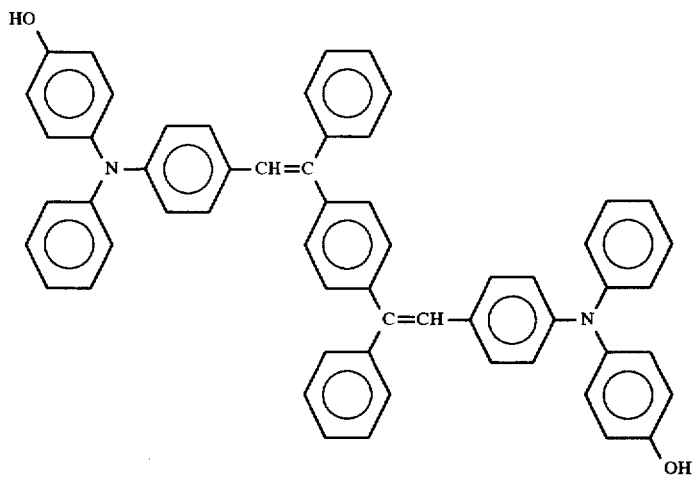

(4)

The results of the elemental analysis of the dihydroxyl-group-containing diamine compound No. 1 are as follows:

| | Elemental analysis: | | |
|---|---|---|---|
| | % C | % H | % N |
| Found | 87.03 | 5.82 | 3.23 |
| Calcd. | 86.97 | 5.54 | 3.50 |

Figure 25:
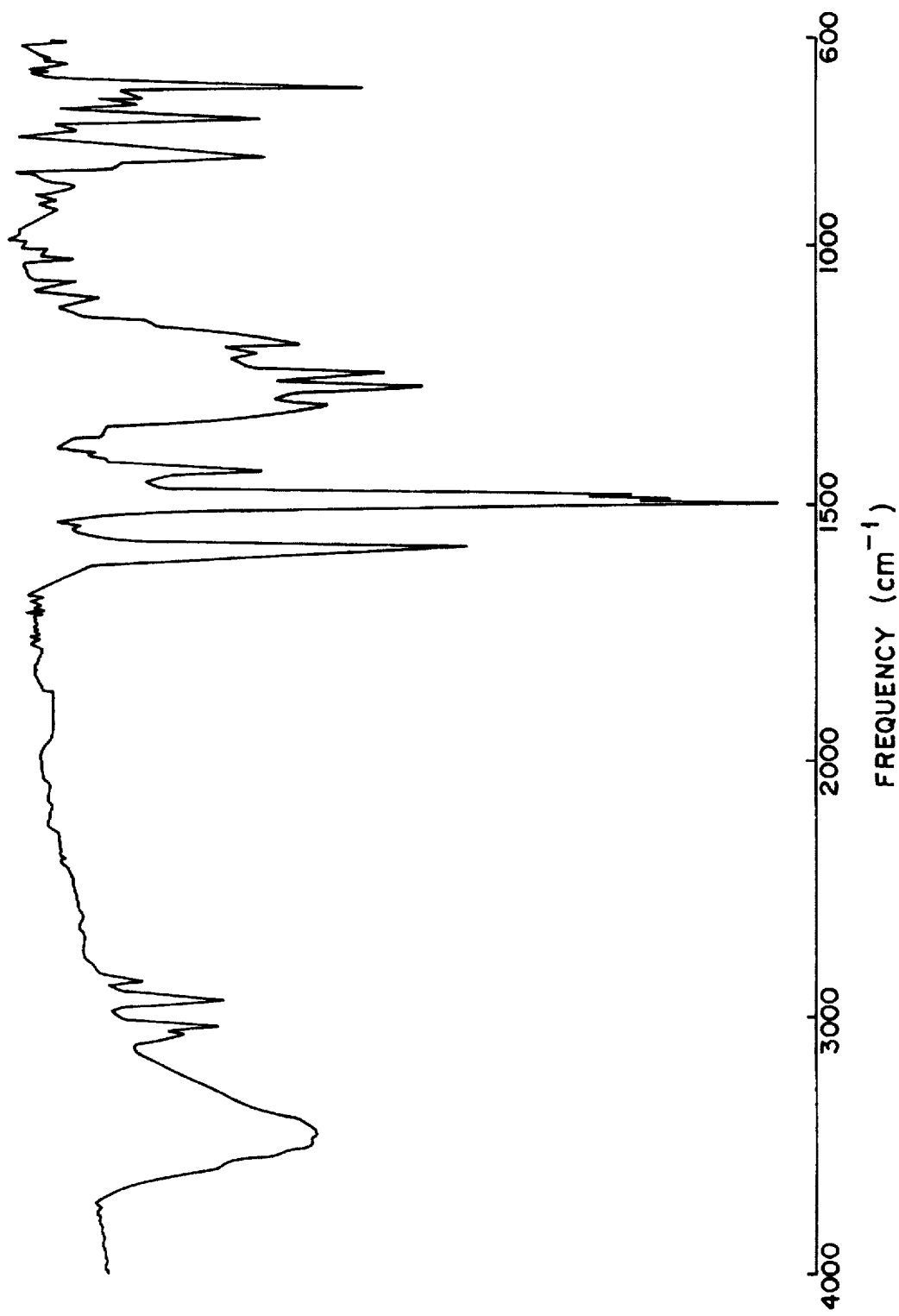
FIG. 25 is an IR spectrum of a dihydroxyl-group-containing diamine compound No. 1 obtained in Preparation Example 1, taken by use of a KBr tablet.

An infrared spectrum of this dihydroxyl-group-containing diamine compound No. 1, i.e. N',N"-diphenyl-N',N"-bis(4-hydroxyphenyl)-1,4-bis(α-phenylstyryl)benzene-4',4"-diamine, taken by use of a KBr tablet, is shown in FIG. 25.

PREPARATION EXAMPLE 2

[Preparation of dihydroxyl-group-containing diamine compound No. 2]

66.69 g (0.21 mol) of 4-formyl-4'-methoxy-4"-methyl-triphenylamine represented by the following formula (5) and 50.66 g (0.1 mol) of a bis(phosphonate) compound represented by the following formula (2) were dissolved in 500 ml of DMF.

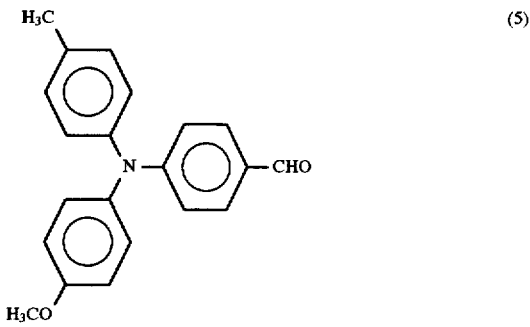

(5)

-continued

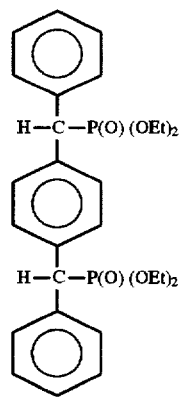

(2)

To the above prepared solution, 29.13 g (0.26 mol) of potassium tert-butoxide (t-BuOK) was dropwise added.

After stirring for 2 hours, the reaction mixture was poured into 1.5 l of water, and neutralized with acetic acid. The resulting precipitate was separated from the mixture by filtration, and washed with water, so that yellow powders were obtained. The thus obtained product was chromatographed on a silica gel column using toluene as a developing solvent. The thus obtained product was recrystallized from a mixed solvent consisting of toluene and cyclohexane at a mixing ratio of 1:1, whereby 71.84 g of a distyrylbenzene compound represented by formula (6) was obtained in a yield of 84.01%. The above-mentioned distyrylbenzene compound was amorphous.

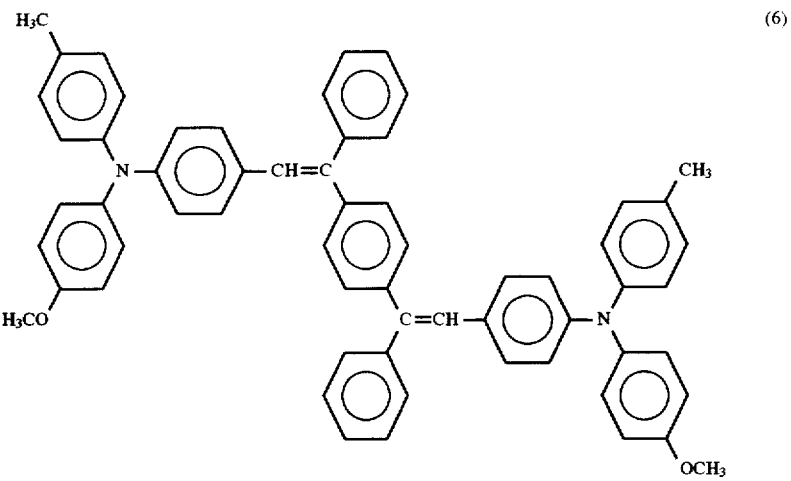

(6)

The results of the elemental analysis of the above-mentioned distyrylbenzene compound are as follows:

| Elemental analysis: | | | |
|---|---|---|---|
| | % C | % H | % N |
| Found | 87.18 | 6.25 | 3.05 |
| Calcd. | 86.88 | 6.12 | 3.27 |

42.75 g (0.05 mol) of the distyrylbenzene compound represented by formula (6) and 40 g (0.48 mol) of sodium thioethoxide were dissolved in 500 ml of dry DMF. Then, the mixture was refluxed for 6 hours in a stream of nitrogen.

Thereafter, the reaction mixture was cooled to room temperature, and poured into iced water, and neutralized with concentrated hydrochloric acid. The resulting precipitate was separated from the mixture by filtration, and washed with water, and then purified by carrying out chromatographic separation on a column of silica gel using as a developing solvent a mixed solvent consisting of toluene and ethyl acetate at a mixing ratio of 10:1, whereby 38.07 g of a dihydroxyl-group-containing diamine compound No. 2 represented by formula (7) was obtained as a green powder in a yield of 92.07%. The above-mentioned dihydroxyl-group-containing diamine compound was amorphous.

[Dihydroxyl-group-containing diamine compound No. 2]

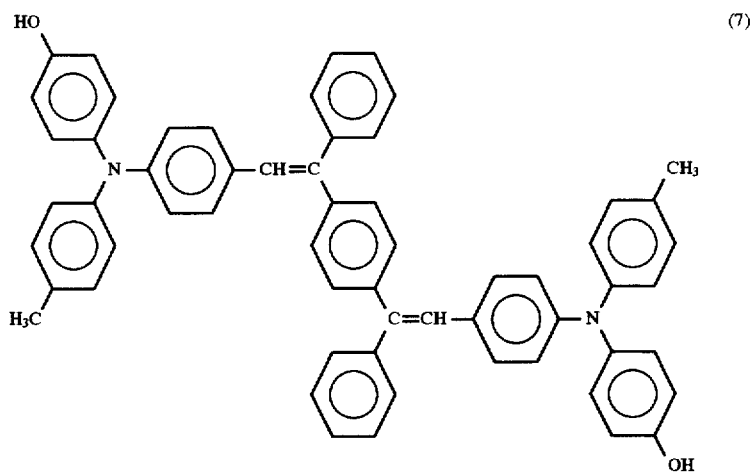

(7)

The results of the elemental analysis of the dihydroxyl-group-containing diamine compound No. 2 are as follows:

| Elemental analysis: | | | |
|---|---|---|---|
| | % C | % H | % N |
| Found | 86.90 | 6.00 | 3.11 |
| Calcd. | 86.93 | 5.84 | 3.38 |

Figure 26:
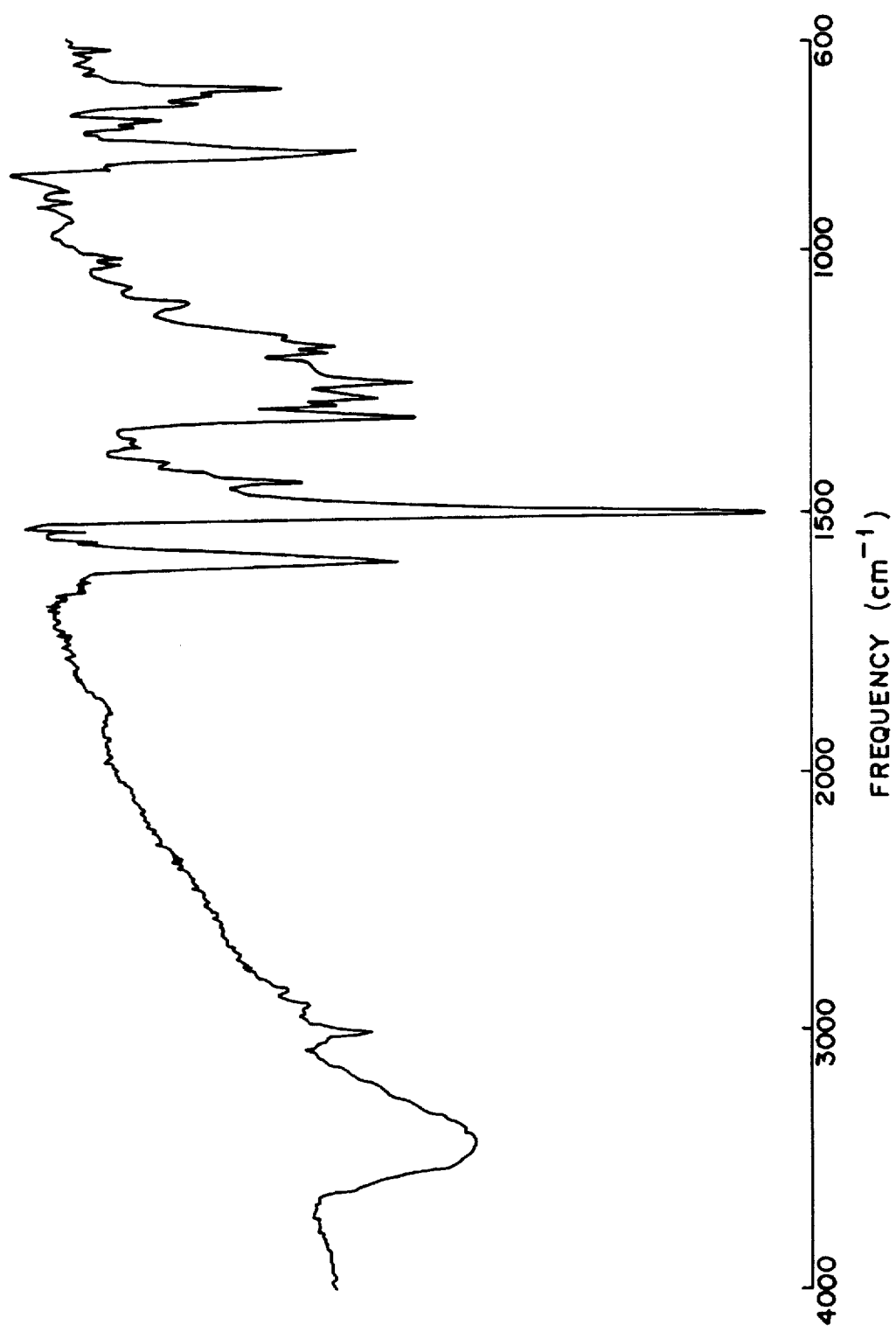
FIG. 26 is an IR spectrum of a dihydroxyl-group-containing diamine compound No. 2 obtained in Preparation Example 2.

An infrared spectrum of this hydroxyl-group-containing diamine compound No. 2, taken by use of a KBr tablet, is shown in FIG. 26.

PREPARATION EXAMPLE 3

[Preparation of dihydroxyl-group-containing diamine compound No. 3]

20.39 g (0.067 mol) of 4-formyl-4'-methoxy-triphenylamine represented by the following formula (1) and 13.29 g (0.028 mol) of a bis(phosphonate) compound represented by the following formula (8) were dissolved in 300 ml of DMF.

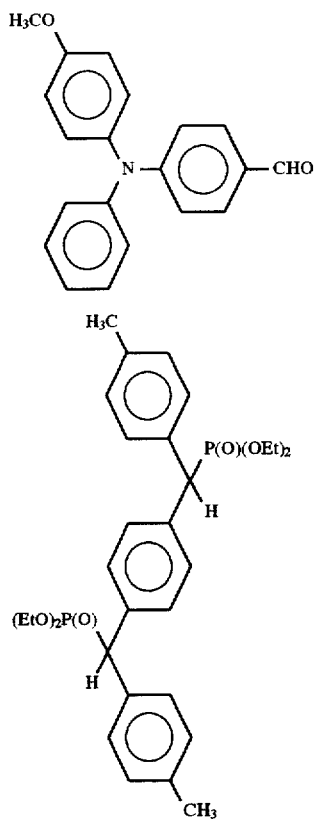

(1)

To the above prepared solution, 9.43 g (0.084 mol) of potassium tert-butoxide (t-BuOK) was dropwise added.

After stirring for 3 hours, the reaction mixture was poured into 2.0 l of water, and neutralized with acetic acid. The resulting precipitate was separated from the mixture by filtration, and washed with water, so that yellow powders were obtained. The thus obtained product was chromatographed on a silica gel column using as a developing solvent a mixed solvent consisting of toluene and n-hexane at a mixing ratio of 1:1, whereby 10.52 g of a distyrylbenzene compound represented by formula (9) was obtained in a yield of 50.5%. The above-mentioned distyrylbenzene compound was amorphous.

The results of the elemental analysis of the above-mentioned distyrylbenzene compound are as follows:

| Elemental analysis: | | | |
|---|---|---|---|
| | % C | % H | % N |
| Found | 87.15 | 6.06 | 3.32 |
| Calcd. | 86.86 | 6.12 | 3.27 |

9.68 g (0.011 mol) of the distyrylbenzene compound represented by formula (9) and 10 g (0.12 mol) of sodium thioethoxide were added to 150 ml of dry DMF. Then, the mixture was refluxed for 8 hours in a stream of nitrogen.

Thereafter, the reaction mixture was cooled to room temperature, and poured into iced water, and neutralized with concentrated hydrochloric acid. The resulting precipitate was separated from the mixture by filtration, and washed with water, and then purified by carrying out chromatographic separation on a column of silica gel using as a developing solvent a mixed solvent consisting of toluene and ethyl acetate at a mixing ratio of 10:1, whereby 7.0 g of a dihydroxyl-group-containing diamine compound No. 3 represented by formula (10) was obtained as a green powder in a yield of 69.79%. The above-mentioned dihydroxyl-group-containing diamine compound was amorphous.

[Dihydroxyl-group-containing diamine compound No. 3]

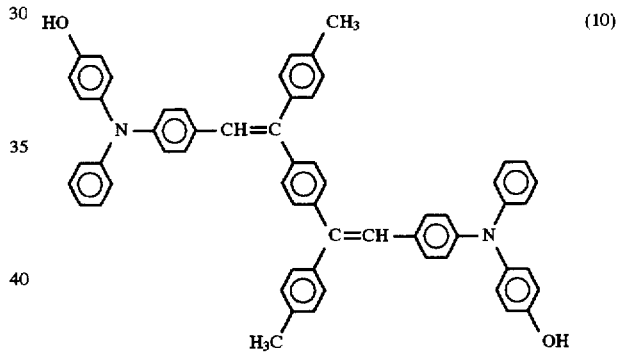

(10)

The results of the elemental analysis of the dihydroxyl-group-containing diamine compound No. 3 are as follows:

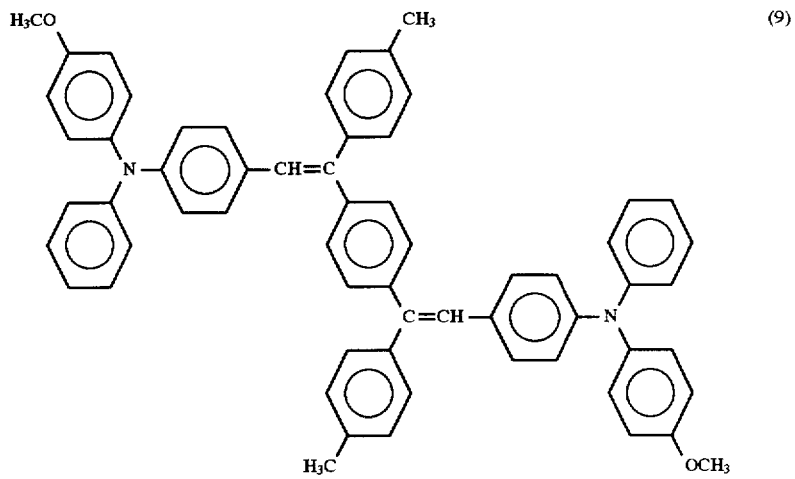

(9)

| | Elemental analysis: | | |
|---|---|---|---|
| | % C | % H | % N |
| Found | 86.97 | 5.80 | 3.41 |
| Calcd. | 86.93 | 5.84 | 3.38 |

Figure 27:
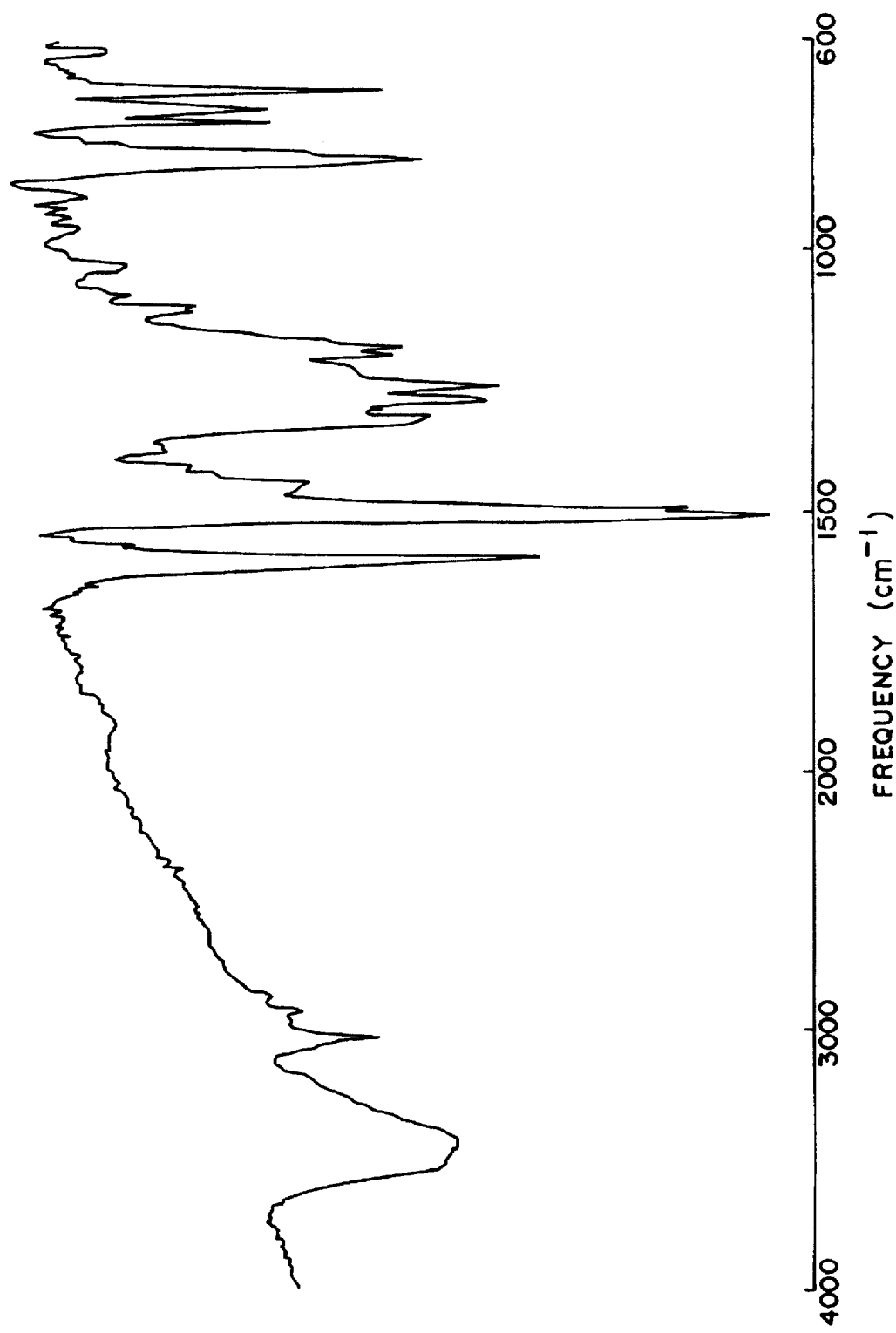
FIG. 27 is an IR spectrum of a dihydroxyl-group-containing diamine compound No. 3 obtained in Preparation Example 3.

An infrared spectrum of this hydroxyl-group-containing diamine compound No. 3, taken by use of a KBr tablet, is shown in FIG. 27.

PREPARATION EXAMPLE 4

[Preparation of dihydroxyl-group-containing diamine compound No. 4]

69.4 g (0.144 mol) of 4-formyl-4'-methoxy-4"-(2,2-diphenylvinyl)triphenylamine represented by the following formula (11) and 30.4 g (0.06 mol) of a bis(phosphonate) compound represented by the following formula (2) were dissolved in 500 ml of DMF.

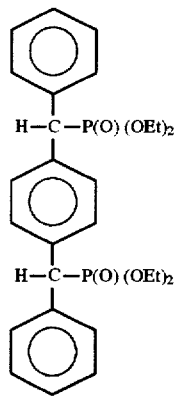
(2)

To the above prepared solution, 24.2 g (0.18 mol) of potassium tert-butoxide (t-BuOK) was added, with the reaction mixture being maintained at a temperature in the range of 15° to 25° C.

After stirring for 3.0 hours, the reaction mixture was poured into 2000 ml of water. The resulting layer was extracted with ethyl acetate, and purified by carrying out chromatographic separation on a column of silica gel using a developing solvent consisting of toluene and n-hexane at a mixing ratio of 1:1, whereby 62.3 g of a distyrylbenzene compound represented by formula (12) was obtained in a yield of 89.9%. The above-mentioned distyrylbenzene compound was amorphous.

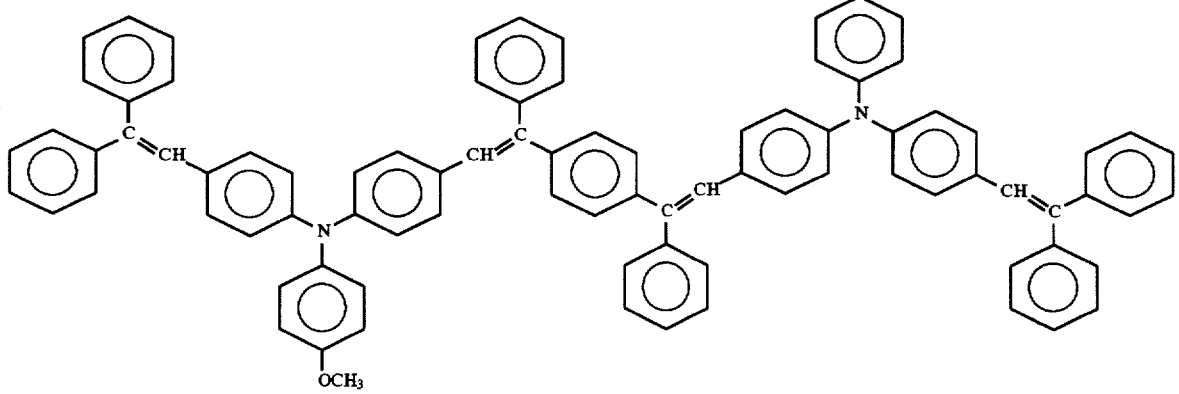
(12)

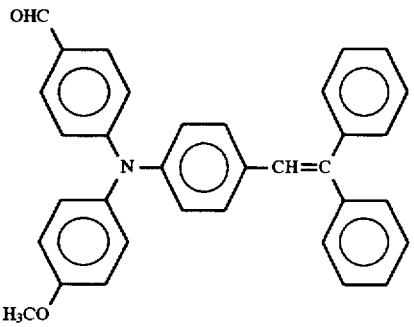
(11)

| | Elemental analysis: | | |
|---|---|---|---|
| | % C | % H | % N |
| Found | 89.45 | 5.67 | 2.37 |
| Calcd. | 89.15 | 5.78 | 2.36 |

Figure 28:
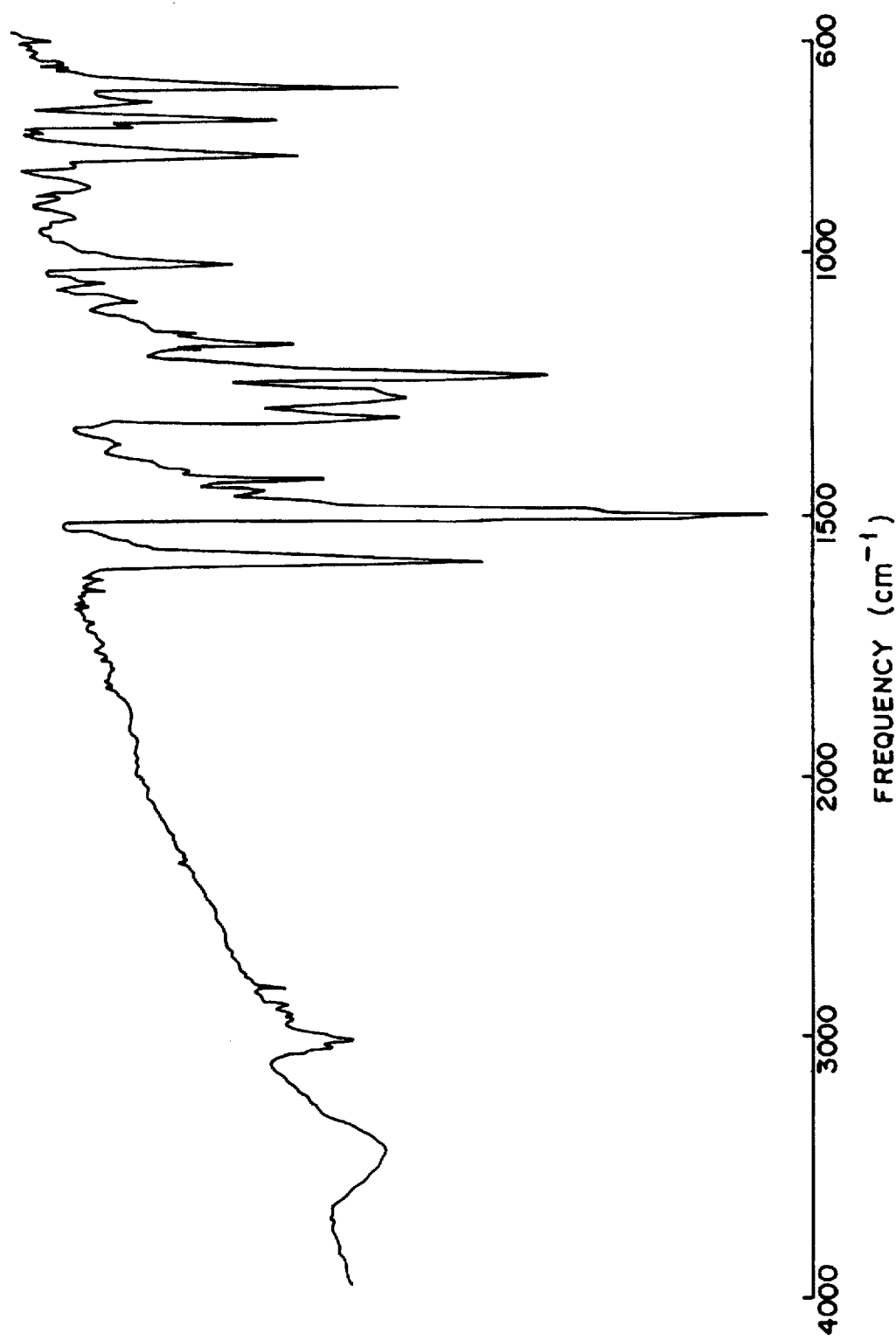
FIG. 28 is an IR spectrum of a distyrylbenzene compound for the preparation of a dihydroxyl-group-containing diamine compound No. 4 obtained in Preparation Example 4.

An infrared spectrum of the above-mentioned distyrylbenzene compound of formula (12), taken by use of a KBr tablet, is shown in FIG. 28.

57.8 g (0.05 mol) of the distyrylbenzene compound represented by formula (12) and 30 g (0.36 mol) of sodium thioethoxide were added to 500 ml of dry DMF, and the above prepared mixture was refluxed for 8 hours in a stream of nitrogen.

Thereafter, the reaction mixture was cooled to room temperature, and poured into iced water, and neutralized with concentrated hydrochloric acid. The resulting precipitate was separated from the mixture by filtration, and washed with water, and then purified by carrying out chromatographic separation on a column of silica gel using as a developing solvent a mixed solvent consisting of toluene and ethyl acetate at a mixing ratio of 10:1, whereby 52.6 g of a dihydroxyl-group-containing diamine compound No. 4 represented by formula (13) was obtained as a yellow powder in a yield of 93.3%. The above-mentioned dihydroxyl-group-containing diamine compound was amorphous.

[Dihydroxyl-group-containing diamine compound No. 4]

EXAMPLE 1—1

[Synthesis of aromatic polycarbonate resin No. 1)]

5.92 g (0.00739 mol) of N',N"-diphenyl-N',N"-bis(4-hydroxyphenyl)-1,4-bis(α-phenylstyryl)benzene-4',4"-diamine obtained in Preparation Example 1, represented by formula (4), and 2.12 g (0.021 mol) of triethylamine were dissolved in 40 ml of dry tetrahydrofuran to prepare a solution (a). A solution (b) prepared by dissolving 1.70 g (0.00735 mol) of diethylene glycol bis(chloroformate) in 8 ml of dry tetrahydrofuran was added dropwise to the solution (a) over a period of 80 minutes under water-cooled condition.

After completion of the addition, the above obtained viscous reaction mixture was stirred for 80 minutes, and then

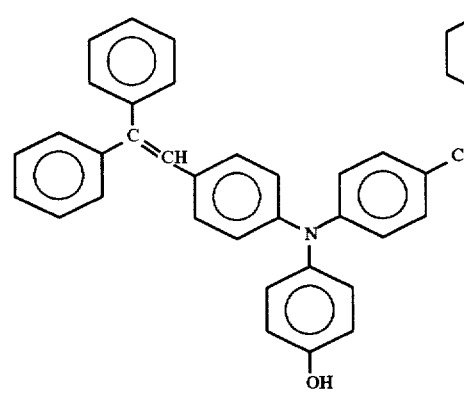
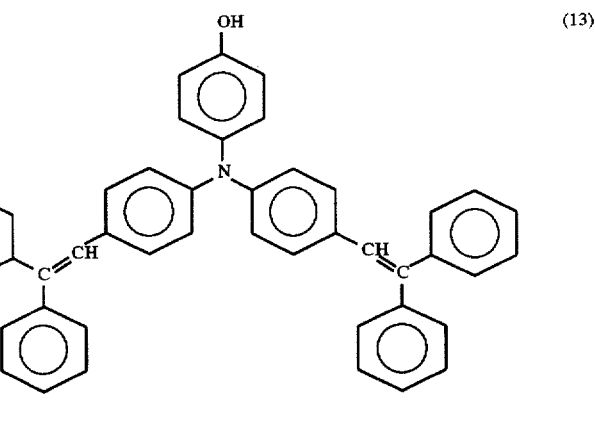

(13)

The results of the elemental analysis of the dihydroxyl-group-containing diamine compound No. 4 are as follows:

| | Elemental analysis: | | |
|---|---|---|---|
| | % C | % H | % N |
| Found | 89.11 | 5.49 | 2.48 |
| Calcd. | 89.24 | 5.57 | 2.42 |

Figure 29:
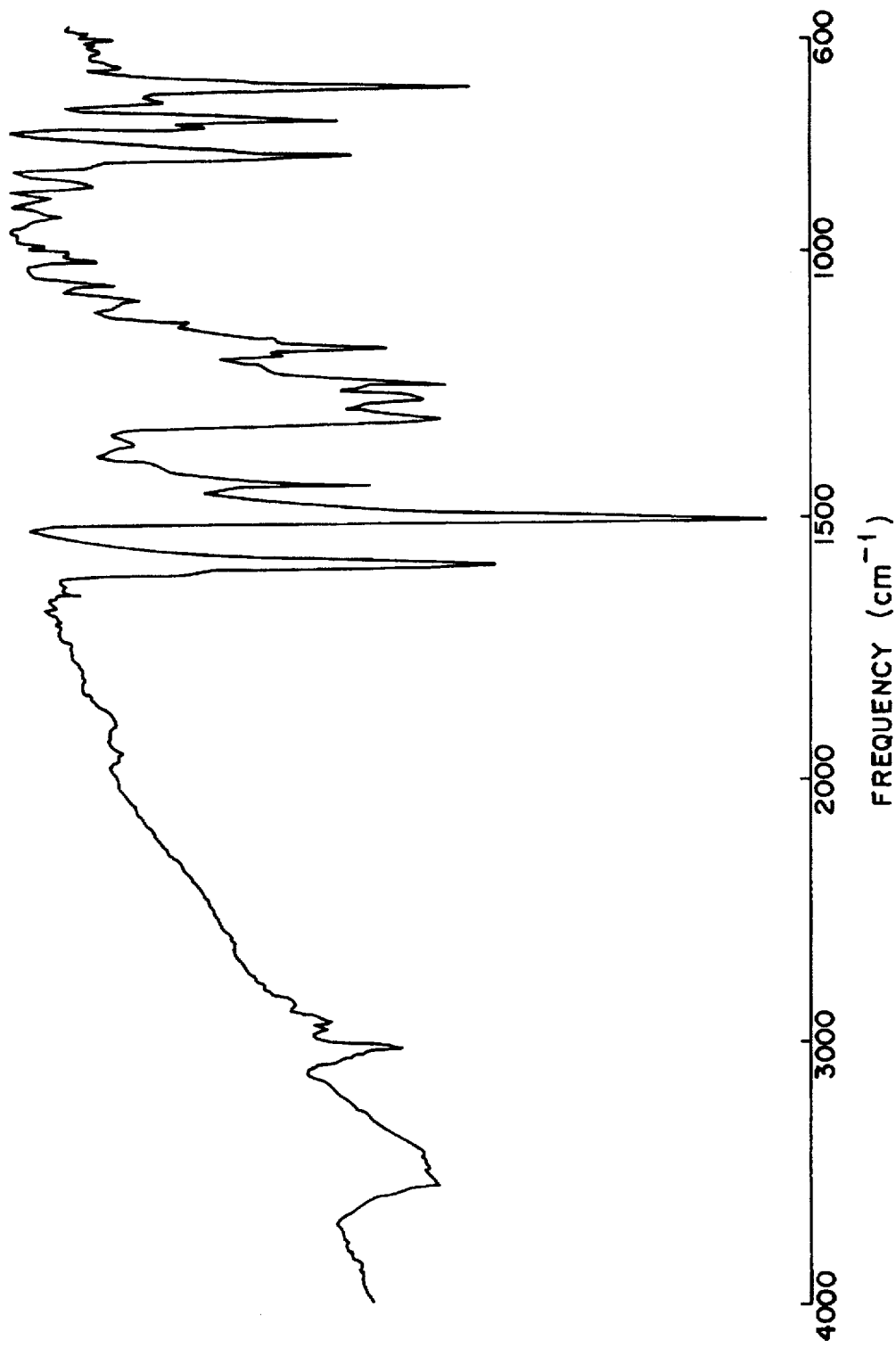
FIG. 29 is an IR spectrum of a dihydroxyl-group-containing diamine compound No. 4 obtained in Preparation Example 4.

An infrared spectrum of this hydroxyl-group-containing diamine compound No. 4, taken by use of a KBr tablet, is shown in FIG. 29.

0.8 g of a dry tetrahydrofuran solution containing 4 wt. % of phenol was added to the reaction mixture, followed by stirring for 60 minutes.

Thereafter, the obtained viscous reaction mixture was caused to precipitate in methanol, and a crude product was separated from the reaction mixture by filtration. The obtained product was purified by repeating the process of dissolving the product in tetrahydrofuran and precipitating it in methanol twice. Thereafter, the precipitated product was filtered off, and dried, so that 5.49 g of an aromatic polycarbonate resin No. 1 according to the present invention having a repeat unit of the following formula was obtained in a yield of 81.82%.

[Aromatic polycarbonate resin No. 1]

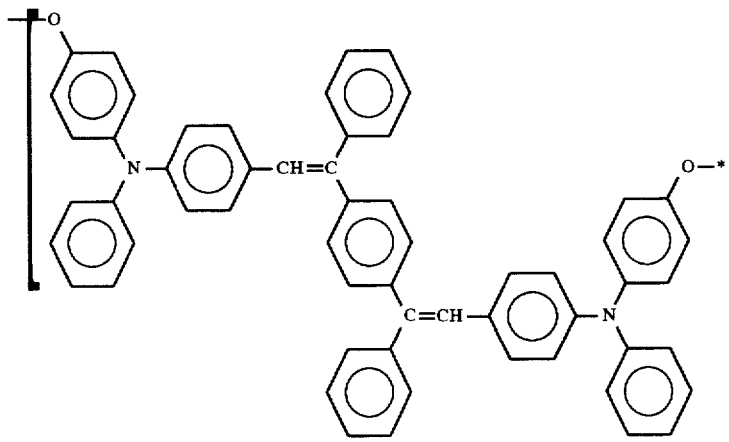

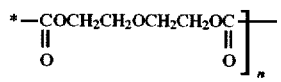

The glass transition temperature (Tg) of the above obtained aromatic polycarbonate resin No. 1 was 122.5 °C.

The polystyrene-reduced number-average molecular weight and weight-average molecular weight, which were measured by the gel permeation chromatography, were respectively 34,000 and 161,300.

The results of the elemental analysis of the thus obtained compound are as follows:

| | Elemental analysis: | | |
|---|---|---|---|
| | % C | % H | % N |
| Found | 79.98 | 5.17 | 2.97 |
| Calcd. | 79.98 | 5.45 | 2.91 |

FIG. 7 shows an infrared spectrum of the aromatic polycarbonate resin No. 1, taken by use of an NaCl film.

The IR spectrum indicates the appearance of the characteristic absorption peak due to C=O stretching vibration of carbonate at 1760 $cm^{-1}$.

EXAMPLE 1-2

[Synthesis of aromatic polycarbonate resin No. 2)]

5.92 g (0.00739 mol) of N',N"-diphenyl-N',N"-bis(4-hydroxyphenyl)-1,4-bis(α-phenylstyryl)benzene-4',4"-diamine obtained in Preparation Example 1, represented by formula (4), and 2.12 g (0.021 mol) of triethylamine were dissolved in 50 ml of dry tetrahydrofuran to prepare a solution (a). A solution (b) prepared by dissolving in 8 ml of dry tetrahydrofuran 2.69 g (0.00735 mol) of polytetramethylene ether glycol bis(chloroformate), which was prepared from polytetramethylene ether glycol with an average molecular weight of 250, was added dropwise to the solution (a) over a period of 80 minutes under water-cooled condition.

After completion of the addition, the above obtained viscous reaction mixture was stirred for 80 minutes, and then 0.8 g of a dry tetrahydrofuran solution containing 4 wt. % of phenol was added to the reaction mixture, followed by stirring for 60 minutes.

Thereafter, the obtained viscous reaction mixture was caused to precipitate in methanol, and a crude product was separated from the reaction mixture by filtration. The obtained product was purified by repeating the process of dissolving the product in tetrahydrofuran and precipitating it in methanol twice. Thereafter, the precipitated product was filtered off and dried, so that 4.84 g of an aromatic polycarbonate resin No. 2 according to the present invention having a repeat unit of the following formula was obtained in a yield of 63.21%.

[Aromatic polycarbonate resin No. 2]

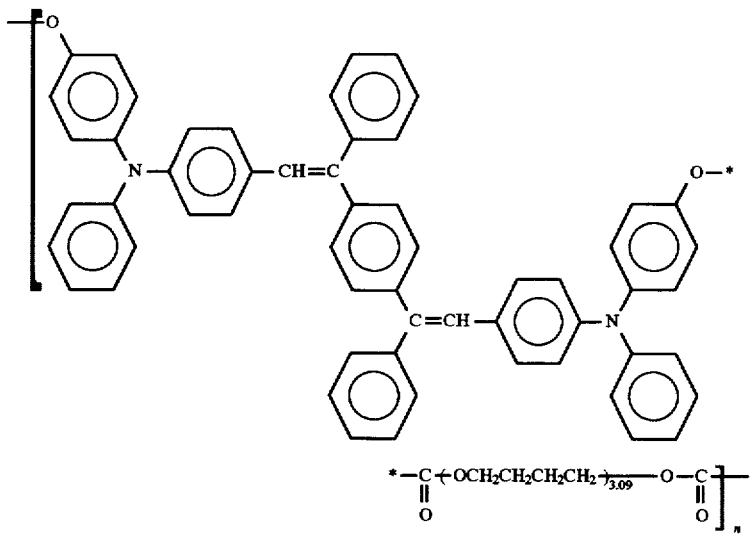

The glass transition temperature (Tg) of the above obtained aromatic polycarbonate resin No. 2 was 86.9° C.

The polystyrene-reduced number-average molecular weight and weight-average molecular weight, which were measured by the gel permeation chromatography, were respectively 30,417 and 99,227.

The results of the elemental analysis of the thus obtained compound are as follows:

| | Elemental analysis: | | |
|---|---|---|---|
| | % C | % H | % N |
| Found | 79.06 | 6.18 | 2.58 |
| Calcd. | 79.31 | 6.32 | 2.56 |

Figure 8:
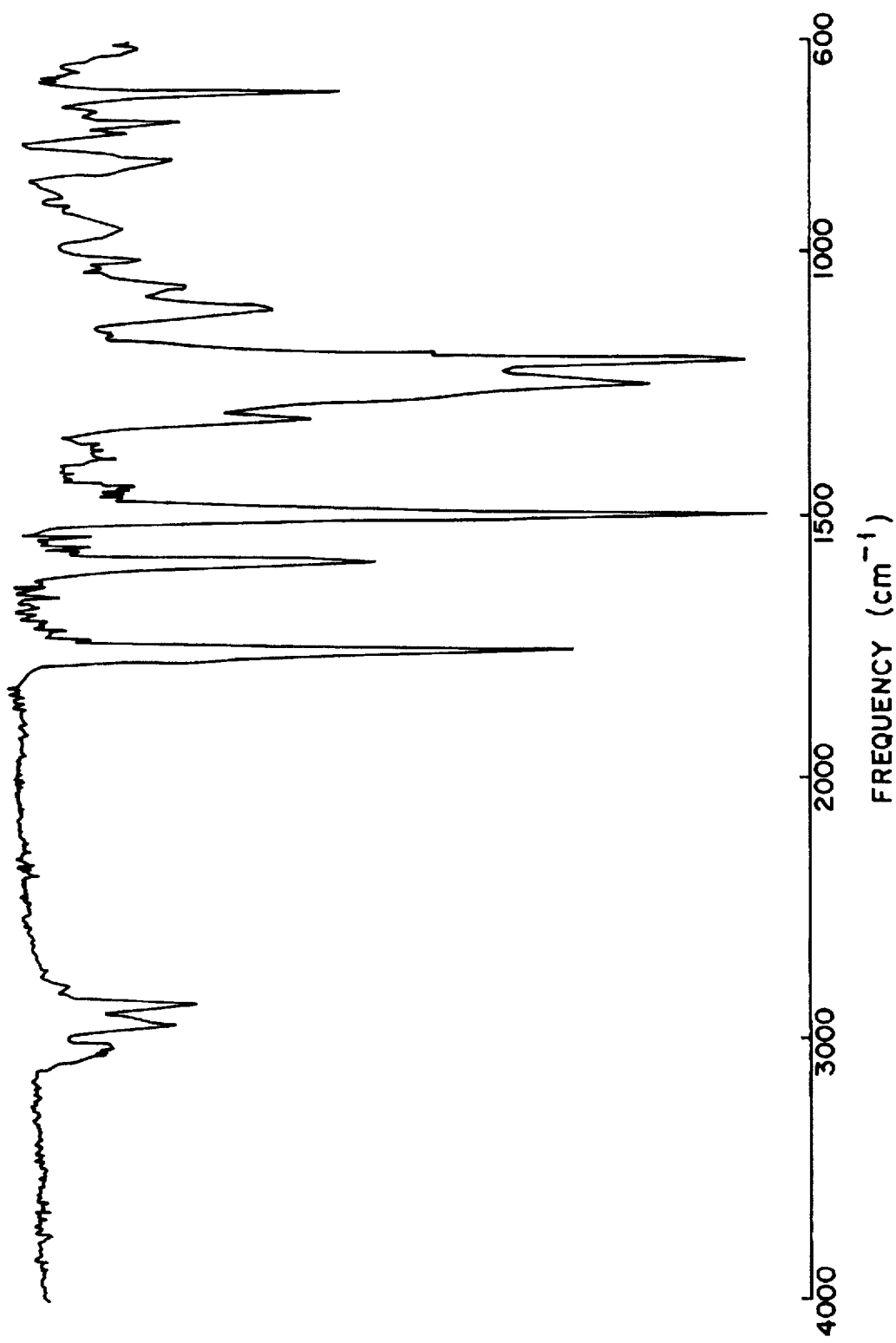

FIG. 8 shows an infrared spectrum of the aromatic polycarbonate resin No. 2, taken by use of an NaCl film.

The IR spectrum indicates the appearance of the characteristic absorption peak due to C=O stretching vibration of carbonate at 1760 cm$^{-1}$.

EXAMPLES 1-3 AND 1-4

[Synthesis of aromatic polycarbonate resins Nos. 3 and 4]

The procedure for preparation of the aromatic polycarbonate resin No. 1 in Example 1—1 was repeated except that diethylene glycol bis(chloroformate) used in Example 1—1 was replaced by the respective bis(chloroformate) compounds.

Thus, aromatic polycarbonate resins No. 3 and No. 4 according to the present invention were obtained, respectively having repeat units of the following formulae.

[Aromatic polycarbonate resin No. 3]

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins No. 3 and No. 4 are shown in Table 1.

Figure 9:
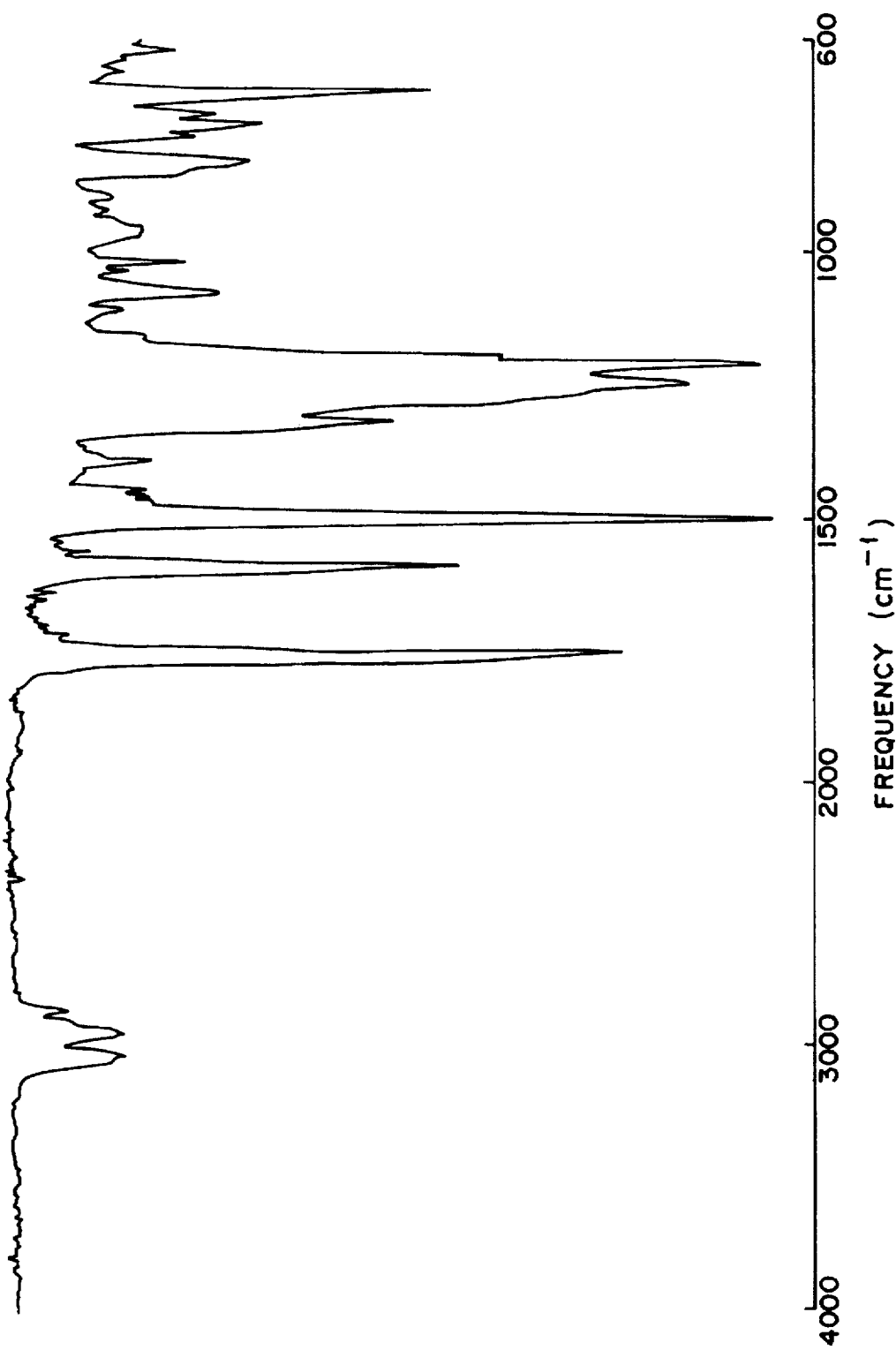
Figure 10:
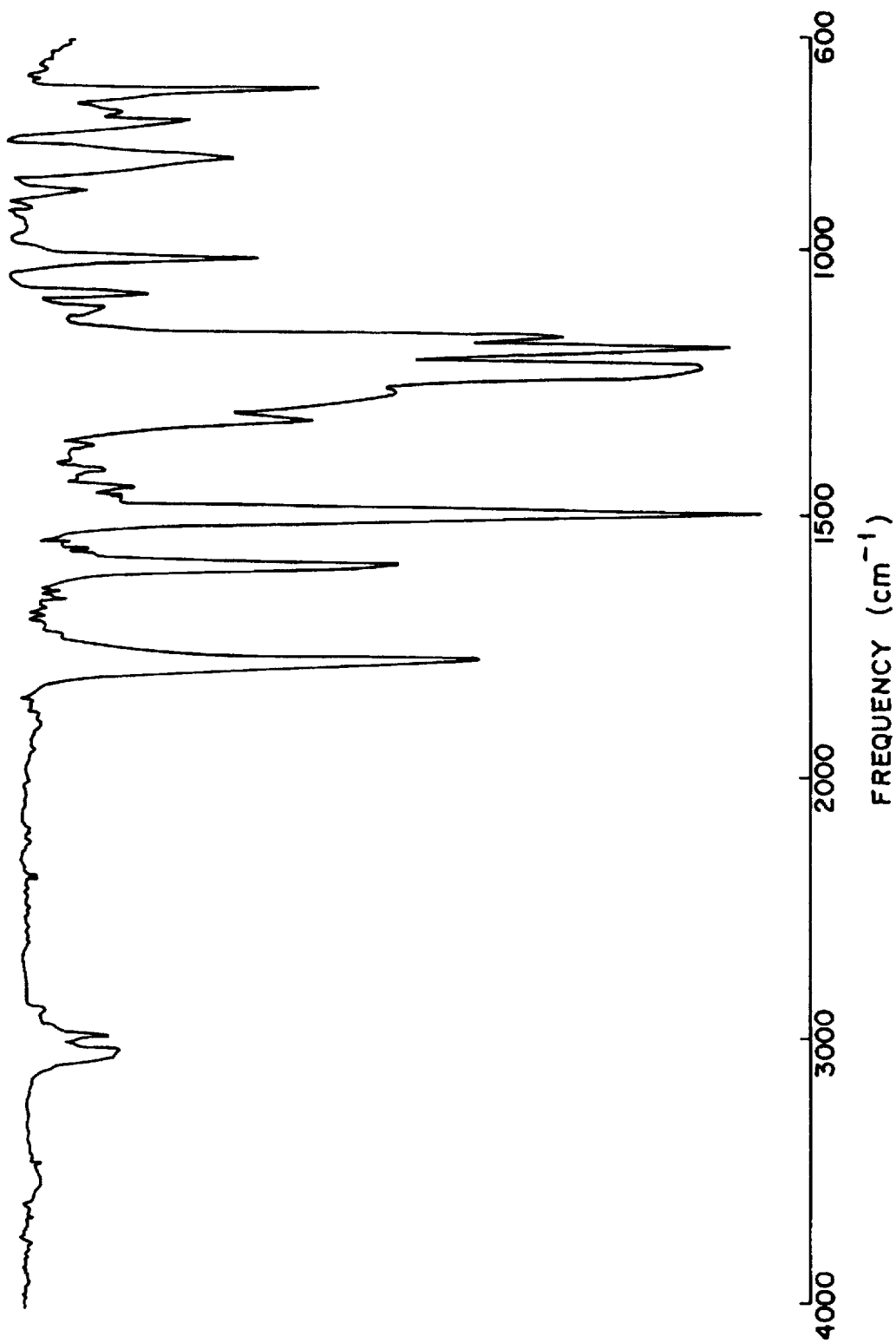

FIGS. 9 and 10 respectively show infrared spectra of the aromatic polycarbonate resins No. 3 and No. 4 obtained in Examples 1-3 and 1-4, taken by use of an NaCl film.

EXAMPLE 1-5

[Synthesis of aromatic polycarbonate resin No. 5]

The procedure for preparation of the aromatic polycarbonate resin No. 3 in Example 1-3 was repeated except that the dihydroxyl-group-containing diamine compound No. 1, that is, N',N"-diphenyl-N',N"-bis(4-hydroxyphenyl)-1,4-bis(α-phenylstyryl)benzene-4',4"-diamine obtained in Prepara-

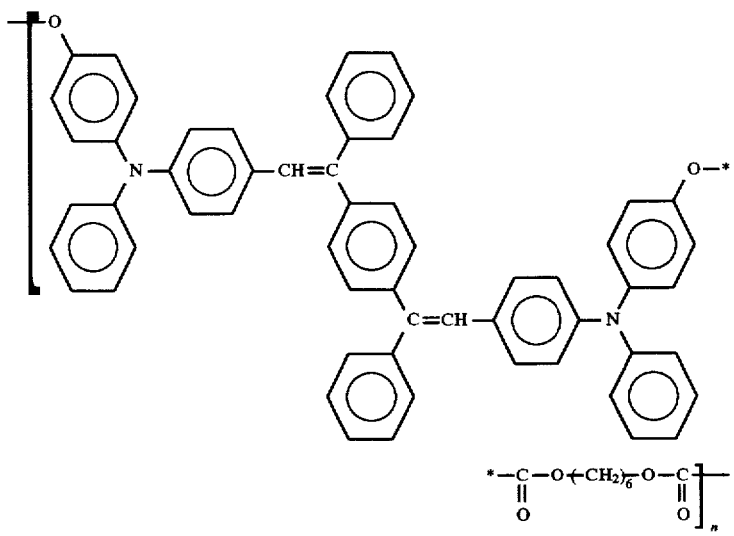

40

[Aromatic polycarbonate resin No. 4]

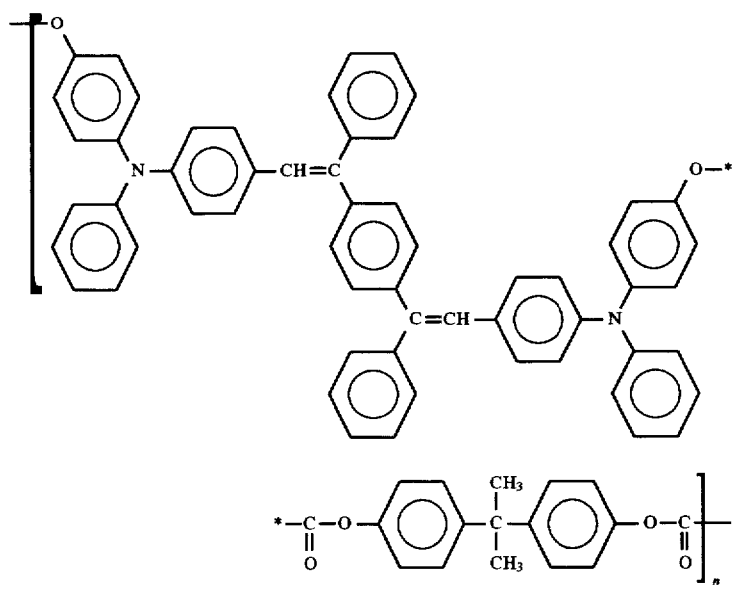

tion Example 1, represented by formula (4) used in Example 1-3 was replaced by the dihydroxyl-group-containing diamine compound No. 3 obtained in Preparation Example 3, represented by formula (10):

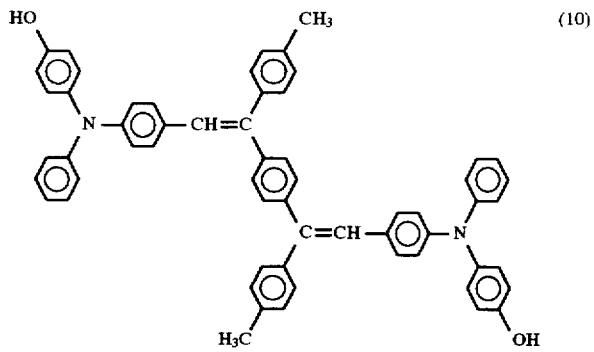

Thus, 4.63 g of an aromatic polycarbonate resin No. 5 according to the present invention having a repeat unit of the following formula was obtained in a yield of 97.9%.
[Aromatic polycarbonate resin No. 5]

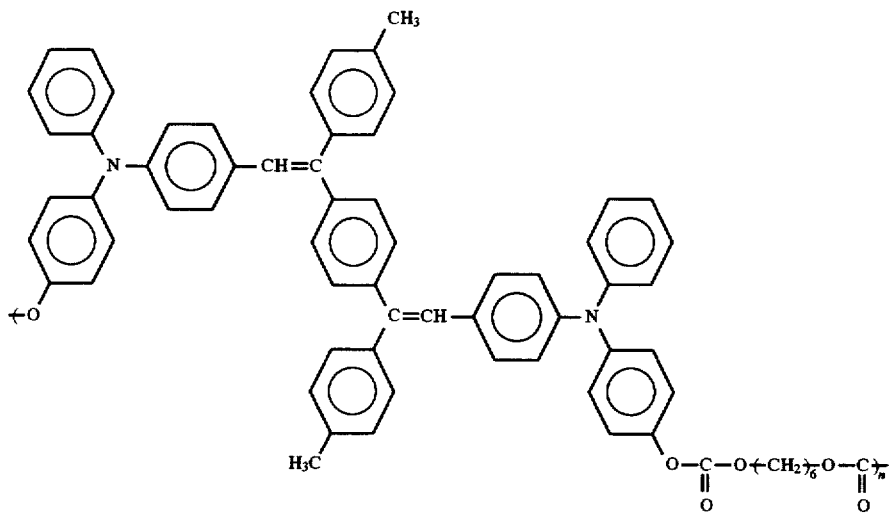

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 5 are shown in Table 1.

Figure 11:
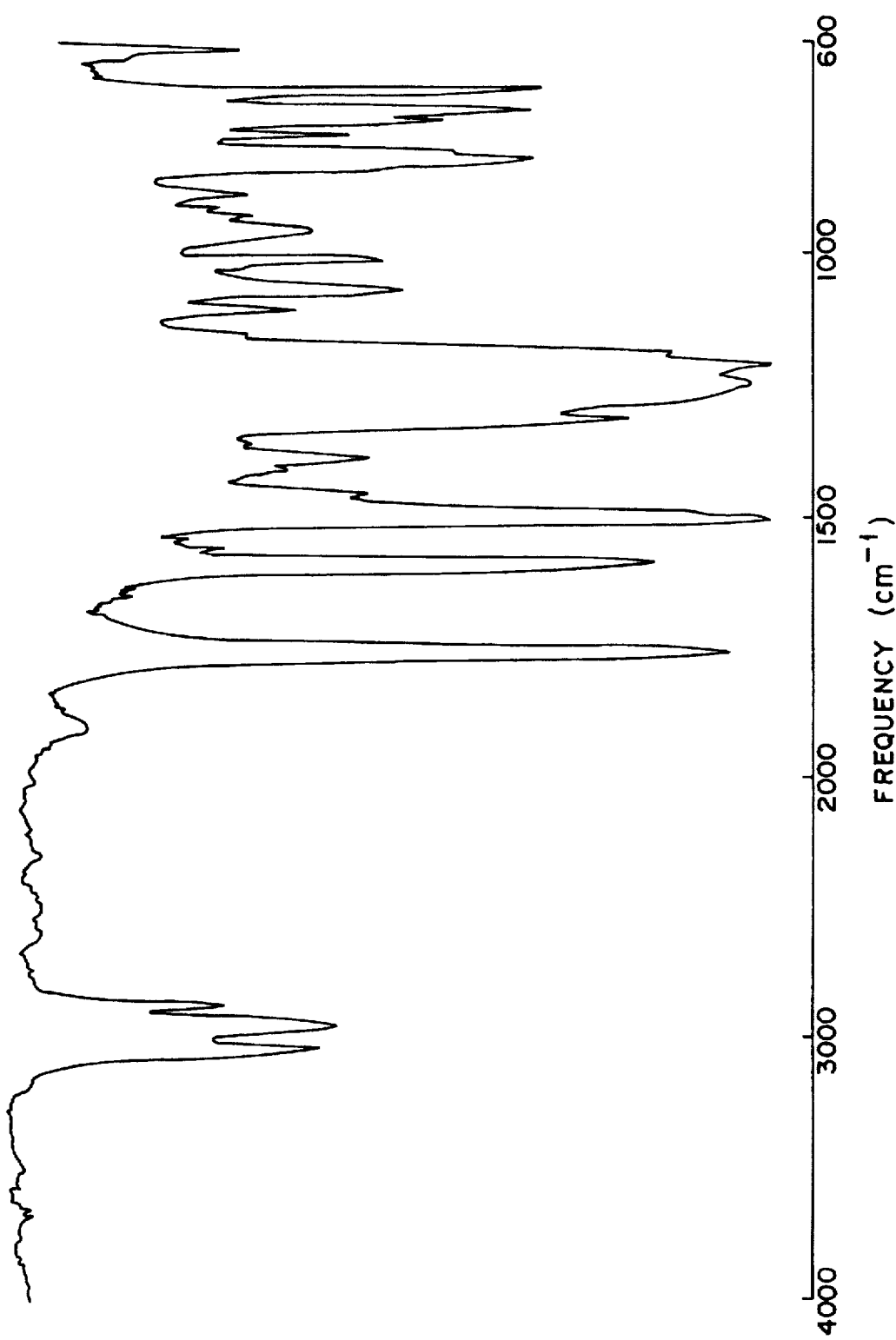

FIG. 11 shows an infrared spectrum of the aromatic polycarbonate resin No. 5 obtained in Example 1-5, taken by use of an NaCl film.

The IR spectrum indicates the appearance of the characteristic absorption peak due to C=O stretching vibration of carbonate at 1760 cm$^{-1}$.

EXAMPLES 1-6 TO 1-8
[Synthesis of aromatic polycarbonate resins Nos. 6 to 8]

The procedures for preparation of the aromatic polycarbonate resins No. 1 in Example 1-1, No. 2 in Example 1-2, and No. 3 in Example 1-3 were independently repeated except that the dihydroxyl-group-containing diamine compound No. 1, that is, N',N"-diphenyl-N',N"bis(4-hydroxyphenyl)-1,4-bis(α-phenylstyryl)benzene-4',4'-diamine obtained in Preparation Example 1, represented by formula (4) was replaced by the dihydroxyl-group-containing diamine compound No. 2 prepared in Preparation Example 2, represented by the following formula (7):

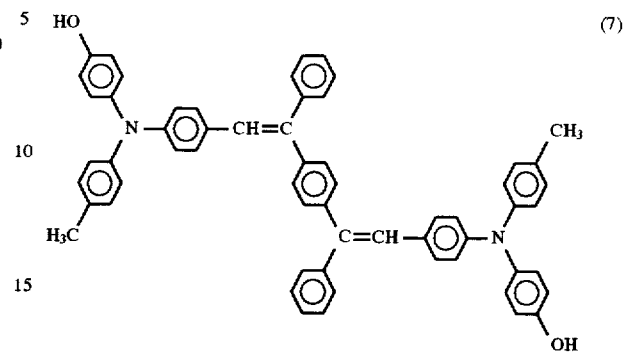

Thus, aromatic polycarbonate resins Nos. 6 to 8 according to the present invention, having the respective repeat units of the following formulae, were obtained.

[Aromatic polycarbonate resin No. 6]

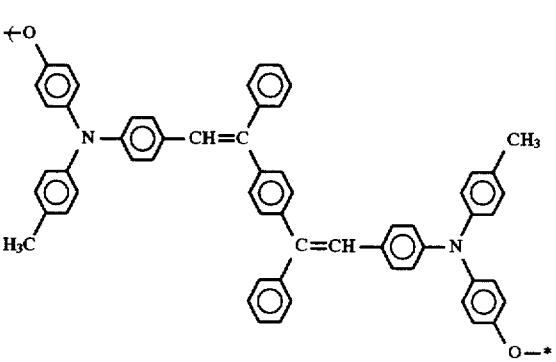

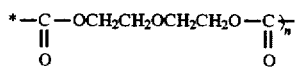

[Aromatic polycarbonate resin No. 7]

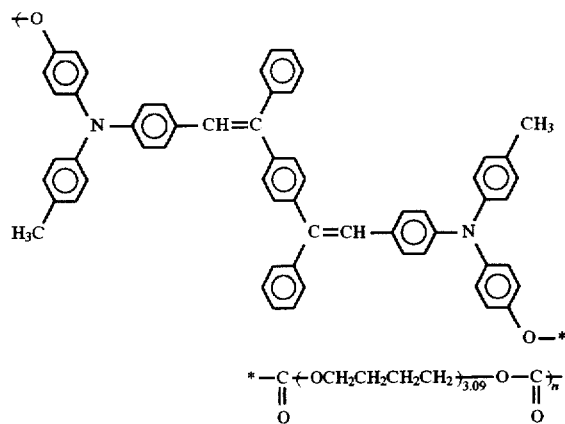

[Aromatic polycarbonate resin No. 8]

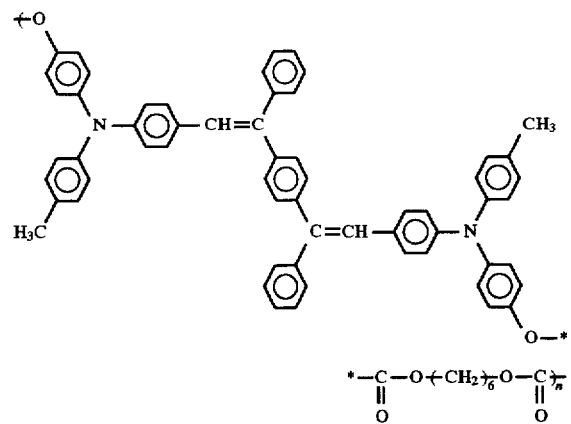

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins No. 6 to No. 8 are shown in Table 1.

Figure 12:
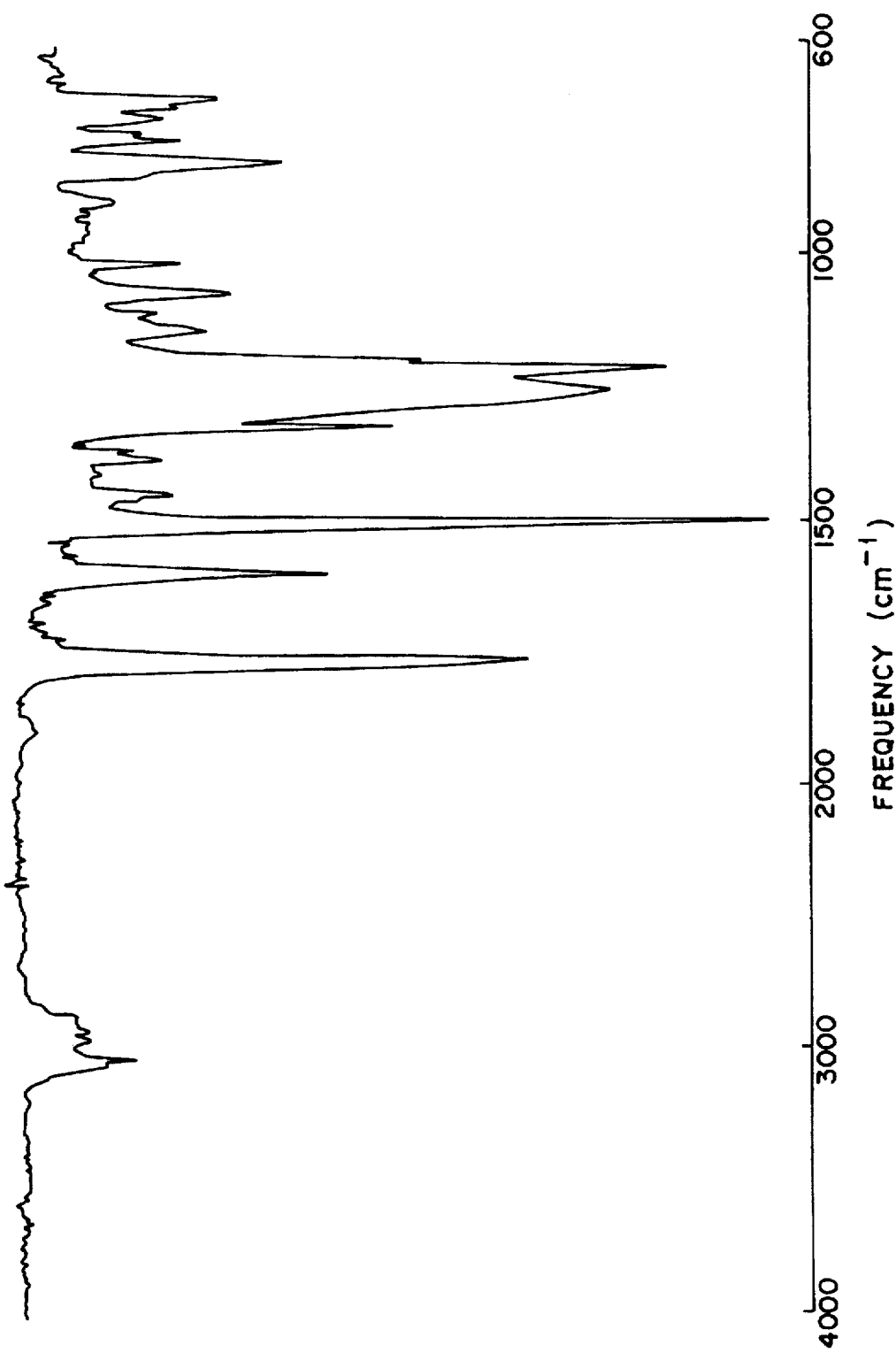
Figure 13:
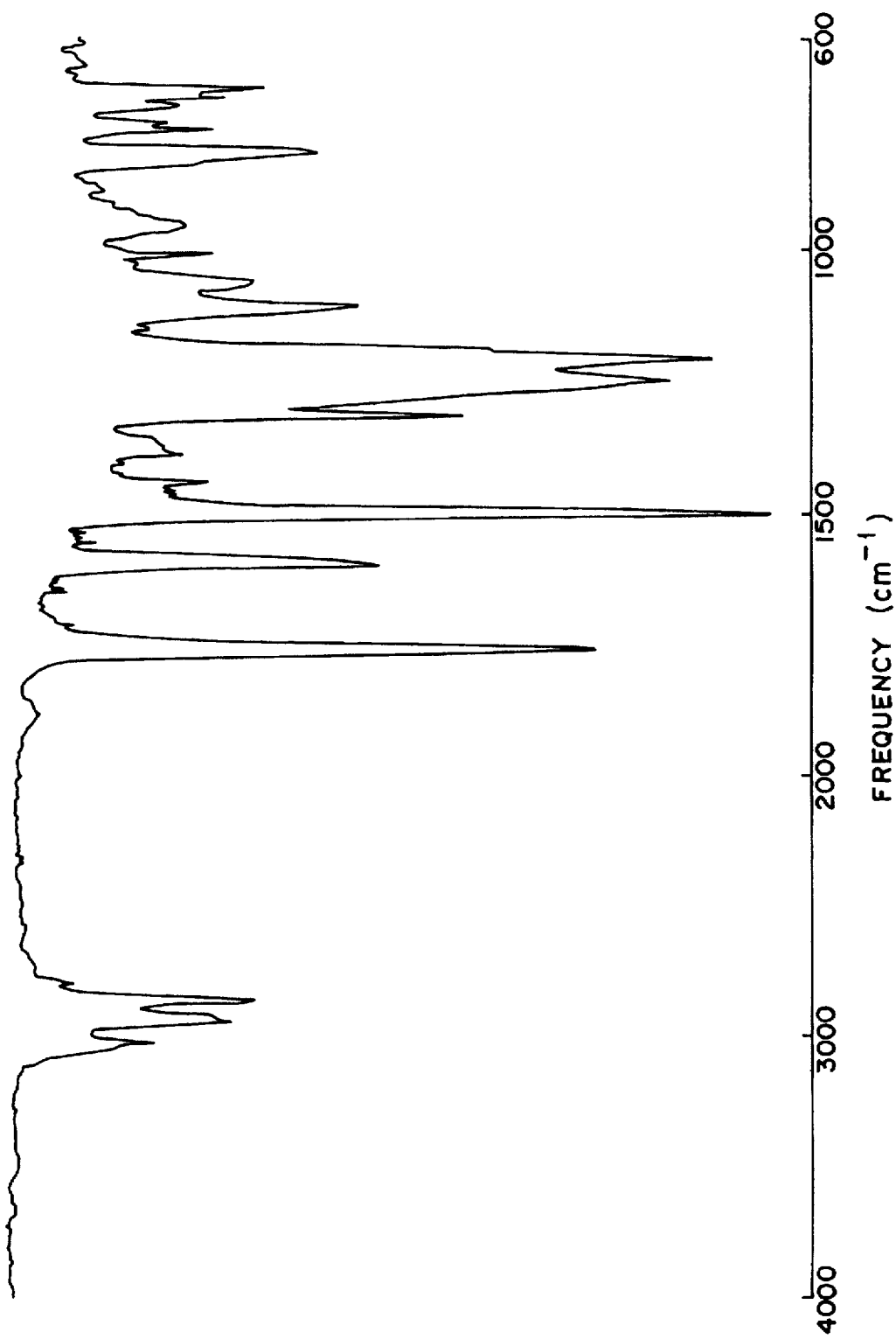
Figure 14:
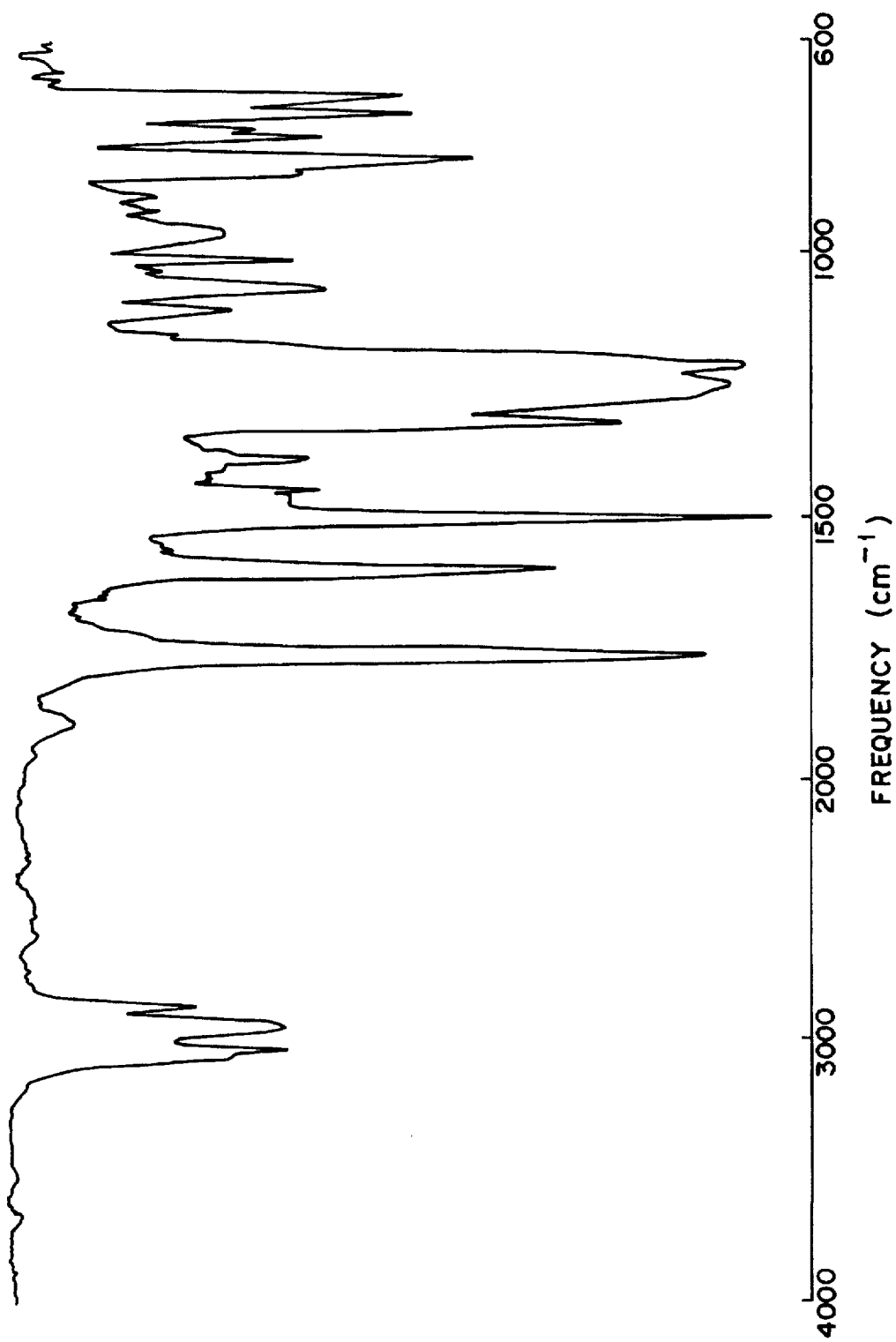

FIGS. 12 to 14 show infrared spectra of the aromatic polycarbonate resins No. 6 to No. 8 respectively obtained in Examples 1-6 to 1-8, taken by use of an NaCl film.

EXAMPLE 1-9

[Synthesis of aromatic polycarbonate resin No. 9]

1.60 g (0.002 mol) of N',N"-diphenyl-N',N"-bis(4-hydroxyphenyl)-1,4-bis(α-phenylstyryl)benzene-4',4"-diamine obtained in Preparation Example 1, represented by formula (4), was placed into a reaction vessel. An aqueous solution prepared by dissolving 0.32 g (0.008 mol) of sodium hydroxide in 30 ml of ion-exchange water was added to the above-mentioned dihydroxyl-group-containing diamine compound No. 1, and a mixture thus obtained was stirred. A solution prepared by dissolving 0.356 g (0.0012 mol) of triphosgene in 10 ml of methylene chloride was added dropwise to the above-mentioned mixture over a period of 20 minutes under ice-cooled condition.

After completion of the addition, 5 ml of methylene chloride was added to the reaction mixture as rinsing the vessel. Then, 0.1 g (0.025 mol) of sodium hydroxide was added to the reaction mixture at room temperature. Further, with the addition of one drop of triethylamine, the reaction mixture was stirred for 2 hours.

Thereafter, the obtained viscous reaction mixture was successively washed with a 5% aqueous solution of sodium hydroxide, a 2% aqueous solution of hydrochloric acid, and ion-exchange water, and caused to precipitate in methanol. The resultant precipitate was separated from the reaction mixture by filtration, and dried, so that 1.25 g of an aromatic polycarbonate resin No. 9 according to the present invention having a repeat unit of the following formula was obtained in a yield of 75.3%.

[Aromatic polycarbonate resin No. 9]

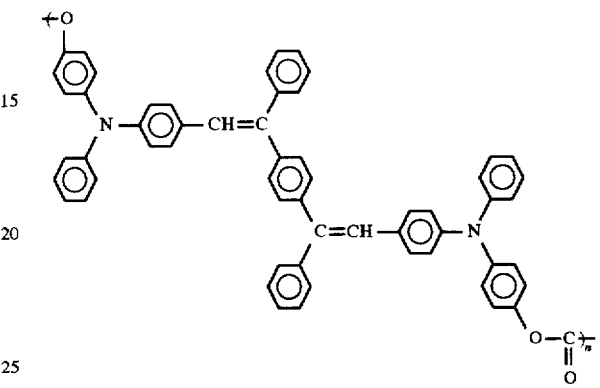

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 9 are shown in Table 1.

Figure 15:
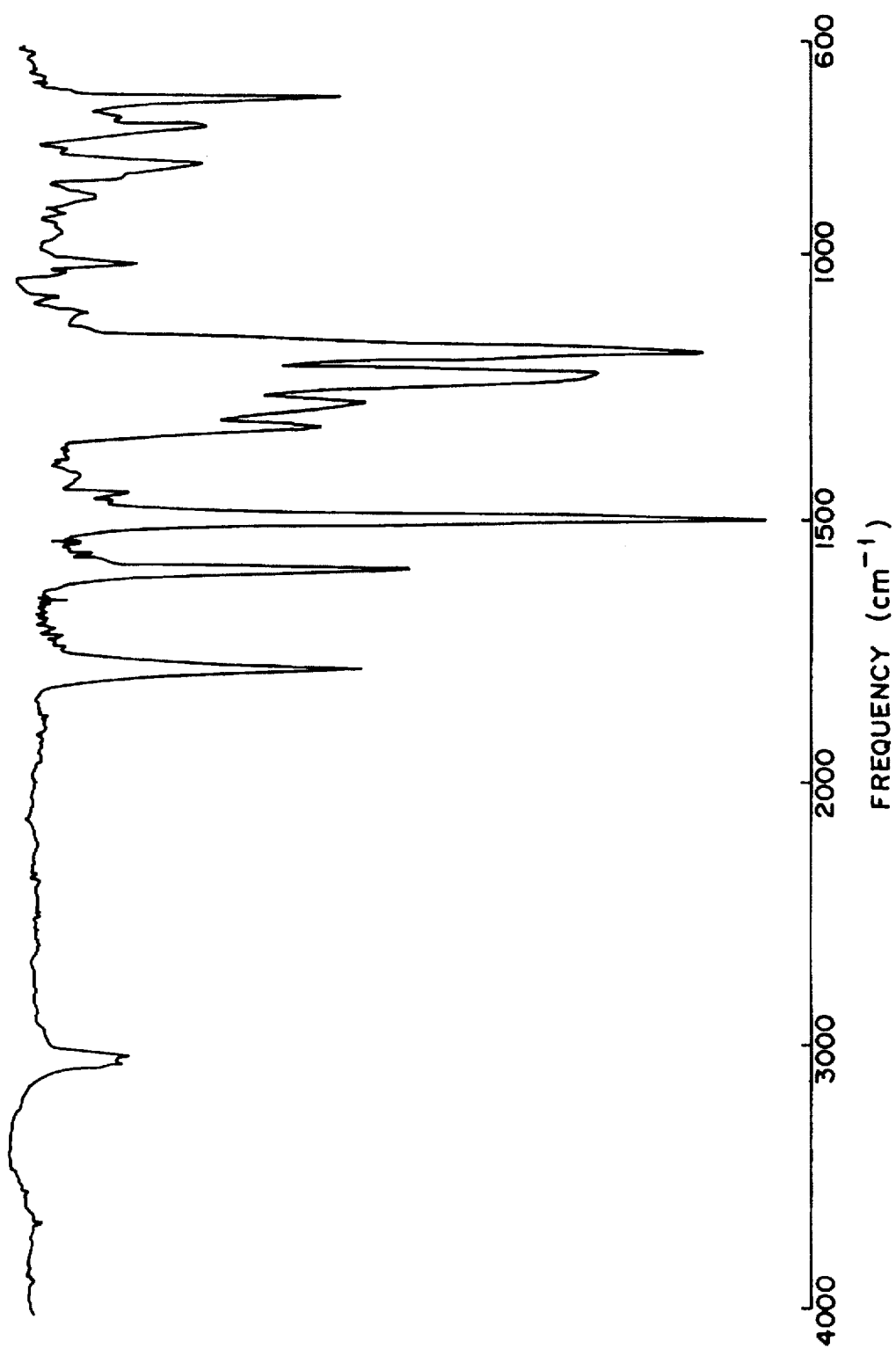

FIG. 15 shows an infrared spectrum of the aromatic polycarbonate resin No. 9 obtained in Example 1-9, taken by use of an NaCl film.

The IR spectrum indicates the appearance of the characteristic absorption peak due to C=O stretching vibration of carbonate at 1760 cm$^{-1}$.

EXAMPLE 1-10

[Synthesis of aromatic polycarbonate resin No. 10]

The procedure for preparation of the aromatic polycarbonate resin No. 9 in Example 1-9 was repeated except that the dihydroxyl-group-containing diamine compound No. 1, that is, N',N"-diphenyl-N',N"-bis(4-hydroxyphenyl)-1,4-bis(α-phenylstyryl)benzene-4',4"-diamine obtained in Preparation Example 1, represented by formula (4) used in Example 1-9 was replaced by the dihydroxyl-group-containing diamine compound No. 3 represented by formula (10):

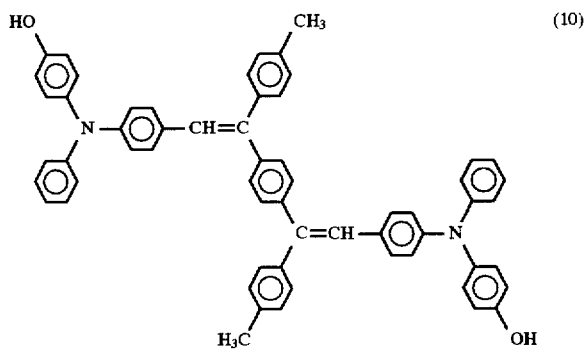

(10)

Thus, 0.91 g of an aromatic polycarbonate resin No. 10 according to the present invention having a repeat unit of the following formula was obtained in a yield of 53.2%.

[Aromatic polycarbonate resin No. 10]

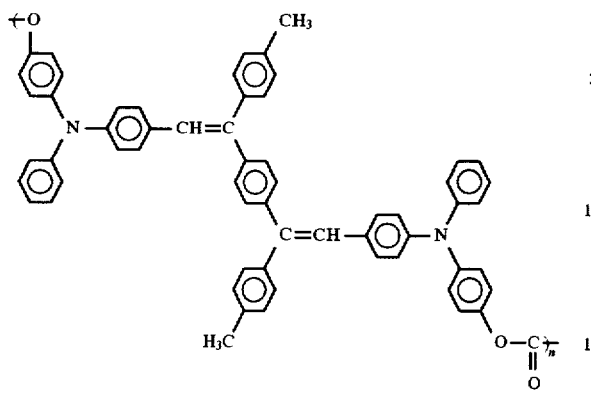

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 10 are shown in Table 1.

Figure 16:
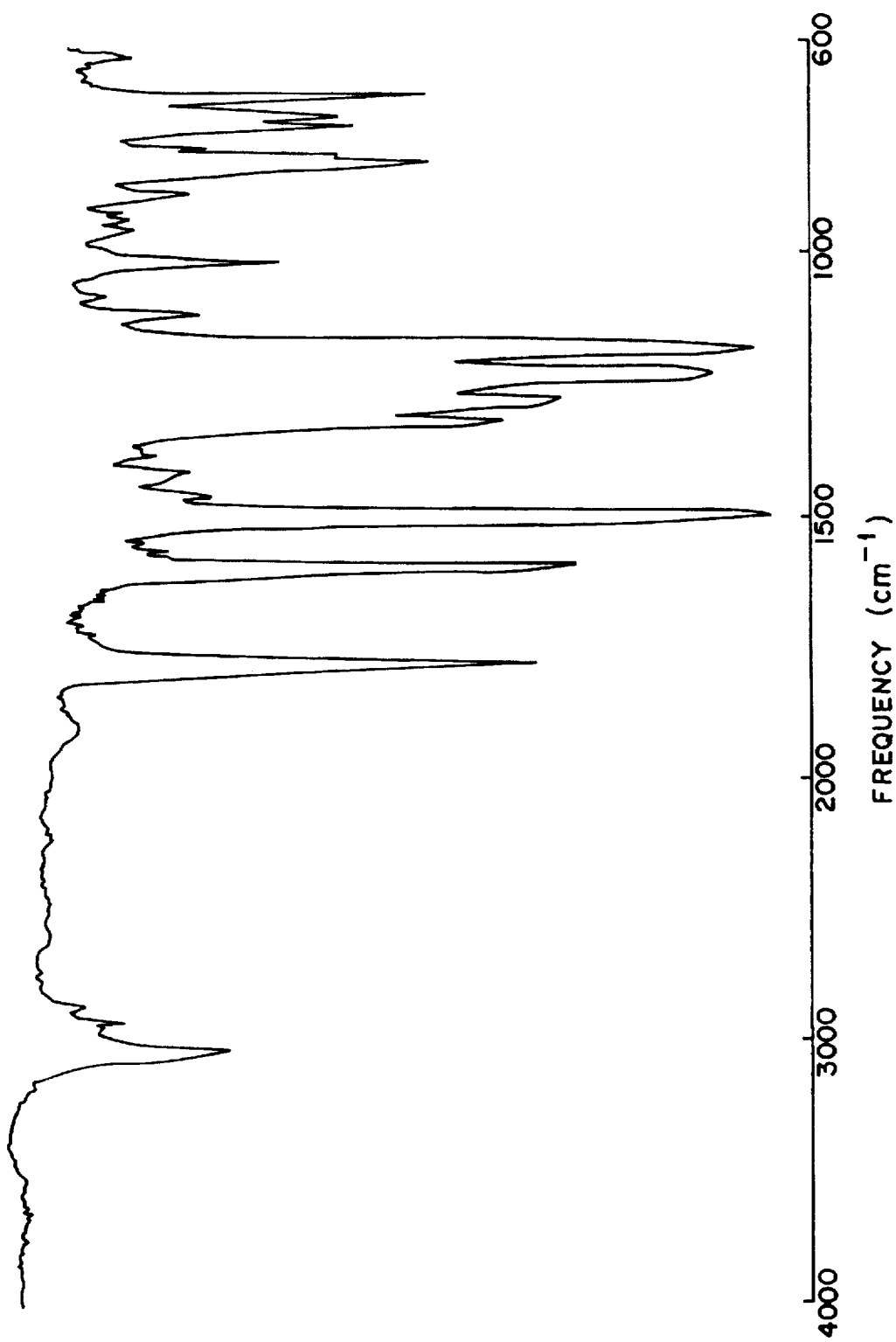

FIG. 16 shows an infrared spectrum of the aromatic polycarbonate resin No. 10 obtained in Example 1-10, taken by use of an NaCl film.

The IR spectrum indicates the appearance of the characteristic absorption peak due to C=O stretching vibration of carbonate at 1760 cm$^{-1}$.

EXAMPLE 1-11
[Synthesis of aromatic polycarbonate resin No. 11]

5.14 g (0.006 mol) of the dihydroxyl-group-containing diamine compound No. 2 prepared in Preparation Example 2, that is, N',N"-bis(4-methylphenyl)-N',N"-bis(4-hydroxyphenyl)-1,4-bis(α-phenylstyryl)-benzene-4',4"-diamine, represented by formula (7), and 1.54 g (0.006 mol) of bisphenol C were placed into a reaction vessel. An aqueous solution prepared by dissolving 1.92 g (0.048 mol) of sodium hydroxide in 800 ml of ion-exchange water was added to the above-mentioned mixture, followed by stirring. A solution prepared by dissolving 2.14 g (0.0012 mol) of triphosgene in 500 ml of methylene chloride was added dropwise to the above-mentioned mixture over a period of 60 minutes under ice-cooled condition.

After completion of the addition, 100 ml of methylene chloride was added to the reaction mixture as rinsing the vessel. Then, 0.6 g of sodium hydroxide was added to the reaction mixture at room temperature. Further, with the addition of one drop of triethylamine, the reaction mixture was stirred for 5 hours.

Thereafter, the obtained viscous reaction mixture was successively washed with a 5% aqueous solution of sodium hydroxide, a 2% aqueous solution of hydrochloric acid, and ion-exchange water, and caused to precipitate in methanol. The resultant precipitate was separated from the reaction mixture by filtration and dried, so that 5.11 g of an aromatic polycarbonate resin No. 11 according to the present invention having a repeat unit of the following formula was obtained in a yield of 73.1%.

[Aromatic polycarbonate resin No. 11]

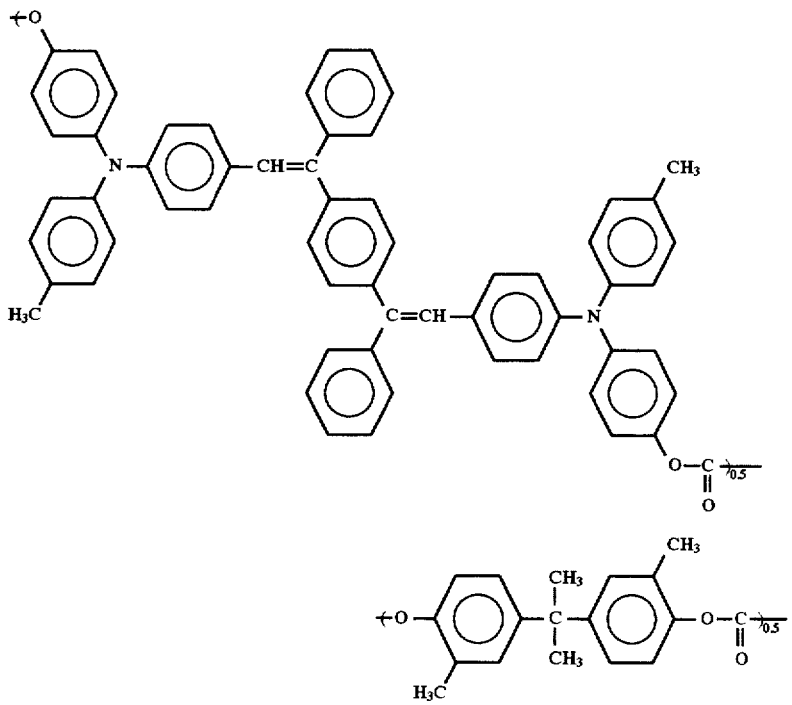

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 11 are shown in Table 1.

Figure 17:
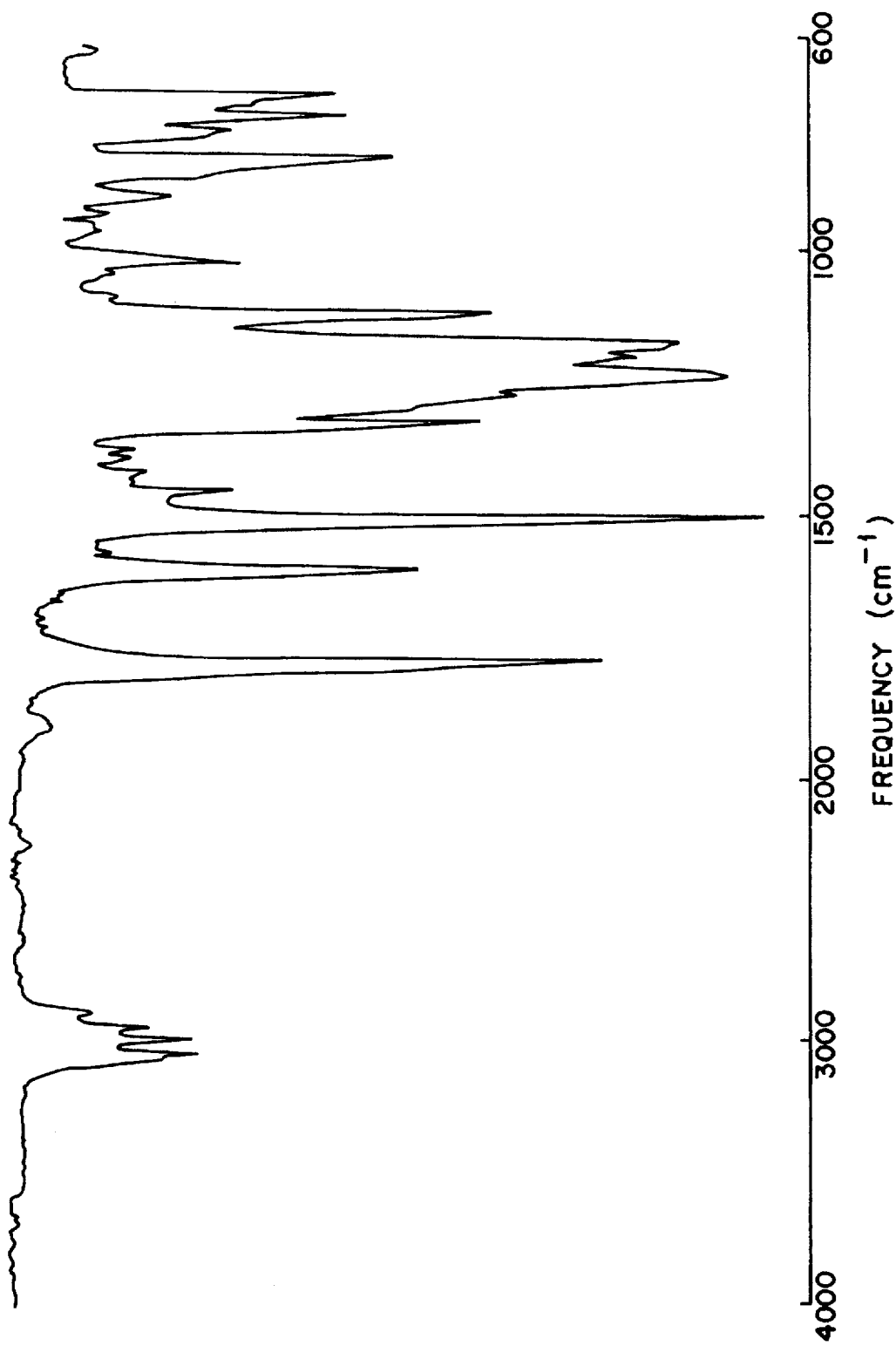

FIG. 17 shows an infrared spectrum of the aromatic polycarbonate resin No. 11 obtained in Example 1-11, taken by use of an NaCl film.

The IR spectrum indicates the appearance of the characteristic absorption peak due to C=O stretching vibration of carbonate at 1760 cm$^{-1}$.

EXAMPLE 1-12

|Synthesis of aromatic polycarbonate resin No. 12|

5.64 g (0.005 mol) of the dihydroxyl-group-containing diamine compound No. 4 obtained in Preparation Example 4, represented by formula (13), and 1.52 g (0.015 mol) of triethylamine were dissolved in 40 ml of dry tetrahydrofuran, so that a solution (a) was prepared. A solution (b) prepared by dissolving 1.21 g (0.005 mol) of diethylene glycol bis(chloroformate) in 10 ml of dry tetrahydrofuran was added dropwise to the solution (a) over a period of 30 minutes under water-cooled condition.

After completion of the addition, the resultant viscous reaction mixture was stirred for 120 minutes, and 0.8 g of a dry tetrahydrofuran solution of 4 wt. % of phenol was added to the reaction mixture.

After stirring for 120 minutes, the obtained viscous reaction mixture was successively washed with a 5% aqueous solution of sodium hydroxide, a 2% aqueous solution of hydrochloric acid, and ion-exchange water, and caused to precipitate in methanol. The resultant precipitate was separated from the reaction mixture by filtration and dried, so that 5.83 g of an aromatic polycarbonate resin No. 12 according to the present invention having a repeat unit of the following formula was obtained in a yield of 88.6%.

[Aromatic polycarbonate resin No. 12]

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 12 are shown in Table 1.

Figure 18:
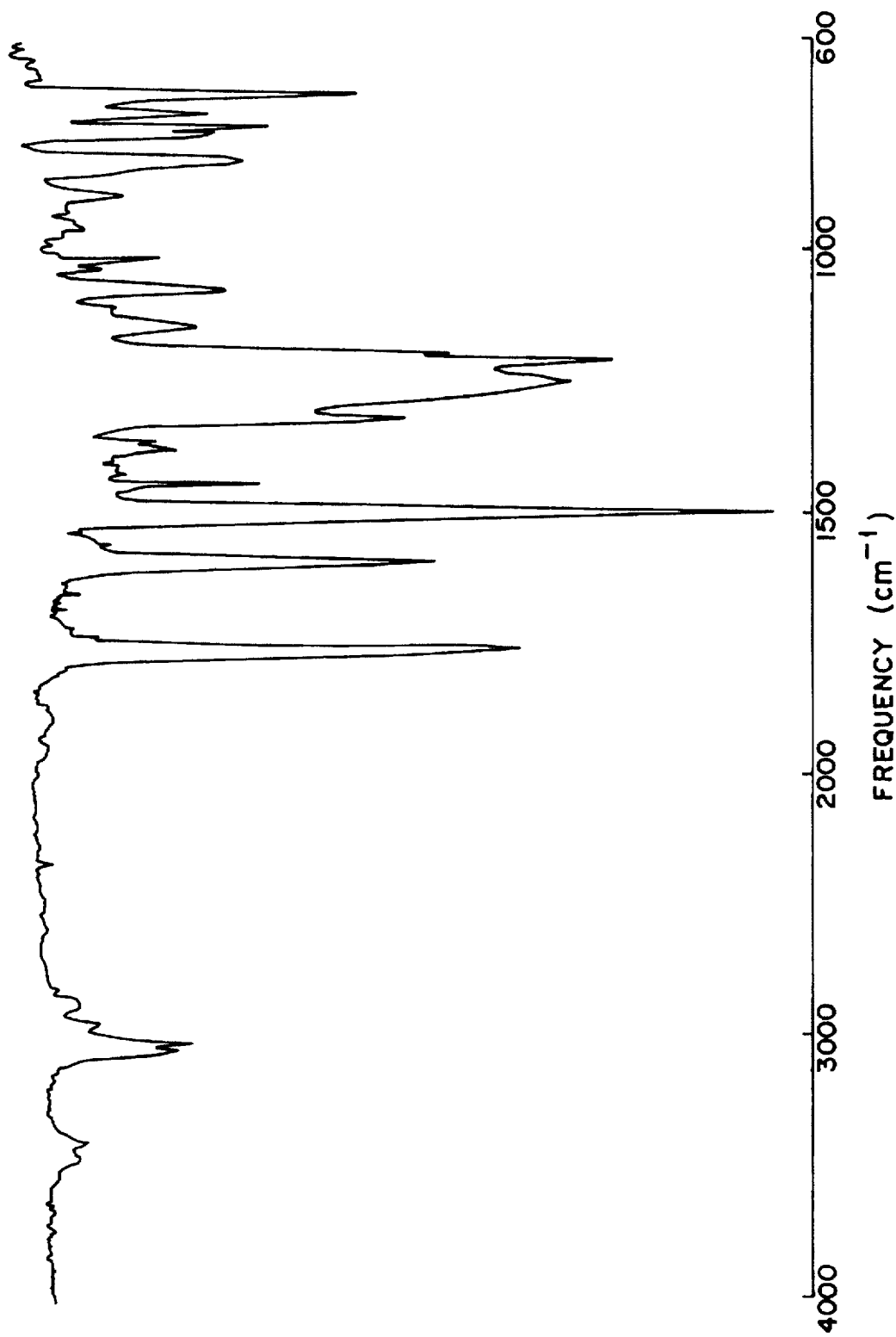

FIG. 18 shows an infrared spectrum of the aromatic polycarbonate resin No. 12 obtained in Example 1-12, taken by use of an NaCl film.

The IR spectrum indicates the appearance of the characteristic absorption peak due to C=O stretching vibration of carbonate at 1760 cm$^{-1}$.

EXAMPLES 1-13 AND 1-14

|Synthesis of aromatic polycarbonate resins No. 13 and No. 14|

The procedure for preparation of the aromatic polycarbonate resin No. 12 in Example 1-12 was repeated except that diethylene glycol bis(chloroformate) used in Example 1-12 was replaced by the respective bis(chloroformate) compounds.

Thus, aromatic polycarbonate resins No. 13 and No. 14 according to the present invention were obtained, respectively having repeat units of the following formulae.

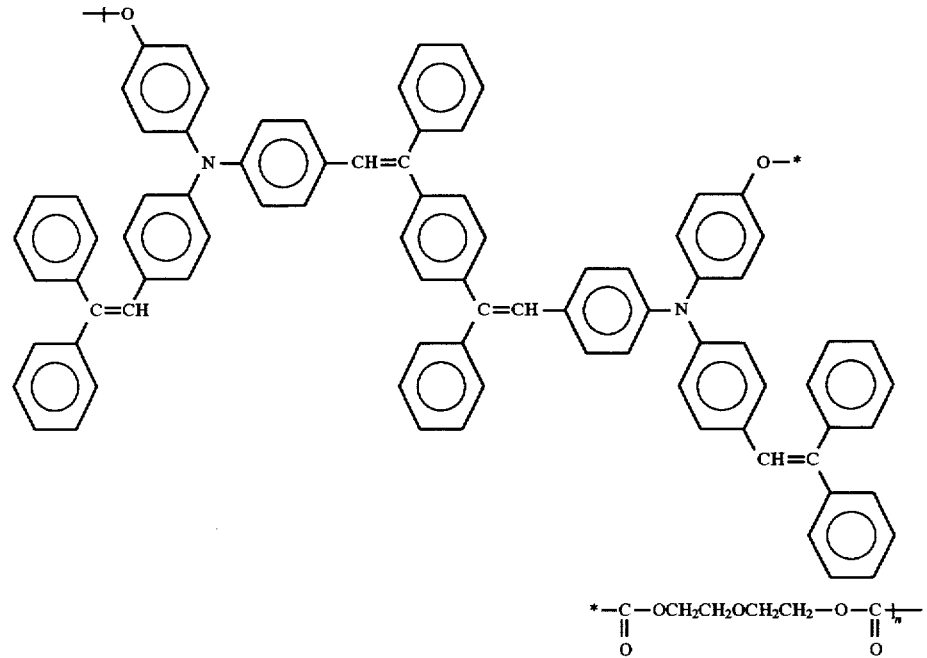

[Aromatic polycarbonate resin No. 13]

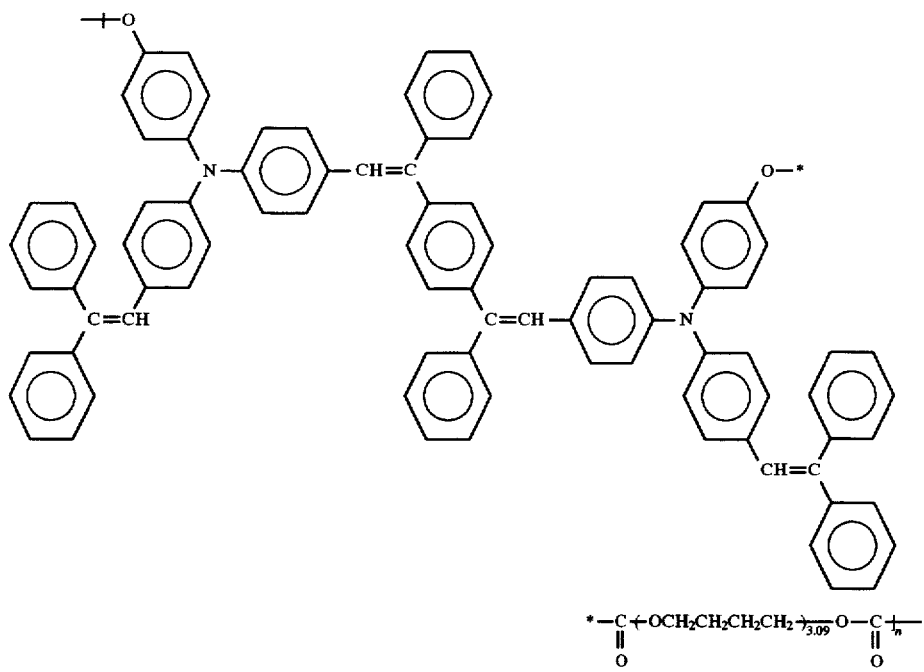

[Aromatic polycarbonate resin No. 14]

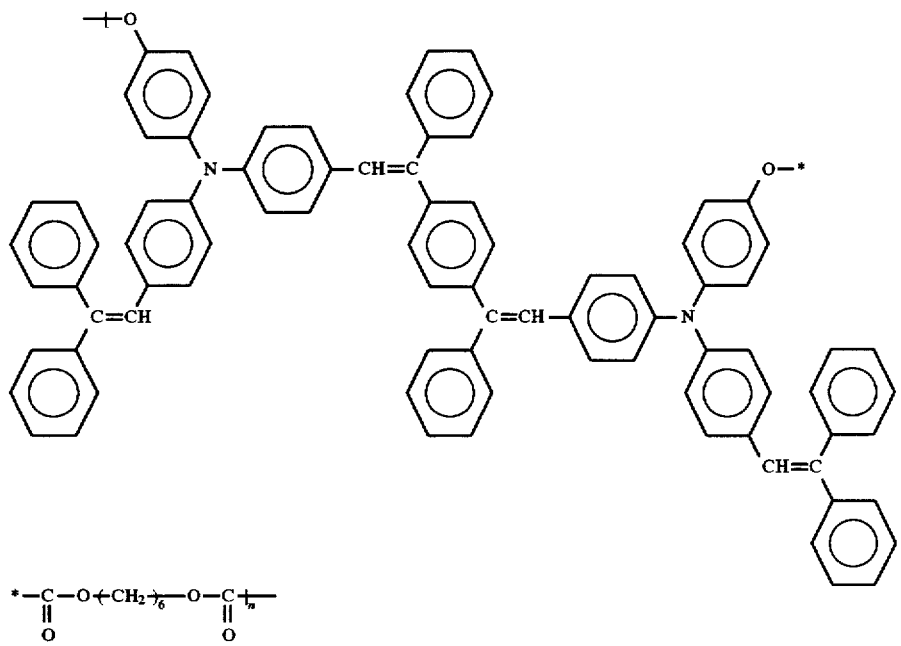

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins No. 13 and No. 14 are shown in Table 1.

Figure 19:
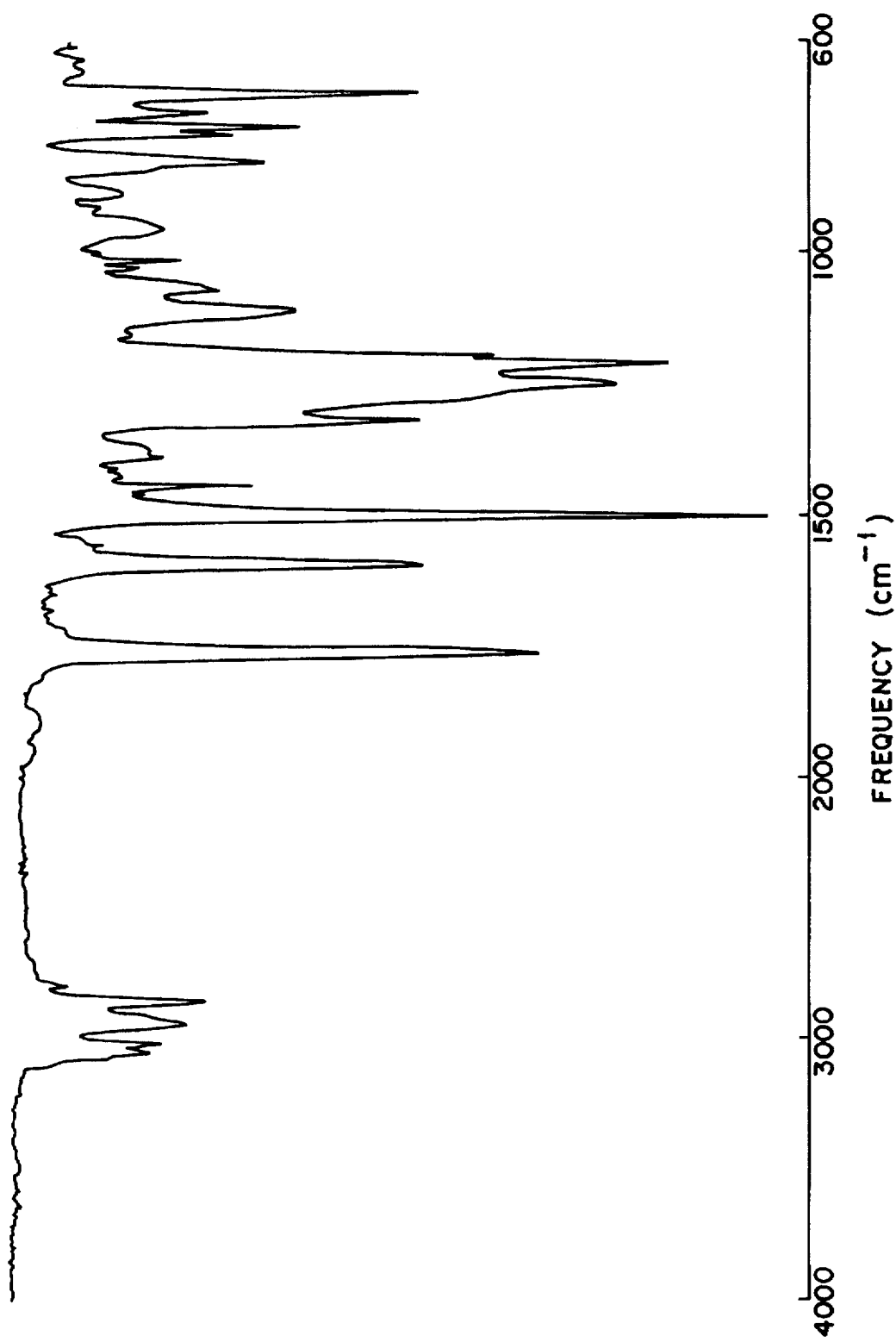
Figure 20:
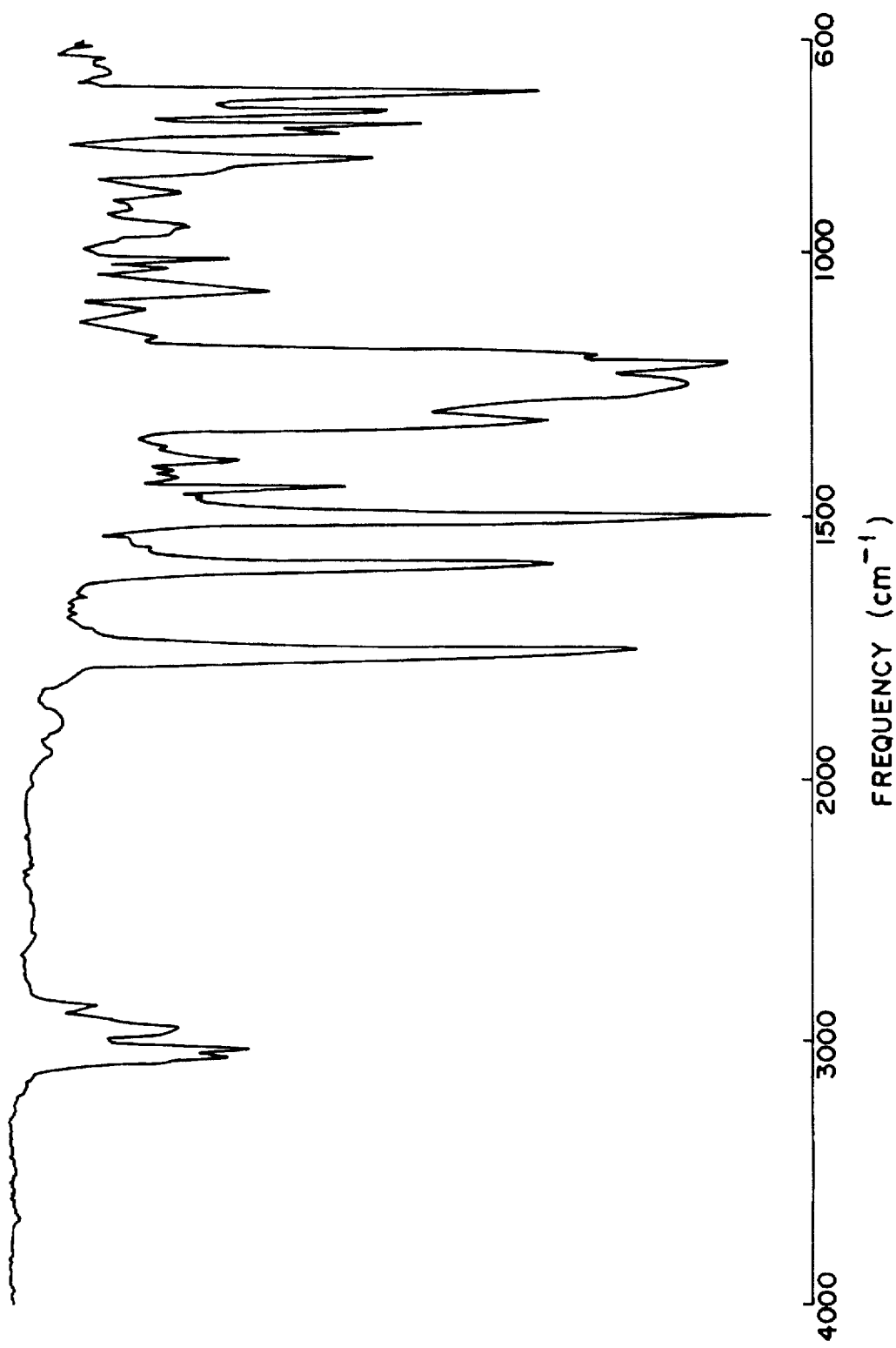

FIGS. 19 and 20 respectively show infrared spectra of the aromatic polycarbonate resins No. 13 and No. 14 obtained in Examples 1-13 and 1-14, taken by use of an NaCl film.

Each IR spectrum indicates the appearance of the characteristic absorption peak due to C=O stretching vibration of carbonate at 1760 $cm^{-1}$.

EXAMPLE 1-15

[Synthesis of aromatic polycarbonate resin No. 15]

2.25 g (0.002 mol) of the dihydroxyl-group-containing diamine compound No. 4 obtained in Preparation Example 4, represented by formula (13), was placed into a reaction vessel. An aqueous solution prepared by dissolving 0.32 g (0.008 mol) of sodium hydroxide in 30 ml of ion-exchange water was added to the above-mentioned dihydroxyl-group-containing diamine compound No. 4, and a mixture thus obtained was stirred. A solution prepared by dissolving 0.356 g (0.0012 mol) of triphosgene in 10 ml of methylene chloride was added dropwise to the above-mentioned mixture over a period of 20 minutes under ice-cooled condition.

After completion of the addition, 5 ml of methylene chloride was added to the reaction mixture as rinsing the vessel. Then, 0.1 g (0.025 mol) of sodium hydroxide was added to the reaction mixture at room temperature. Further, with the addition of one drop of triethylamine, the reaction mixture was stirred for 2 hours.

Thereafter, the obtained viscous reaction mixture was successively washed with a 5% aqueous solution of sodium hydroxide, a 2% aqueous solution of hydrochloric acid, and ion-exchange water, and caused to precipitate in methanol. The resultant precipitate was separated from the reaction mixture by filtration and dried, so that 1.25 g of an aromatic polycarbonate resin No. 15 according to the present invention having a repeat unit of the following formula was obtained in a yield of 52.7%.

[Aromatic polycarbonate resin No. 15]

EXAMPLE 1-16

[Synthesis of aromatic polycarbonate resin No. 16]

5.07 g (0.0045 mol) of the dihydroxyl-group-containing diamine compound No. 4 obtained in Preparation Example 4, represented by formula (13), and 1.02 g (0.0045 mol) of bisphenol A were placed into a reaction vessel. An aqueous solution prepared by dissolving 0.72 g (0.018 mol) of sodium hydroxide in 60 ml of ion-exchange water was added to the above-mentioned mixture, followed by stirring. Further, 20 ml of methylene chloride was added to the mixture. A solution prepared by dissolving 0.80 g (0.0027 mol) of triphosgene in 15 ml of methylene chloride was added dropwise to the above-mentioned mixture over a period of 60 minutes under ice-cooled condition.

After completion of the addition, 5 ml of methylene chloride was added to the reaction mixture as rinsing the vessel. Then, 0.225 g of sodium hydroxide was added to the reaction mixture at room temperature. Further, with the addition of one drop of triethylamine, the reaction mixture was stirred for 5 hours. Then, the reaction mixture was further stirred for one hour with the addition thereto of 60 mg of tert-butylphenol.

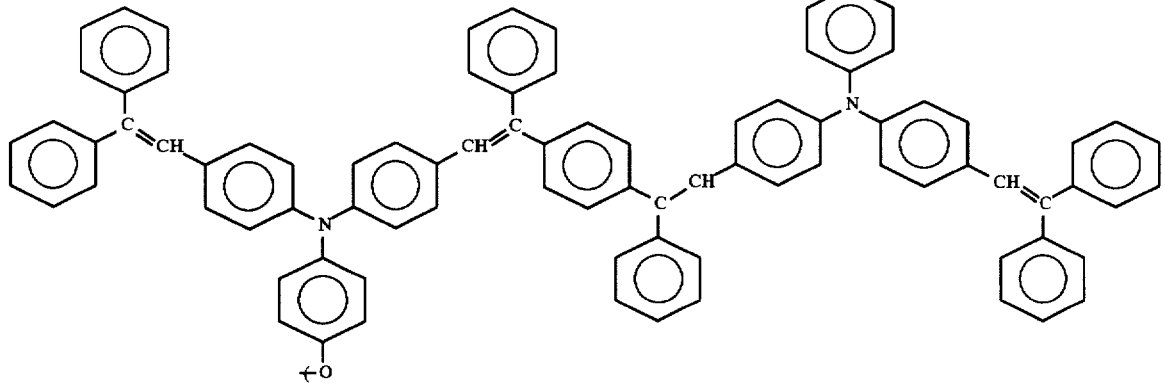

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 15 are shown in Table 1.

Figure 21:
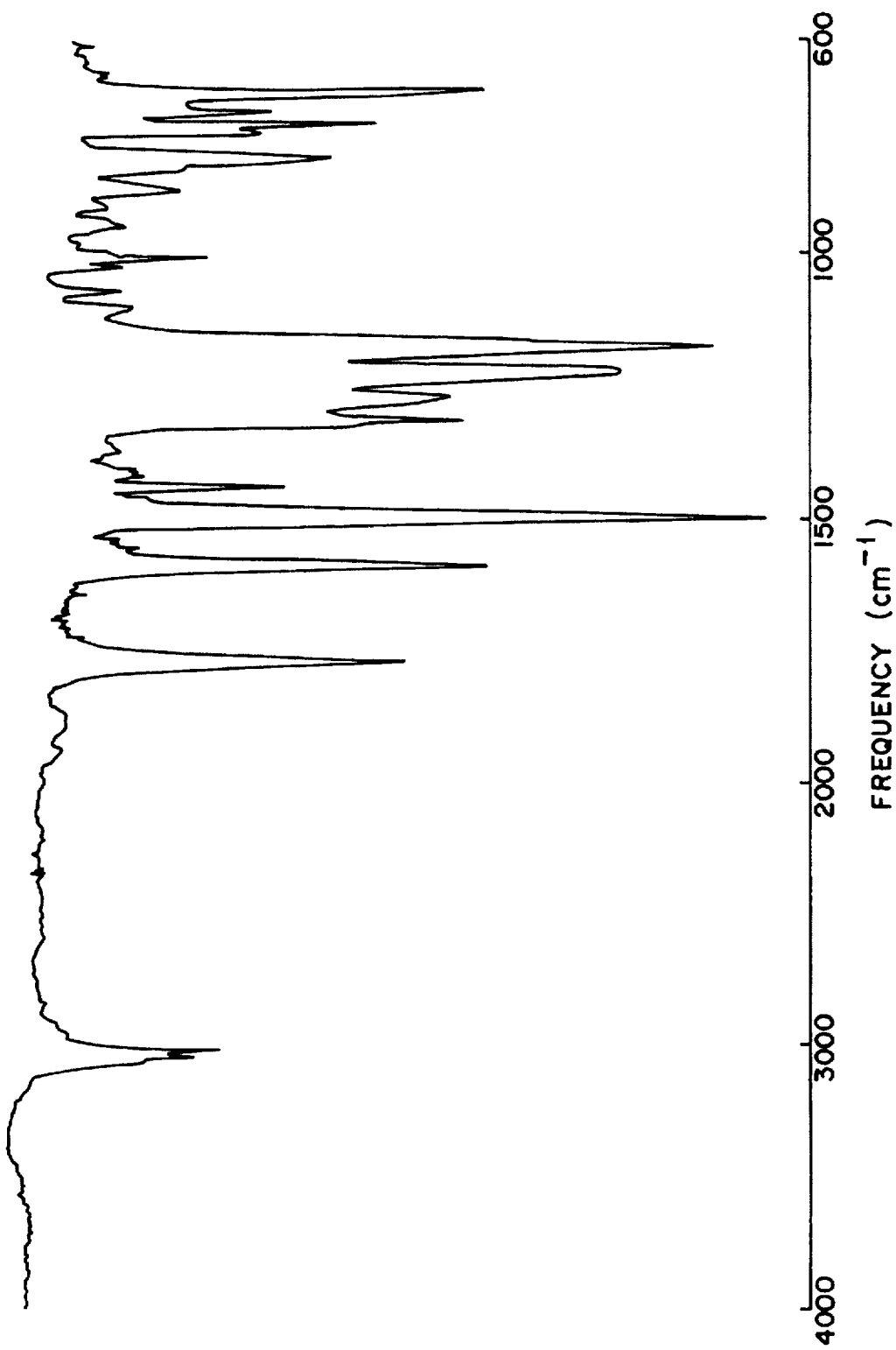

FIG. 21 shows an infrared spectrum of the aromatic polycarbonate resin No. 15 obtained in Example 1-15, taken by use of an NaCl film.

The IR spectrum indicates the appearance of the characteristic absorption peak due to C=O stretching vibration of carbonate at 1775 $cm^{-1}$.

Thereafter, the obtained viscous reaction mixture was successively washed with a 5% aqueous solution of sodium hydroxide, a 2% aqueous solution of hydrochloric acid, and ion-exchange water, and caused to precipitate in methanol. The resultant precipitate was separated from the reaction mixture by filtration and dried, so that 5.73 g of an aromatic polycarbonate resin No. 16 according to the present invention having a repeat unit of the following formula was obtained in a yield of 88.6%.

[Aromatic polycarbonate resin No. 16]

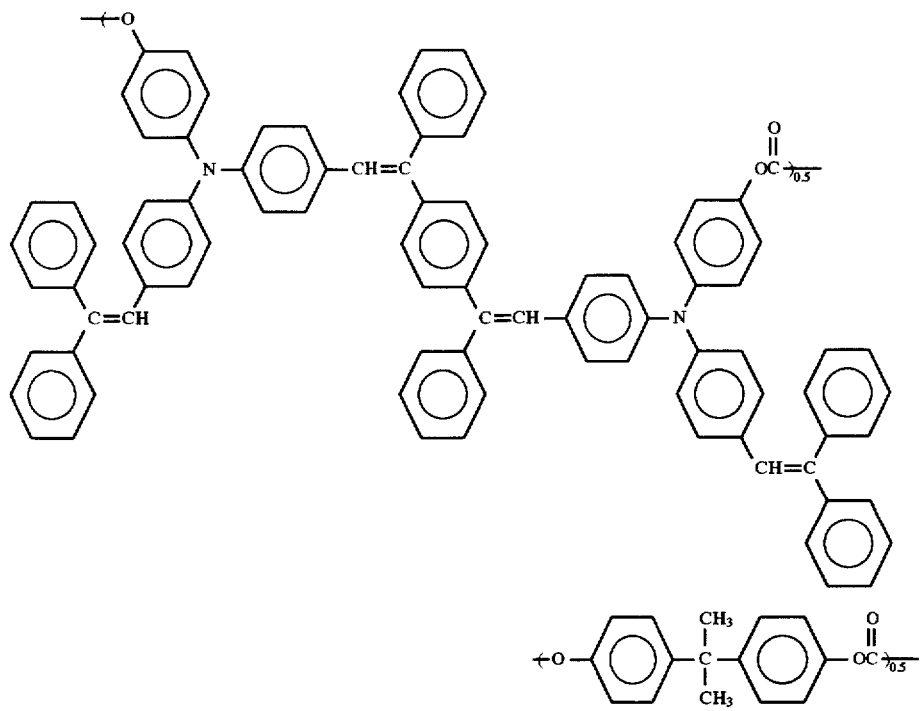

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 16 are shown in Table 1.

Figure 22:
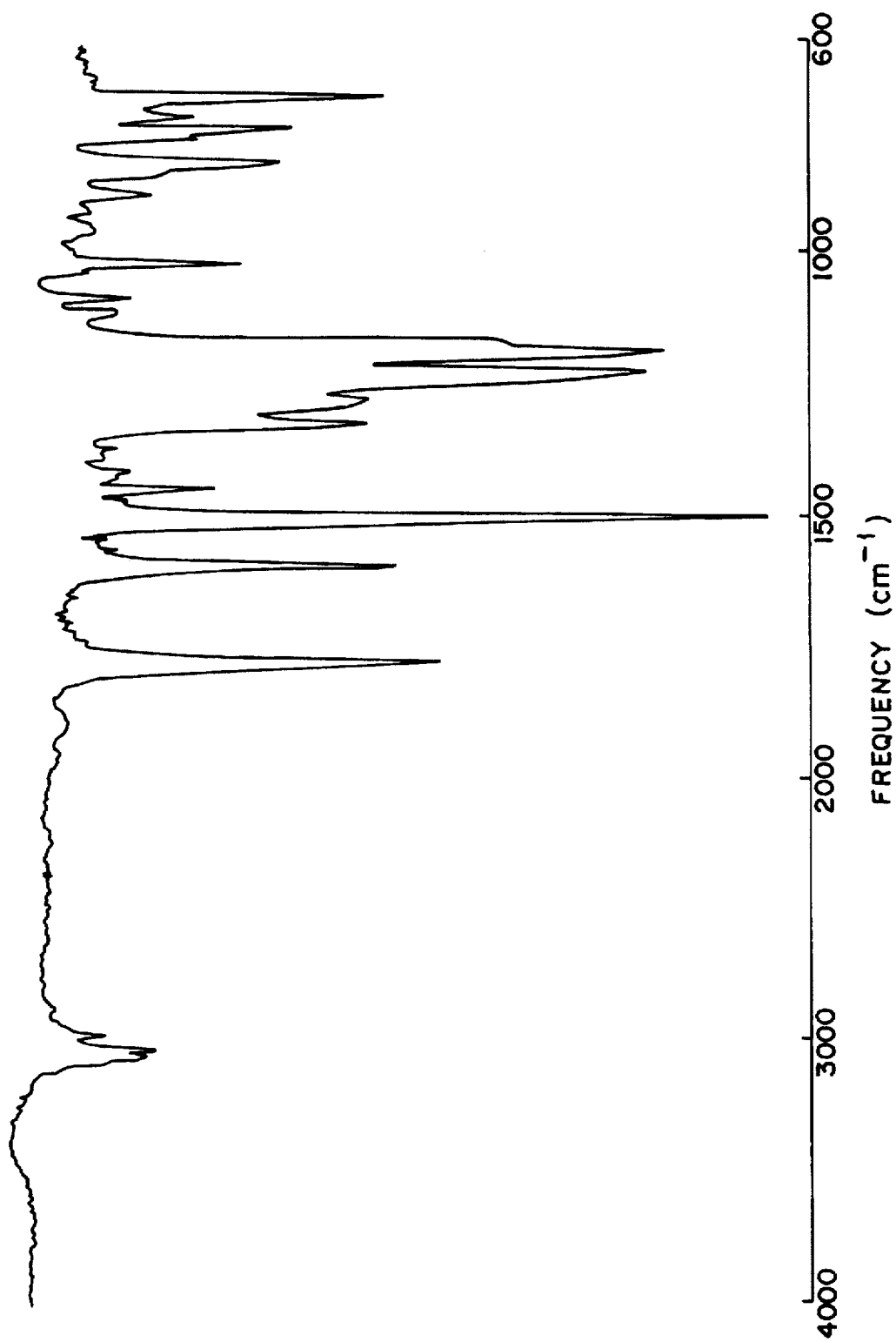

FIG. 22 shows an infrared spectrum of the aromatic polycarbonate resin No. 16 obtained in Example 1-16, taken by use of an NaCl film.

The IR spectrum indicates the appearance of the characteristic absorption peak due to C=O stretching vibration of carbonate at 1775 cm$^{-1}$.

EXAMPLE 1-17

[Synthesis of aromatic polycarbonate resin No. 17]

The procedure for preparation of the aromatic polycarbonate resin No. 16 in Example 1-16 was repeated except that bisphenol A used in Example 1-16 was replaced by bisphenol Z.

Thus, an aromatic polycarbonate resin No. 17 according to the present invention having a repeat unit of formula was obtained.

[Aromatic polycarbonate resin No. 17]

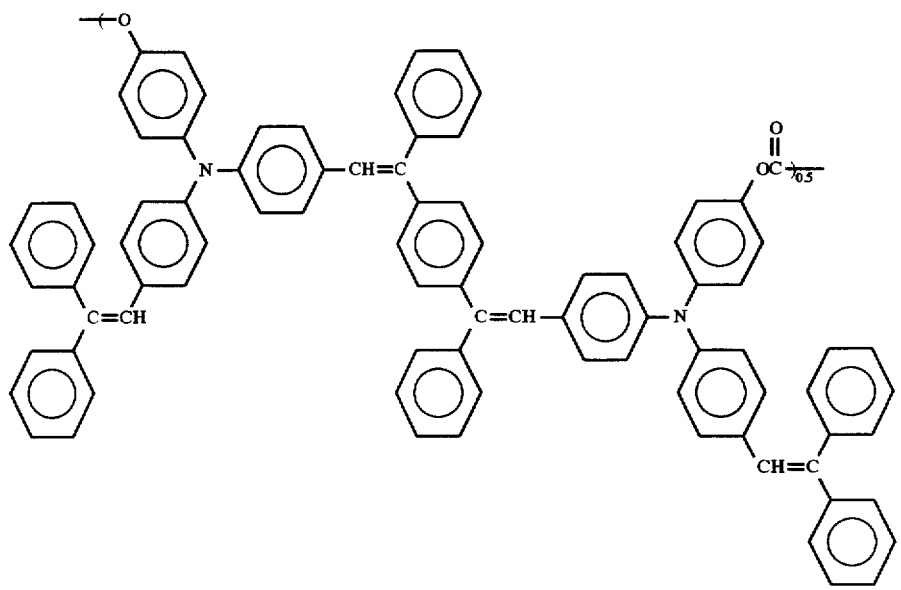

-continued

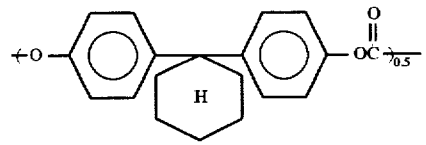

The glass transition temperature (Tg), the polystyrene-reduced number-average molecular weight (Mn), the polystyrene-reduced weight-average molecular weight (Mw), and the results of the elemental analysis of the obtained aromatic polycarbonate resin No. 17 are shown in Table 1.

Figure 23:
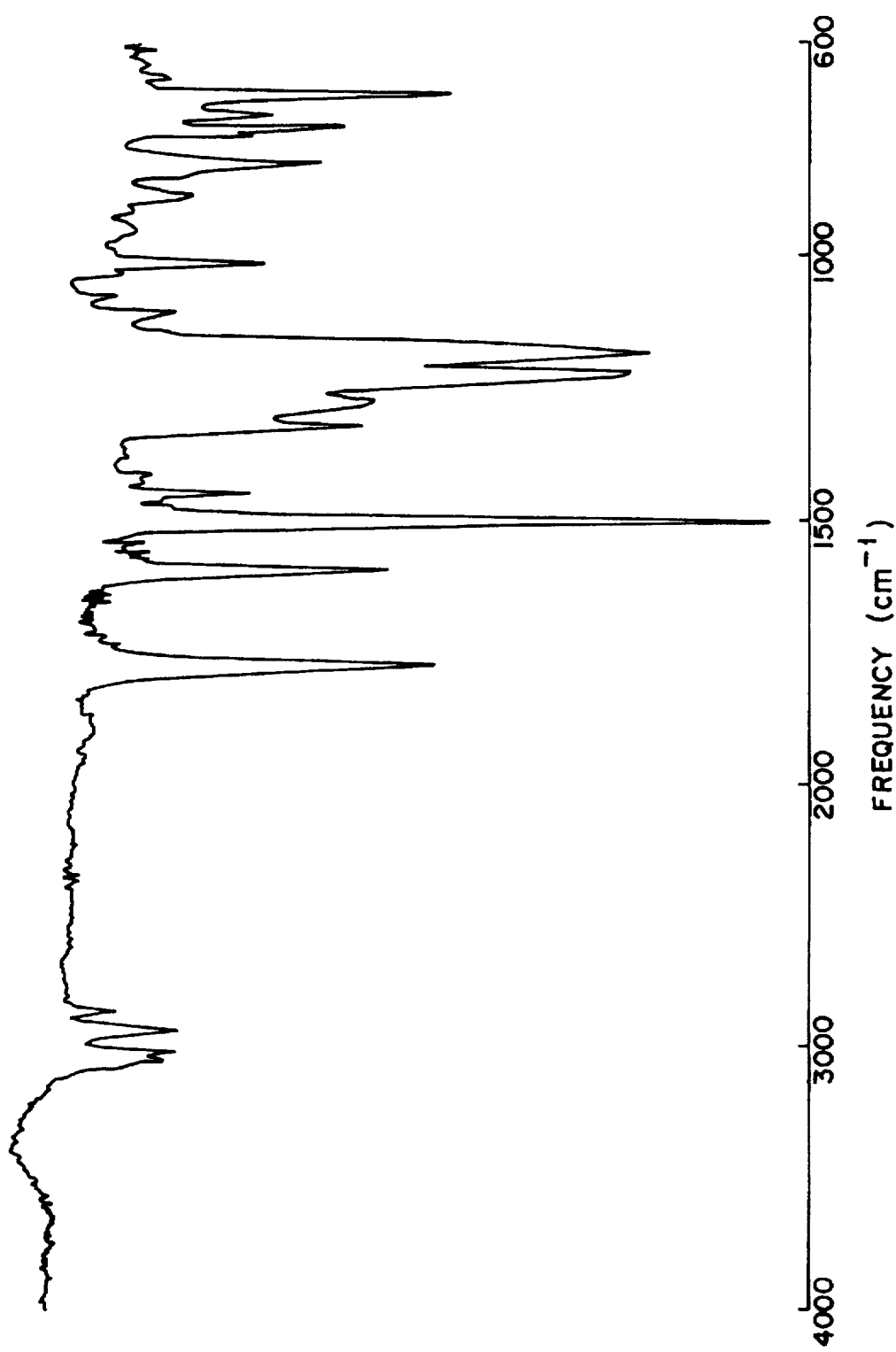

FIG. 23 shows an infrared spectrum of the aromatic polycarbonate resin No. 17 obtained in Examples 1-17, taken by use of an NaCl film.

The IR spectrum indicates the appearance of the characteristic absorption peak due to C=O stretching vibration of carbonate at 1775 cm$^{-1}$.

TABLE 1

| | | | | Elemental Analysis | | |
|---|---|---|---|---|---|---|
| | | Molecular Weight (*) | | % C Found (Calcd.) | % H Found (Calcd.) | % N Found (Calcd.) |
| Example No. | Tg (°C.) | Mn | Mw | | | |
| 1-1 | 122.5 | 34000 | 161300 | 79.98 (79.98) | 5.17 (5.45) | 2.97 (2.91) |
| 1-2 | 86.9 | 30417 | 99227 | 79.06 (79.31) | 6.18 (6.32) | 2.58 (2.56) |
| 1-3 | 127.3 | 31797 | 134725 | 81.66 (81.46) | 5.55 (5.80) | 2.92 (2.88) |
| 1-4 | 177.6 | 11828 | 32723 | 83.30 (83.16) | 5.13 (5.40) | 2.43 (2.59) |
| 1-5 | 149.1 | 18200 | 139000 | 81.70 (81.74) | 5.84 (5.85) | 2.64 (2.80) |
| 1-6 | 147.7 | 19200 | 156000 | 80.14 (80.47) | 5.50 (5.32) | 2.75 (2.84) |
| 1-7 | 100.7 | 13300 | 76500 | 79.24 (79.31) | 6.47 (6.32) | 2.32 (2.56) |
| 1-8 | 149.1 | 18200 | 194000 | 81.64 (81.90) | 5.89 (5.66) | 2.72 (2.81) |
| 1-9 | 201.5 | 23300 | 183000 | 85.46 (85.90) | 4.96 (4.89) | 3.34 (3.40) |
| 1-10 | 198.0 | 5000 | 26900 | 85.39 (85.89) | 5.33 (5.20) | 3.17 (3.28) |
| 1-11 | 182.6 | 15300 | 225000 | 83.27 (83.56) | 5.62 (5.52) | 2.40 (2.47) |
| 1-12 | 150.0 | 18700 | 128000 | 84.08 (83.99) | 5.27 (5.36) | 2.01 (2.13) |
| 1-13 | 116.8 | 12600 | 64800 | 82.88 (83.08) | 6.10 (6.07) | 1.76 (1.93) |
| 1-14 | 145.5 | 11700 | 89700 | 85.13 (85.04) | 5.54 (5.62) | 2.07 (2.11) |
| 1-15 | 192.8 | 18100 | 158000 | 88.37 (88.30) | 5.13 (5.28) | 2.19 (2.37) |
| 1-16 | 185.3 | 18900 | 79000 | 86.23 (86.05) | 5.18 (5.33) | 1.80 (1.95) |
| 1-17 | 190.0 | 11600 | 65600 | 86.60 (86.15) | 5.30 (5.46) | 1.88 (1.90) |

(*) The molecular weight is expressed by a polystyrene-reduced value.

EXAMPLE 2-1

[Fabrication of Photoconductor No. 1]

(Formation of intermediate layer)

A commercially available polyamide resin (Trademark "CM-8000", made by Toray Industries, Inc.) was dissolved in a mixed solvent of methanol and butanol, so that a coating liquid for an intermediate layer was prepared.

The thus prepared coating liquid was coated on an aluminum plate by a doctor blade, and dried at room temperature, so that an intermediate layer with a thickness of 0.3 μm was provided on the aluminum plate. (Formation of charge generation layer)

A coating liquid for a charge generation layer was prepared by dispersing a bisazo compound of the following formula, serving as a charge generation material, in a mixed solvent of cyclohexanone and methyl ethyl ketone in a ball mill. The thus obtained coating liquid was coated on the above prepared intermediate layer by a doctor blade, and dried at room temperature. Thus, a charge generation layer with a thickness of about 1 μm was formed on the intermediate layer. (Bisazo compound)

Each of the electrophotographic photoconductors No. 1 through No. 15 according to the present invention obtained in Examples 2-1 to 2-15 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). Then, each electrophotographic photoconductor was allowed to stand in the dark for 20 seconds without applying any charge thereto, and the surface potential Vo (V) of the photoconductor was measured. Each photoconductor was then illuminated by a tungsten lamp in such a manner that the illuminance on the illuminated surface of the photoconductor was 4.5 lux, and the exposure $E_{1/2}$ (lux·sec) required to reduce the initial surface potential Vo (V) to ½ the initial surface potential Vo (V) was measured. The results are shown in Table 2.

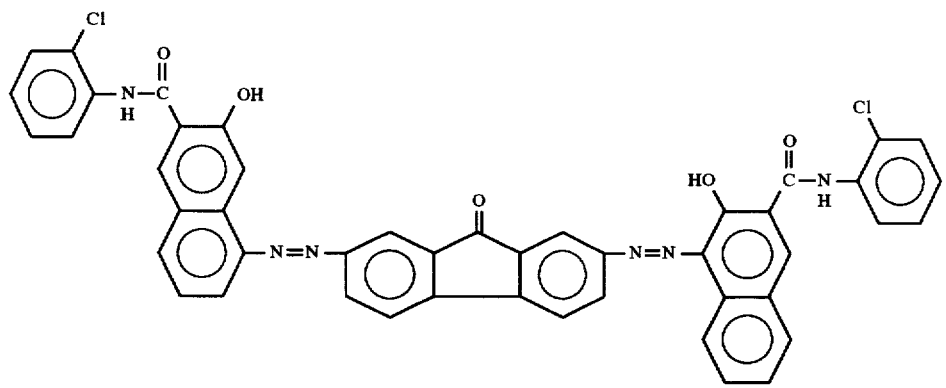

[Formation of charge transport layer]

The aromatic polycarbonate resin No. 1 of the present invention prepared in Example 1—1, serving as a charge transport material, was dissolved in dichloromethane. The thus obtained coating liquid was coated on the above prepared charge generation layer by a doctor blade, and dried at room temperature and then at 120° C. for 20 minutes, so that a charge transport layer with a thickness of about 20 μm was provided on the charge generation layer.

Thus, an electrophotographic photoconductor No. 1 according to the present invention was fabricated.

EXAMPLES 2-2 TO 2-15

The procedure for fabrication of the electrophotographic photoconductor No. 1 in Example 2-1 was repeated except that the aromatic polycarbonate resin No. 1 for use in the charge transport layer coating liquid in Example 2-1 was replaced by each of the aromatic polycarbonate resins (as illustrated in Table 2).

Thus, electrophotographic photoconductors No. 2 to No. 15 according to the present invention were fabricated.

TABLE 2

| Example No. | Aromatic Polycarbonate Resin No. | −Vo (V) | $E_{1/2}$ (lux · sec) |
|---|---|---|---|
| 1 | No. 1 | 1291 | 1.15 |
| 2 | No. 2 | 1087 | 0.92 |
| 3 | No. 3 | 1325 | 1.07 |
| 4 | No. 4 | 1208 | 1.54 |
| 5 | No. 5 | 978 | 0.93 |
| 6 | No. 6 | 1003 | 1.01 |
| 7 | No. 7 | 883 | 0.94 |
| 8 | No. 8 | 897 | 0.85 |
| 9 | No. 12 | 986 | 0.93 |
| 10 | No. 13 | 1021 | 0.94 |
| 11 | No. 14 | 1227 | 0.97 |
| 12 | No. 15 | 537 | 1.60 |
| 13 | No. 11 | 742 | 1.17 |
| 14 | No. 16 | 588 | 1.24 |
| 15 | No. 17 | 702 | 1.58 |

Furthermore, each of the above obtained electrophotographic photoconductors No. 1 to No. 15 was set in a commercially available electrophotographic copying machine, and the photoconductor was charged and exposed to light images via the original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

As previously explained, the polycarbonate resin for use in the photoconductive layer of the electrophotographic photoconductor according to the present invention comprises a repeat unit of formula (I); or repeat units of formulae (II) and (III). Any of the above-mentioned aromatic polycarbonate resins have the charge transporting properties and high mechanical strength, so that the photosensitivity and durability of the photoconductor are sufficiently high.

Japanese Patent Application No. 7-327364 filed Dec. 15, 1995, Japanese Patent Application No. 8-010228 filed Jan. 24, 1996 and Japanese Patent Application No. 8-010894 filed Jan. 25, 1996 are hereby incorporated by reference.

What is claimed is:

1. An electrophotographic photoconductor comprising an electroconductive support, and a photoconductive layer formed thereon comprising as an effective component an aromatic polycarbonate resin having a repeat unit of formula (I):

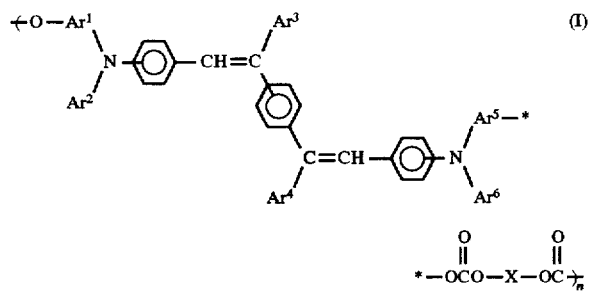

wherein n is an integer of 5 to 5000; $Ar^1$ and $Ar^5$ may be the same or different, and are each independently a bivalent aromatic hydrocarbon group which may have a substituent or a bivalent heterocyclic group which may have a substituent; $Ar^2$, $Ar^3$, $Ar^4$ and $Ar^6$ each may be the same or different, and are each independently an aromatic hydrocarbon group which may have a substituent, or a heterocyclic group which may have a substituent; and X is a bivalent aliphatic group, a bivalent cyclic aliphatic group, or

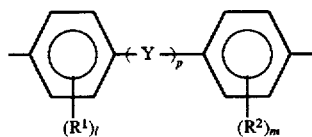

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 or 1, and when p=1, Y is a straight-chain, branched or cyclic alkylene group having 1 to 12 carbon atoms, —O—, —S—, —SO—, —SO₂—,

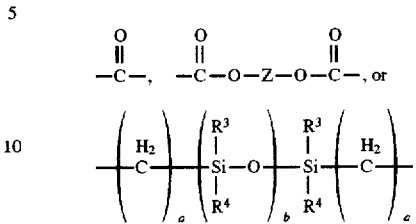

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent and wherein said photoconductive layer further comprises a sensitizing dye or a charge generation material.

2. The electrophotographic photoconductor as claimed in claim 1, wherein said aromatic hydrocarbon group represented by $Ar^1$ and $Ar^5$ is phenylene group.

3. The electrophotographic photoconductor as claimed in claim 2, wherein said aromatic hydrocarbon group represented by $Ar^3$ is

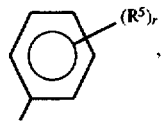

and said aromatic hydrocarbon group represented by $Ar^4$ is

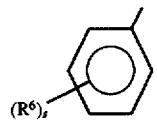

wherein $R^5$ and $R^6$ are each independently an alkyl group which may have a substituent, an aromatic hydrocarbon group which may have a substituent, or a halogen atom; and r and s are each independently an integer of 0 to 4.

4. An electrophotographic photoconductor comprising an electroconductive support, and a photoconductive layer formed thereon comprising as an effective component an aromatic polycarbonate resin having a repeat unit of formula (II) and a great unit of formula (III), with the composition ratio of the repeat unit of formula (II) to the repeat unit of formula (III) being in the relationship of 0<k/(k+j)≦1:

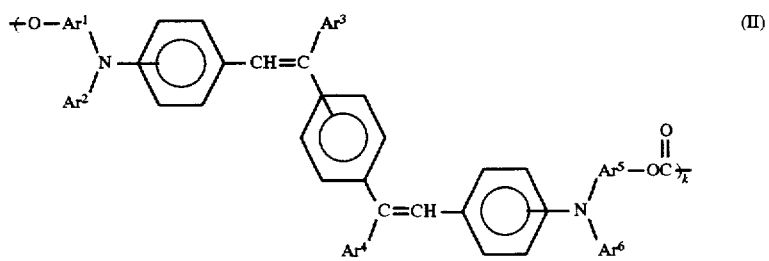

-continued

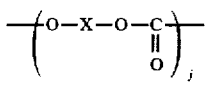

wherein k is an integer of 5 to 5000; j is an integer of 0 to 5000; $Ar^1$ and $Ar^5$ may be the same or different, and are each independently a bivalent aromatic hydrocarbon group which may have a substituent or a bivalent heterocyclic group which may have a substituent; $Ar^2$, $Ar^3$, $Ar^4$ and $Ar^6$ each may be the same or different, and are each independently an aromatic hydrocarbon group which may have a substituent, or a heterocyclic group which may have a substituent; and X is a bivalent aliphatic group, a bivalent cyclic aliphatic group or

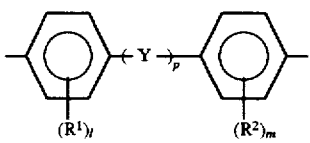

in which $R^1$ and $R^2$ are each independently an alkyl group which may have a substituent, an aromatic hydrocarbon group which may have a substituent, or a halogen atom; l and m are each independently an integer of 0 to 4; and p is an integer of 0 to 1, and when p=1, Y is a straight-chain, branched or cyclic alkylene group having 1 to 12 carbon atoms, —O—, —S—, —SO—, —SO$_2$—

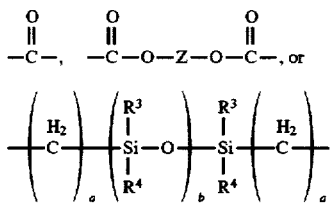

in which Z is a bivalent aliphatic hydrocarbon group; a is an integer of 0 to 20; b is an integer of 1 to 2000; and $R^3$ and $R^4$ are each independently an alkyl group which may have a substituent or an aromatic hydrocarbon group which may have a substituent and wherein said photoconductive layer further comprises a sensitizing dye or a charge generation material.

5. The electrophotographic photoconductor as claimed in claim 4, wherein said aromatic hydrocarbon group represented by $Ar^1$ and $Ar^5$ is phenylene group.

6. The electrophotographic photoconductor as claimed in claim 5, wherein said aromatic hydrocarbon group represented by $Ar^3$ is

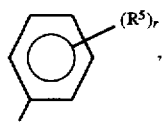

and said aromatic hydrocarbon group represented by $Ar^4$ is

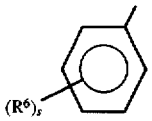

wherein $R^5$ and $R^6$ are each independently an alkyl group which may have a substituent, an aromatic hydrocarbon group which may have a substituent, or a halogen atom; and r and s are each independently an integer of 0 to 4.

7. The electrophotographic photoconductor as claimed in claim 1, wherein said bivalent aromatic hydrocarbon group represented by $Ar^1$ and $Ar^5$ is a bivalent group derived from one aromatic hydrocarbon group selected from the group consisting of benzene, naphthalene, biphenyl, terphenyl, pyrene, fluorene, and 9,9-dimethylfluorene.

8. The electrophotographic photoconductor as claimed in claim 1, wherein said bivalent heterocyclic group represented by $Ar^1$ and $Ar^5$ is a bivalent group derived from one heterocyclic group selected from the group consisting of thiophene, benzothiophene, furan, benzofuran and carbazole.

9. The electrophotographic photoconductor as claimed in claim 1, wherein said bivalent heterocyclic group represented by $Ar^1$ and $Ar^5$ is diphenyl ether group in which two aryl groups are bonded via oxygen, or diphenyl thioether group in which two aryl groups are bonded via sulfur.

10. The electrophotographic photoconductor as claimed in claim 1, wherein said substituent for said bivalent aromatic hydrocarbon group and said bivalent heterocyclic group represented by $Ar^1$ and $Ar^5$ is selected from the group consisting of a halogen atom, an alkyl group having 1 to 12 carbon atom, and an alkoxyl group having 1 to 12 carbon atoms.

11. The electrophotographic photoconductor as claimed in claim 1, wherein said aromatic hydrocarbon group represented by $Ar^2$, $Ar^3$, $Ar^4$ and $Ar^6$ is an aromatic hydrocarbon group selected from the group consisting of phenyl group, naphthyl group, biphenylyl group, terphenylyl group, pyrenyl group, fluorenyl group, 9,9-dimethyl-2-fluorenyl group, and 5H-dibenzocycloheptenyl group.

12. The electrophotographic photoconductor as claimed in claim 1, wherein said heterocyclic group represented by $Ar^2$, $Ar^3$, $Ar^4$ and $Ar^6$ is a heterocyclic group selected from the group consisting of thienyl group, benzothienyl group, furyl group, benzofuranyl group and carbazolyl group.

13. The electrophotographic photoconductor as claimed in claim 1, wherein said substituent for said aromatic hydrocarbon group and said heterocyclic group represented by $Ar^2$, $Ar^3$, $Ar^4$ and $Ar^6$ is selected from the group consisting of a halogen atom, an alkyl group having 1 to 12 carbon atom, and an alkoxyl group having 1 to 12 carbon atoms.

14. The electrophotographic photoconductor as claimed in claim 1, wherein said aromatic hydrocarbon group represented by $R^1$ to $R^4$ is selected from the group consisting of phenyl group which may have a substituent, and biphenylyl group which may have a substituent.

15. The electrophotographic photoconductor as claimed in claim 3, wherein said aromatic hydrocarbon group represented by $R^5$ and $R^6$ is selected from the group consisting of phenyl group which may have a substituent, and biphenylyl group which may have a substituent.

16. The electrophotographic photoconductor as claimed in claim 1, wherein said alkyl group represented by $R^1$ to $R^4$ has 1 to 12 carbon atoms.

17. The electrophotographic photoconductor as claimed in claim 3, wherein said alkyl group represented by $R^5$ and $R^6$ has 1 to 12 carbon atoms.

18. The electrophotographic photoconductor as claimed in claim 4, wherein said bivalent aromatic hydrocarbon group represented by $Ar^1$ and $Ar^5$ is a bivalent group derived from one aromatic hydrocarbon group selected from the group consisting of benzene, naphthalene, biphenyl, terphenyl, pyrene, fluorene, and 9,9-dimethylfluorene.

19. The electrophotographic photoconductor as claimed in claim 4, wherein said bivalent heterocyclic group represented by $Ar^1$ and $Ar^5$ is a bivalent group derived from one heterocyclic group selected from the group consisting of thiophene, benzothiophene, furan, benzofuran and carbazole.

20. The electrophotographic photoconductor as claimed in claim 4, wherein said bivalent heterocyclic group represented by $Ar^1$ and $Ar^5$ is diphenyl ether group in which two aryl groups are bonded via oxygen, or diphenyl thioether group in which two aryl groups are bonded via sulfur.

21. The electrophotographic photoconductor as claimed in claim 4, wherein said substituent for said bivalent aromatic hydrocarbon group and said bivalent heterocyclic group represented by $Ar^1$ and $Ar^5$ is selected from the group consisting of a halogen atom, an alkyl group having 1 to 12 carbon atom, and an alkoxyl group having 1 to 12 carbon atoms.

22. The electrophotographic photoconductor as claimed in claim 4, wherein said aromatic hydrocarbon group represented by $Ar^2$, $Ar^3$, $Ar^4$ and $Ar^6$ is an aromatic hydrocarbon group selected from the group consisting of phenyl group, naphthyl group, biphenylyl group, terphenylyl group, pyrenyl group, fluorenyl group, 9,9-dimethyl-2-fluorenyl group, and 5H-dibenzocycloheptenyl group.

23. The electrophotographic photoconductor as claimed in claim 4, wherein said heterocyclic group represented by $Ar^2$, $Ar^3$, $Ar^4$ and $Ar^6$ is a heterocyclic group selected from the group consisting of thienyl group, benzothienyl group, furyl group, benzofuranyl group and carbazolyl group.

24. The electrophotographic photoconductor as claimed in claim 4, wherein said substituent for said aromatic hydrocarbon group and said heterocyclic group represented by $Ar^2$, $Ar^3$, $Ar^4$ and $Ar^6$ is selected from the group consisting of a halogen atom, an alkyl group having 1 to 12 carbon atom, and an alkoxyl group having 1 to 12 carbon atoms.

25. The electrophotographic photoconductor as claimed in claim 4, wherein said aromatic hydrocarbon group represented by $R^1$ to $R^4$ is selected from the group consisting of phenyl group which may have a substituent, and biphenylyl group which may have a substituent.

26. The electrophotographic photoconductor as claimed in claim 6, wherein said aromatic hydrocarbon group represented by $R^5$ and $R^6$ is selected from the group consisting of phenyl group which may have a substituent, and biphenylyl group which may have a substituent.

27. The electrophotographic photoconductor as claimed in claim 4, wherein said alkyl group represented by $R^1$ to $R^4$ has 1 to 12 carbon atoms.

28. The electrophotographic photoconductor as claimed in claim 6, wherein said alkyl group represented by $R^5$ and $R^6$ has 1 to 12 carbons atoms.

* * * * *

UNITED STATES PATENT AND TRADEMARK OFFICE
CERTIFICATE OF CORRECTION

PATENT NO. : 5,789,128
DATED : August 4, 1998
INVENTOR(S) : Chihaya Adachi, et al.

It is certified that error appears in the above-identified patent and that said Letters Patent is hereby corrected as shown below:

Column 7, Line 55, "$Ar^2, Ar^3, Ar^4$" should read --$Ar^2, Ar^3, Ar^4$--.

Column 20, Line 53, "In stead" should read --Instead--.

Column 43, Line 66, "benzene-4',4' " should read --benzene-4',4"--.

Column 49, Line 9, "1760 $cm^{31\ 1}$" should read --1760 $cm^{-1}$--.

UNITED STATES PATENT AND TRADEMARK OFFICE
CERTIFICATE OF CORRECTION

PATENT NO. : 5,789,128
DATED : August 4, 1998
INVENTOR(S) : Chihaya Adachi, et al.

It is certified that error appears in the above-identified patent and that said Letters Patent is hereby corrected as shown below:

Column 54, Line 30, " 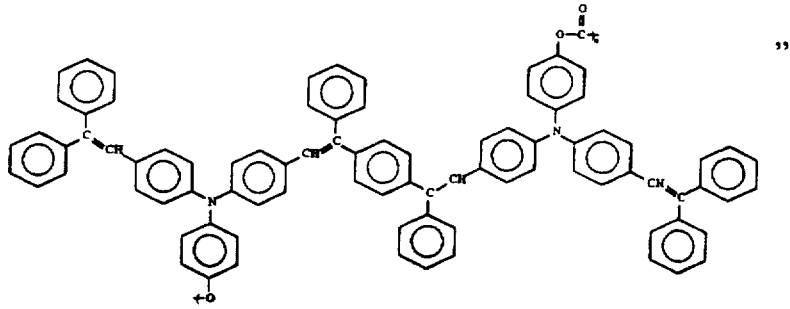 "

should read -- 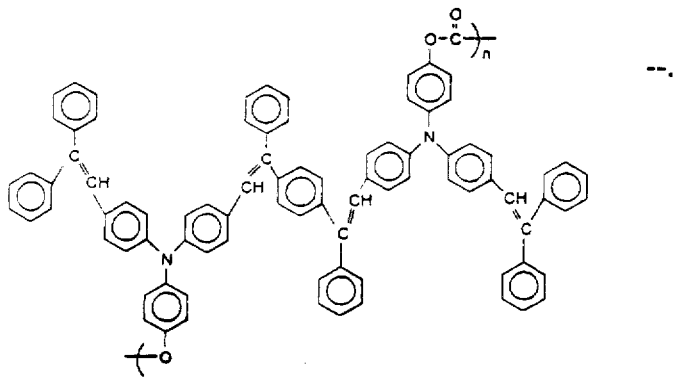 --.

UNITED STATES PATENT AND TRADEMARK OFFICE
CERTIFICATE OF CORRECTION

PATENT NO. : 5,789,128
DATED : August 4, 1998
INVENTOR(S) : Chihaya Adachi, et al.

It is certified that error appears in the above-identified patent and that said Letters Patent is hereby corrected as shown below:

Column 64, Line 40, "carbon atom," should read --carbon atoms,--.

Column 64, Line 59, "carbon atom," should read --carbon atoms,--.

Column 65, Line 31, "carbon atom," should read --carbon atoms,--.

Column 66, Line 16, "carbon atom," should read --carbon atoms,--.

Signed and Sealed this

Thirteenth Day of July, 1999

Q. TODD DICKINSON

*Attest:*

*Attesting Officer*  *Acting Commissioner of Patents and Trademarks*